(12) United States Patent
Nabeshima et al.

(10) Patent No.: US 6,175,660 B1
(45) Date of Patent: Jan. 16, 2001

(54) IMAGE READING APPARATUS

(75) Inventors: Takayuki Nabeshima; Hiroshi Murakami, both of Toyokawa (JP)

(73) Assignee: Minolta Co., Ltd., Osaka (JP)

( * ) Notice: Under 35 U.S.C. 154(b), the term of this patent shall be extended for 0 days.

(21) Appl. No.: 09/045,862

(22) Filed: Mar. 23, 1998

(30) Foreign Application Priority Data

Mar. 25, 1997 (JP) .................................. 9-071821
Mar. 25, 1997 (JP) .................................. 9-071822
May 28, 1997 (JP) .................................. 9-138515

(51) Int. Cl.[7] .................................................. G06K 9/40
(52) U.S. Cl. ......................... 382/274; 358/451; 358/461
(58) Field of Search .................................... 382/274, 254, 382/270, 273; 358/447, 455, 461, 451

(56) References Cited

U.S. PATENT DOCUMENTS

| | | | |
|---|---|---|---|
| 4,695,884 | * 9/1987 | Anastassiou et al. | 358/461 |
| 4,903,145 | * 2/1990 | Funada | 358/461 |
| 4,987,485 | 1/1991 | Hirota . | |
| 5,001,768 | * 3/1991 | Mita et al. | 382/274 |
| 5,241,575 | 8/1993 | Miyatake et al. . | |
| 5,253,083 | 10/1993 | Hirota . | |
| 5,412,489 | 5/1995 | Hirota . | |
| 5,970,181 | * 10/1999 | Ohtsu | 382/274 |

FOREIGN PATENT DOCUMENTS 7-273979   10/1995  (JP) .

* cited by examiner

*Primary Examiner*—Thomas D. Lee
(74) *Attorney, Agent, or Firm*—Burns, Doane, Swecker & Mathis, LLP

(57) ABSTRACT

An image reading apparatus is provided which is capable of correctly reproducing a read image, by correcting variation in read data derived from variation in light intensity and variation in sensitivity, using reading means capable of logarithmic conversion such as an LOG CCD. As variation in read data caused by insufficient light intensity in a shade region of an original is corrected, even when there is a shade in an original image having halftone gradation, satisfactory image reproduction is possible. Since variation in read data caused by insufficient light intensity at the time of zooming is corrected, image quality is not degraded even when electrical zooming is performed. Further, variation in read data caused by fluctuation in light intensity, variation in photosensitivity and types of original is corrected, AD conversion with uniform resolution is possible even when output levels differ because of light distribution variation of a light source or variation in sensitivity of sensors.

35 Claims, 50 Drawing Sheets

ORIGINAL IMAGE(TEXT ORIGINAL)

IMAGE HISTOGRAM OF PORTION I

IMAGE HISTOGRAM OF PORTION II

ORIGINAL IMAGE(TEXT · PHOTO)

IMAGE HISTOGRAM OF PORTION I

IMAGE HISTOGRAM OF PORTION II

ORIGINAL IMAGE(TEXT)

IMAGE HISTOGRAM OF PORTION I

IMAGE HISTOGRAM OF PORTION II

ORIGINAL IMAGE(TEXT · PHOTO)

IMAGE HISTOGRAM OF PORTION I

IMAGE HISTOGRAM OF PORTION II

SHADE PORTION MONITOR REGION

IMAGE DATA OF LINES a,b

IMAGE DATA OF LINES c,d

SHADE PORTION MONITOR REGION

IMAGE DATA OF LINES a,b

IMAGE DATA OF LINES c,d

SHADE PORTION MONITOR REGION

IMAGE DATA OF LINES a,b

IMAGE DATA OF LINE c

IMAGE DATA OF LINE d

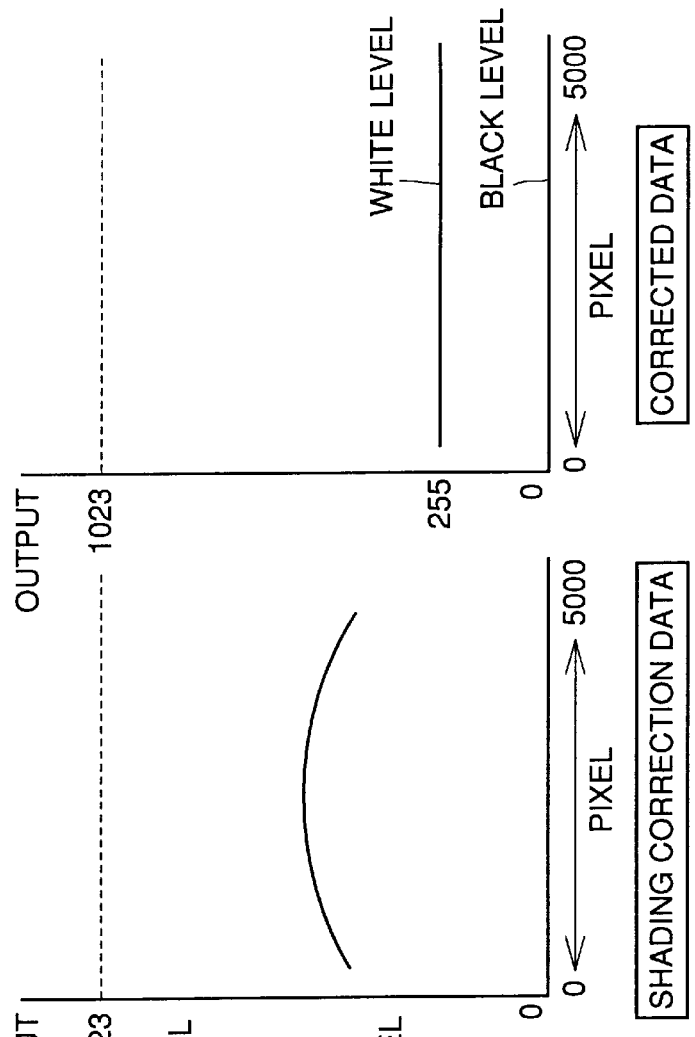
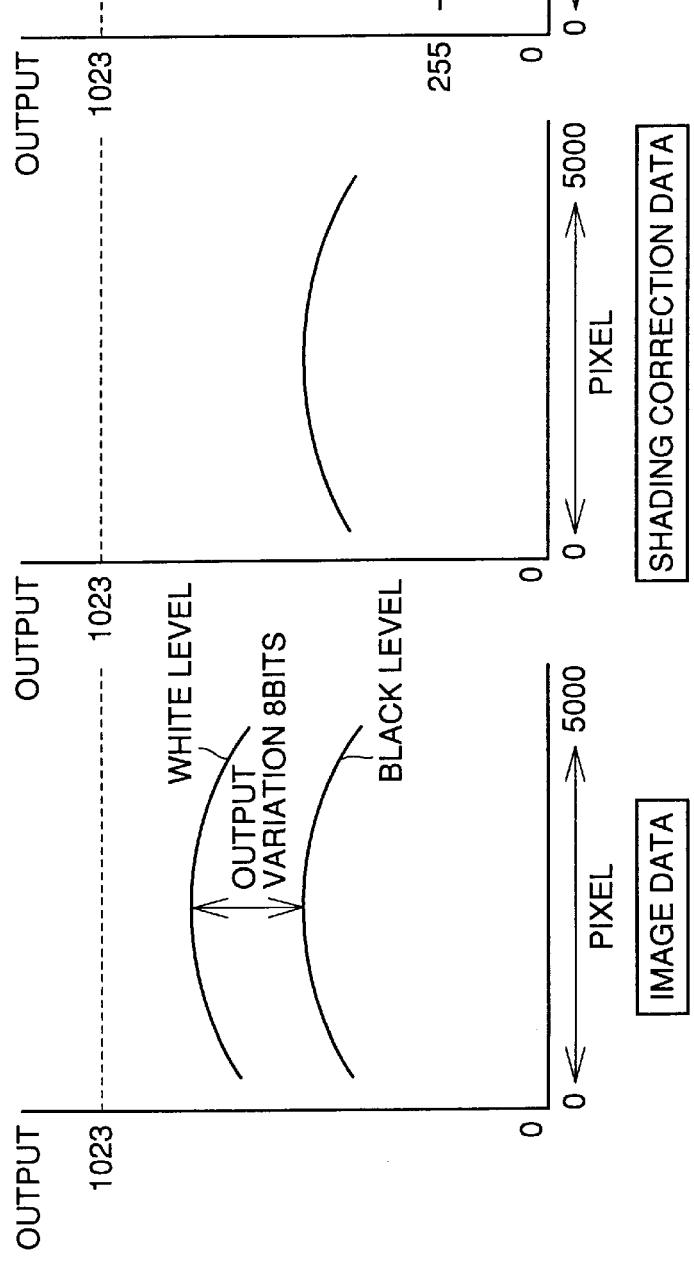

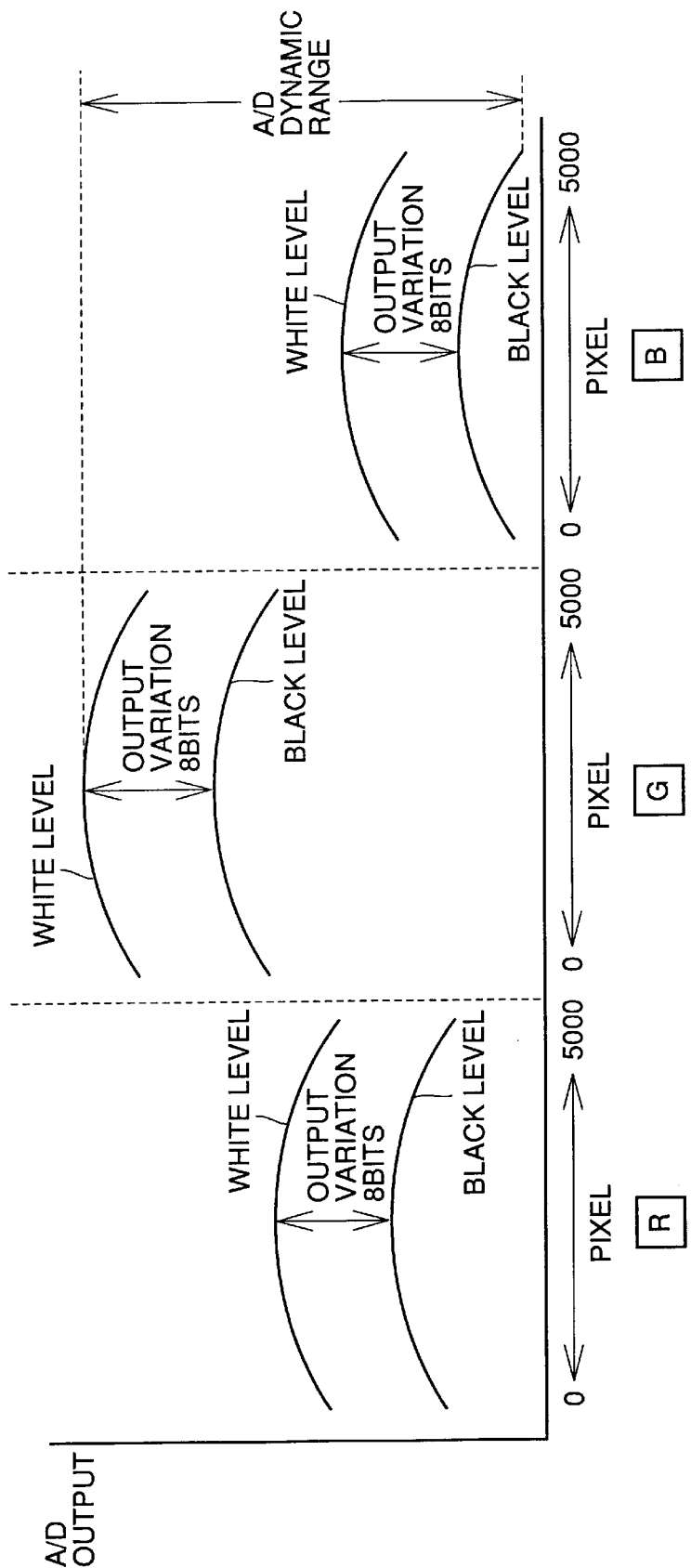

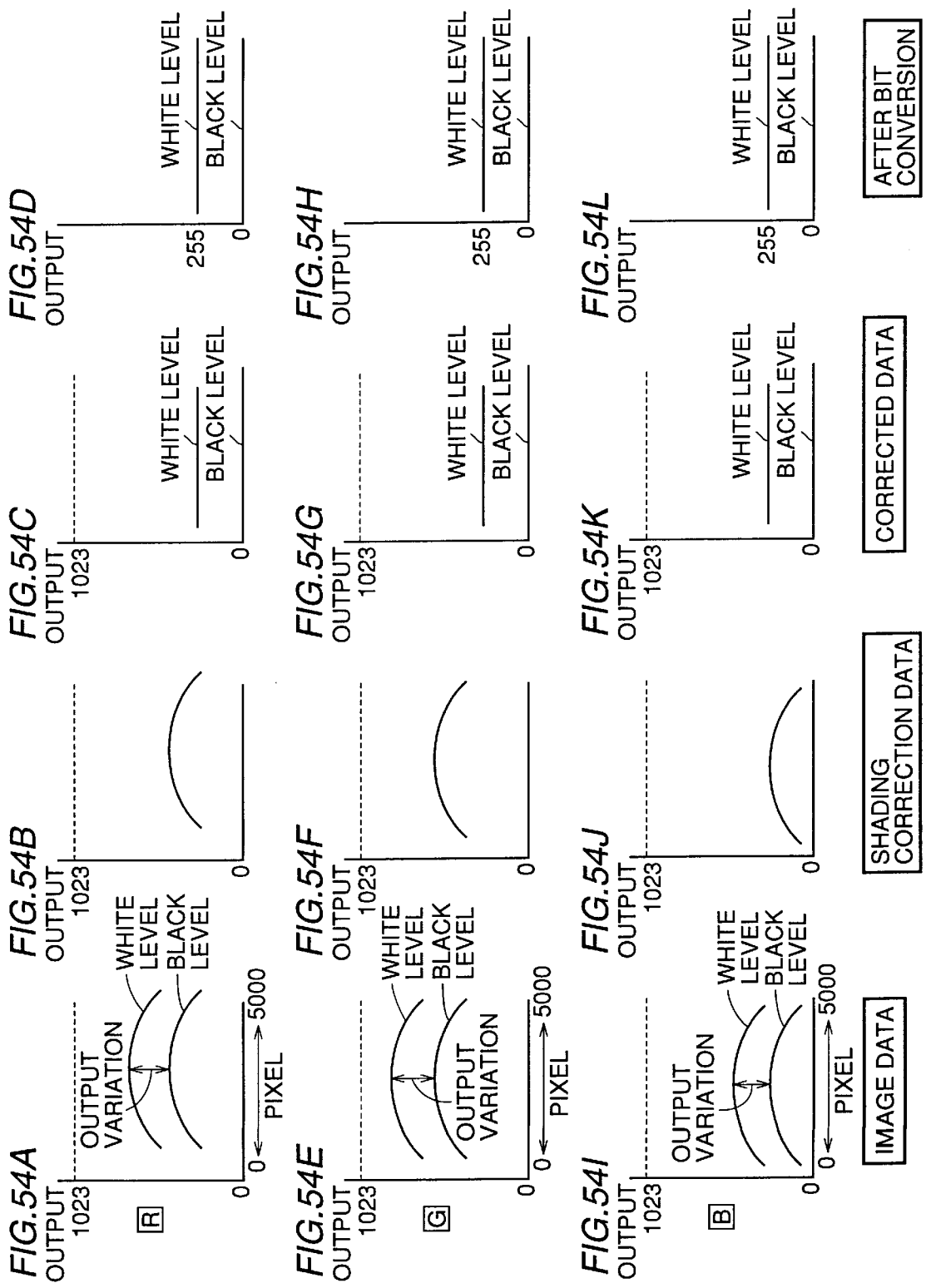

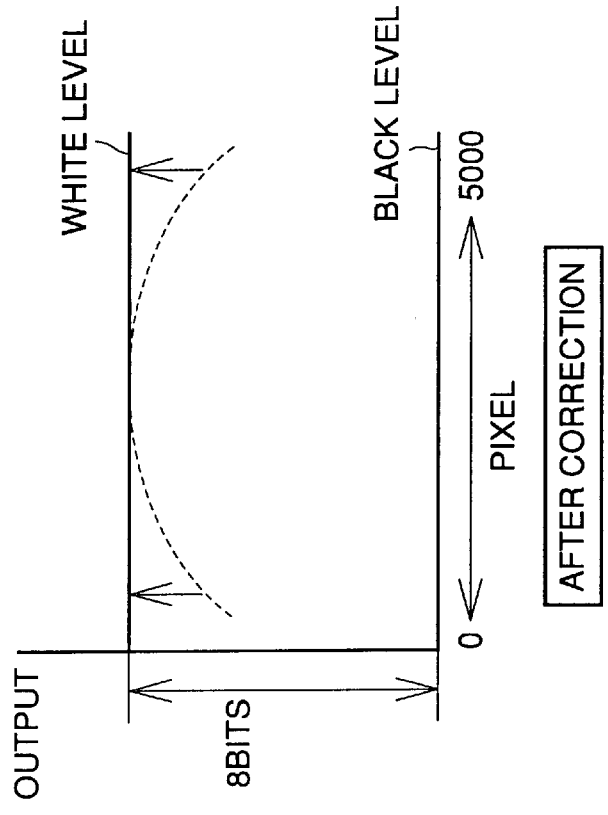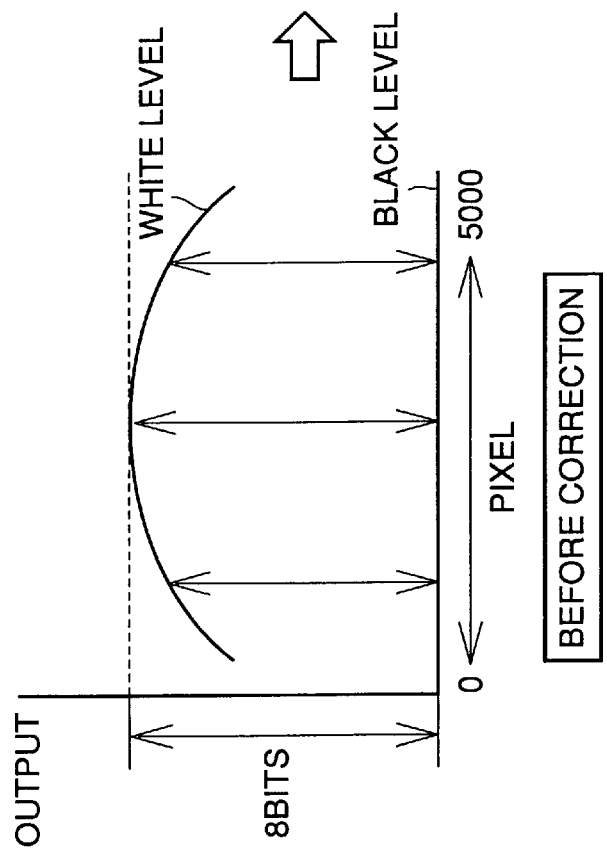

IMAGE READING APPARATUS

IMAGE READING APPARATUS

This application is based on Japanese Patent Application Nos. 9-071821, 9-071822 and 9-138515 filed in Japan, the contents of which are hereby incorporated by reference.

BACKGROUND OF THE INVENTION

1. Field of the Invention

The present invention relates to an image reading apparatus and, more specifically, to an image reading apparatus used for a digital copying machine or the like.

2. Description of the Related Art

When a bound original such as a book (hereinafter referred to as a book original) is copied, sometimes there is a shade at a central portion. Therefore, in a conventional image reading apparatus, a method has been proposed in which a shade region at the central portion of the book original image is detected, and a threshold value for binarization is switched so as to eliminate fogging of the background.

The above described conventional method of switching the threshold value for binarization is effective when the original is a text original in which image data are dominantly white or black. However, an image data having halftone gradation such as in the case of a photo original cannot be reproduced clearly.

Various methods for zooming (changing magnification of) a read image have been proposed in conventional image reading apparatuses.

For example, Japanese Patent Laying-Open No. 7-273979 discloses a method of zooming a read image by changing speed of scanning. Japanese Patent Laying-Open No. 6-134451 discloses a method of zooming an image by approximation, by interpolating read data in equal magnification. Further, a method of zooming a read image by switching line period for reading and by correcting variation in sensor output derived from variation in time of storage by means of a circuit gain has been generally known.

However, of the conventional methods of zooming read image, the method of changing scanning speed leads to increased cost and complicated control, since the accuracy in scanning must be improved for switching the scanning speed. In the method of zooming an image by approximation by interpolation of read data in equal magnification, zooming is after all an approximation since data is interpolated by image processing, inevitably causing degradation in image quality. Further, in the method of switching line period for reading and correcting variation of sensor outputs derived from the variation in time of storage using a circuit gain, lowering of the sensor output when the time of storage reduces is corrected by circuit gain, resulting in degraded image quality.

In a conventional image reading apparatus, canceling in the number of bits in calculation occurs in image processing of a subsequent stage, and therefore, CCD outputs are A/D converted with the number of bits set larger than necessary, and after image processing, lower bits of the data are discarded.

However, in the conventional method of discarding lower bits of data after image processing, though rounding error in calculation (multiplication and division) can be canceled, quantization error between peak and other portions of light intensity occurs, due to difference in sensor outputs caused by light distribution variation of the light source, for example.

SUMMARY OF THE INVENTION

An object of the present invention is to provide an image reading apparatus capable of accurately reproducing a read image by correcting variation of read data derived from variations in light distribution, sensitivity and so on, using reading means capable of logarithmic conversion. More specifically, an object of the present invention is to provide an image reading apparatus which can solve the above described problems and provide satisfactory image reproduction even when there is a shade in an original image having halftone gradation.

A still further object of the present invention is to provide an image reading apparatus which can solve the above described problems and prevent degradation of image quality even when electrical magnification is performed, by fixing scanning speed.

A still further object of the present invention is to provide an image reading apparatus which can solve the above described problems and perform A/D conversion with one same resolution even when output level varies because of variations in light distribution of a light source, sensitivity difference of sensors and so on.

According to one aspect of the present invention, an image reading apparatus is provided. The image reading apparatus includes means for correcting variation in read data caused by insufficient light intensity at a shade region of an original. More specifically, the present invention is directed to an image reading apparatus including:

- image signal taking means for receiving as an input, light from an original, and outputting a logarithmically converted analog image signal;
- an AD converter for converting the output analog image signal to a digital image signal;
- shade region detecting means for detecting the shade region of said original, based on the digital image signal; and
- image signal correcting means for correcting level of the digital image signal of the shade region, by comparing a digital image signal of a region other than the shade region and the digital image signal of the shade region.

In the image reading apparatus in accordance with this one aspect of the present invention, preferably, the image signal correcting means calculates difference between the digital image signal of the region other than the shade region and the digital image signal of the shade region, and shifts the level of the digital image signal of the shade region based on the calculated difference.

In the image reading apparatus in accordance with the aforementioned one aspect of the present invention, preferably, the image signal taking means includes an LOG CCD (logarithmic compression output image sensor).

In the image reading apparatus in accordance with the aforementioned one aspect, preferably, the AD converter performs AD conversion with the number of bits set to be wider than a necessary dynamic range.

The image reading apparatus in accordance with the above described one aspect may further include a bit converting means for converting the digital image signal corrected by the image signal correcting means to a signal of a necessary bit number, by discarding upper bits.

The image reading apparatus in accordance with the above described one aspect may further include shading correcting means for correcting the digital image signal based on a reference data obtained by reading a reference plate, and correction by the image signal correcting means is performed at the time of shading correction.

In the image reading apparatus in accordance with the above described one aspect, the shade region detecting means stores at least one line of monitor image data obtained by reading the original, and detects the shade region based on the monitor image data.

In the image reading apparatus in accordance with the above described one aspect, preferably, the shade region detecting means detects the shade region based on an image signal obtained by reading a portion inner by a prescribed distance from an edge of the original.

In accordance with another aspect, the present invention provides an image reading apparatus including:

image signal taking means for receiving as an input, light from an original and outputting a photoelectrically converted analog image signal;

an AD converter for converting the output analog image signal to a digital image signal;

shade region detecting means for detecting a shade region of the original based on the digital image signal, where light intensity received by the image taking means from the original is small;

shading reference data setting means for setting a first reference data for a region other than the shade region of the original, and setting a second reference data different from the first reference data for the shade region of the original; and shading correction means for correcting the digital image signal of the region other than the shade region based on the first reference data, and correcting the digital image data of the shade region based on the second reference data.

According to a still further aspect, the present invention provides an image reading apparatus including means for correcting variation of read data resulting from insufficient light intensity at the time of zooming. More specifically, the image reading apparatus includes:

image signal taking means for receiving as an input, light from an original and outputting a logarithmically converted analog image signal;

an AD converter for converting the output analog image signal to a digital image signal;

reading magnification setting means for setting reading magnification of the original;

reading line period changing means for changing line period of reading in subscanning direction, in accordance with the set magnification of reading; and image signal correcting means providing reference data of white level data or black level data by reading a reference plate with the changed line period for reading, and correcting the digital image signal based on the reference data.

In the image reading apparatus in accordance with the aforementioned still another aspect, preferably, the image signal correcting means shifts the level of the digital image signal by subtracting the reference data from the digital image signal.

In the image reading apparatus in accordance with the aforementioned still another aspect, preferably, the image signal taking means includes an LOG CCD (logarithmic compression output image sensor).

In the image reading apparatus in accordance with the aforementioned still another aspect, preferably, the AD converter performs AD conversion with the number of bits set wider than a necessary dynamic range.

The image reading apparatus in accordance with the aforementioned still another aspect may further include bit converting means for converting the digital image signal corrected by the image signal correcting means to a signal of a necessary bit number by discarding upper bits.

The image reading apparatus in accordance with the aforementioned still another aspect may further include a scan speed changing means for changing speed of scanning in accordance with the set magnification, and when the line period for reading based on the set magnification exceeds a limit, the scan speed is changed.

The image reading apparatus in accordance with the aforementioned still another aspect may further include a scan speed changing means for changing speed of scanning in accordance with the set magnification, and when the speed of scanning based on the set magnification exceeds a limit, the line period for reading is changed.

The image reading apparatus in accordance with the aforementioned still another aspect may further include a high resolution mode setting means for setting a high resolution mode in which the original is read with a high resolution than usual, and the read line period changing means sets, when the high resolution mode is set, a predetermined line period for reading which is shorter than usual.

In the image reading apparatus in accordance with the aforementioned still another aspect, preferably, a pixel clock in main scanning direction is changed in accordance with the change of the line period for reading.

In accordance with a still further aspect, an image reading apparatus is provided which includes means for correcting variation in read data resulting from variation in light distribution, sensitivity of photoreception and types of originals. More specifically, the image reading apparatus includes:

image signal taking means for receiving as an input light from an original and outputting a logarithmically converted analog image signal;

an AD converter for converting the output analog image signal to a digital image signal having larger number of bits than necessary number of bits;

shading correction means for correcting the digital image signal based on a reference data, for correcting variation in light distribution of a light source and variation in sensitivity of sensors; and bit number converting means for converting the corrected digital image signal to a signal of a necessary bit number by discarding upper bits.

In the image reading apparatus in accordance with the aforementioned still further aspect, preferably, the shading correction means shifts level of the digital image signal at the time of correction.

In the image reading apparatus in accordance with the aforementioned still further aspect, preferably, the number of bits at the AD conversion by the AD converter is set in accordance with the amount of variation in output of the analog image signal output from the image signal taking means.

In the image reading apparatus in accordance with the aforementioned still further aspect, preferably, the number of bits at the time of conversion by the AD converter is set in accordance with a dynamic range which changes dependent on the type of the original.

In the image reading apparatus in accordance with the aforementioned still further aspect, preferably, the image signal taking means includes an LOG CCD (logarithmic compression output image sensor).

In accordance with a still further aspect of the present invention, an image reading apparatus is provided which includes:

image signal taking means for receiving as an input light from an original, performing color separation of the light into three primary colors of R, G and B, and outputting logarithmically converted analog image signals of respective colors;

an AD converter for converting the output analog image signals of respective colors to digital image signals of respective colors having larger number of bits than the necessary number of bits;

shading correction means for correcting the digital image signals of respective colors based on reference data, for correcting variation in light distribution of a light source and variation of sensitivity of sensors; and bit number converting means for converting the corrected digital image signals of respective colors to signals of necessary numbers of bits by discarding upper bits.

In the image reading apparatus in accordance with the aforementioned still further aspect, preferably, the shading correction means shifts levels of the digital image signals of respective colors, and thereby corrects level difference between the analog image signals of respective colors.

In the image reading apparatus in accordance with the aforementioned still further aspect, preferably, the number of bits at the time of conversion by the AD converter is set in accordance with a dynamic range of the analog image signals of respective colors output from the image signal taking means.

In the image reading apparatus in accordance with the aforementioned still further aspect, preferably, the number of bits at the time of conversion by the AD converter is set in accordance with the maximum value and minimum value of the analog image signals of respective colors output from the image signal taking means.

In the image reading apparatus in accordance with the aforementioned still further aspect, preferably, the image signal taking means includes an LOG CCD (logarithmic compression output image sensor).

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 51A to 51C show flow of image data processing in the image reading apparatus in accordance with the present invention employing the LOG CCD shown in FIG. 49.

FIGS. 53A to 53C show outputs of read image data of the image reading apparatus in accordance with the present invention employing a color LOG CCD shown in FIG. 52.

FIGS. 54A to 54L show flow of image processing of an original image read by an example of the present invention employing the color LOG CCD shown in FIG. 52.

FIGS. 56A and 56B are illustrations related to image data resolution at the time of shading correction in a conventional image reading apparatus.

DESCRIPTION OF THE PREFERRED EMBODIMENTS

Figure 1:
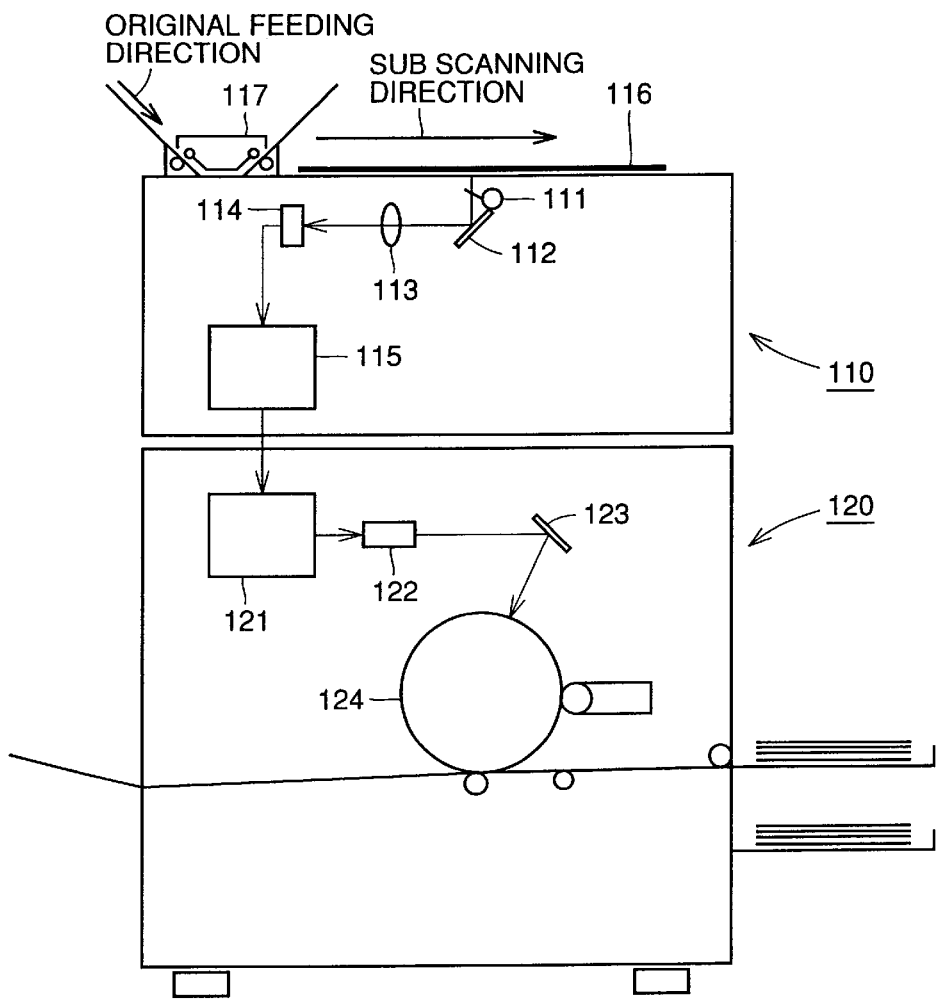
FIG. 1 shows an exemplary configuration of a digital copying machine employing an image reading apparatus in accordance with the present invention.

FIG. 1 shows an exemplary configuration of a digital copying machine employing an image reading apparatus in accordance with the present invention.

Referring to FIG. 1, the digital copying machine includes an image reading apparatus 110 at an upper portion and an image recording apparatus 120 at a lower portion. The image reading apparatus 110 includes a manually fed original reading apparatus 116 and an original feeding apparatus 117.

In image reading apparatus 110, using a reduction optical system, an original is irradiated with light from a light source 111, light reflected from the surface of the original is passed through a mirror 112 and a lens 113 to be imaged on a line of CCDs, and photoelectrically converted analog electric signals are obtained. Resolution of the CCD is 400 dpi, and maximum original size is A3 (1 line: about 5000 DOTs).

The analog electric signals are converted to digital data in an image processing unit 115, subjected to image processing such as zooming and image quality correction, and output as digital data from image reading apparatus 110. Assuming that scanning direction of the CCD 114 on a line is a main scanning direction and a direction perpendicular thereto is a subscanning direction, a manually fed original is scanned by CCD 114 in the main scanning direction and scanned by horizontal movement of the mirror in subscanning direction. An automatically fed original is scanned by CCD 114 in the main scanning direction, and scanned in subscanning direction by feeding of the original. Therefore, image signals are successively transferred line by line in the main scanning direction.

In image recording apparatus 120, digital image data output from image reading apparatus 110 are converted to analog electric signals by a laser diode driving unit 121, the signals are converted to light beams by a laser light source 122, which light beams are imaged on a photoreceptor drum 124 through a polygon mirror 123. By controlling light intensity of the image on photoreceptor drum 124 by controlling current input to the laser light source 122 pixel by pixel, the amount of adhered toner on the image is controlled, and the image is reproduced as an image having a density of 400 dpi and 256 tones, by electrophotography.

In the present embodiment, the light reflected from the original is guided to CCD 114. In case of a transparent original such as a film original, the transparent original may be irradiated with light from light source 111, and the transmitted light may be imaged on CCD 114.

Figure 2:
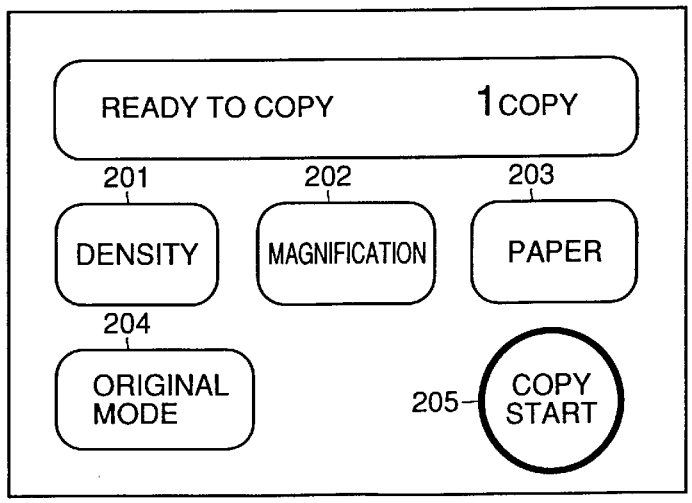
FIG. 2 shows a panel screen for setting an original mode.

FIG. 2 shows a panel screen for s et ting an original mode in the copying machine.

Referring to FIG. 2, when taking a copy, first, an original is set on a platen, original density, zooming ratio (magnification), and original size are set by using an original density setting g key 201, a zoom ratio setting key 202 and original size setting key 203, respectively, and dependent on the type of the original, original mode is switched between a photo original and a text original. After the panel screen is switched by pressing an original mode switching key 204 on the panel a s described above, switching of original mode is performed in the following manner.

Figure 3:
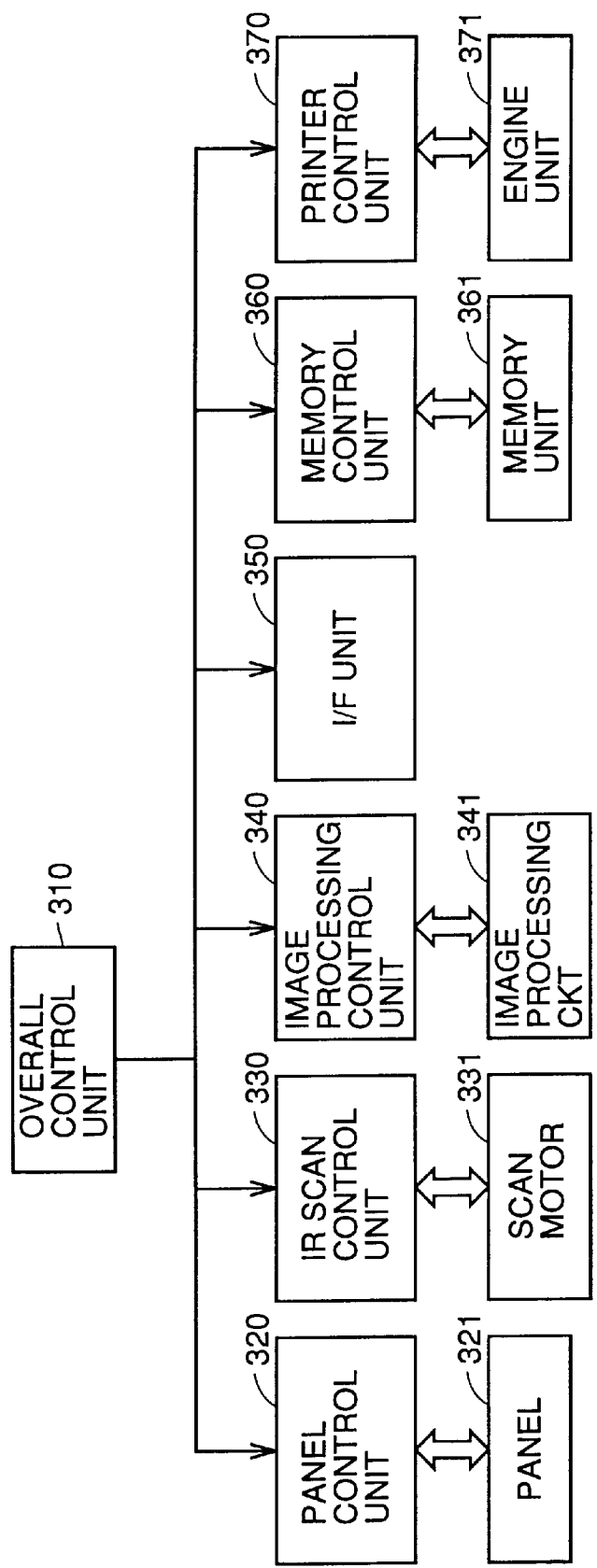
FIG. 3 is a block diagram related to overall control of the copying machine.

FIG. 3 is a block diagram showing an overall control of the copying machine.

Referring to FIG. 3, a panel control unit 320 controls panel 321, that is, provides panel display as described above and I/F at the time of key input.

An IR scan control unit 330 controls a scan motor 331 upon detection of pressing of a copy key at the panel unit, and starts scanning operation. Thereafter, while the original is scanned, image is read by an instruction from an image processing control unit 340, and a prescribed image processing is performed at an image processing circuit 341. The image-processed data is output to an external equipment through an I/F unit 350 or stored in a memory unit 361.

Control at this time is performed by a memory control unit 360. The image data once stored in the memory is transmitted to an engine unit 371, and printed in accordance with an instruction from a printer control unit 370.

These series of operations are controlled by overall control unit 310.

First Embodiment

Figure 4:
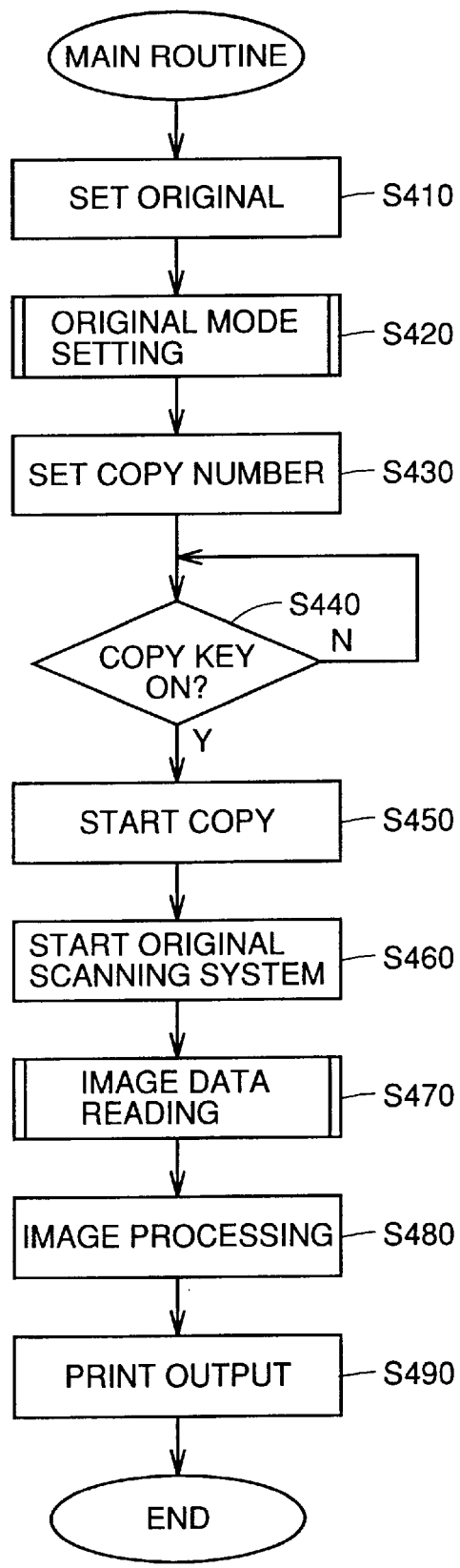
FIG. 4 is a flow chart showing an exemplary operation of a copying machine having a general mode switching function.

FIG. 4 is a flow chart showing an example of operation of the copying machine in accordance with the present invention having a general mode switching function.

Referring to FIG. 4, first, an original is set on a platen (S410), and an original mode is set (S420). More specifically, when an original to be copied is a photo image, then the mode is switched to "photo mode", and if the original is text original, "text mode" is set.

Thereafter, the number of copies is set (S430). Here, it is assumed that other conditions such as paper size and original density are automatically set by the copying machine. If necessary, such conditions may be set manually.

After setting, a copy start key is pressed (S440), and copying operation starts (S450). Original scanning system starts its operation (S460) of reading image data while scanning (S470), and the read image data is processed in the image processing circuit (S480). The resulting image-processed data is transmitted to an image output apparatus, where the data is printed and output (S490).

Figure 5:
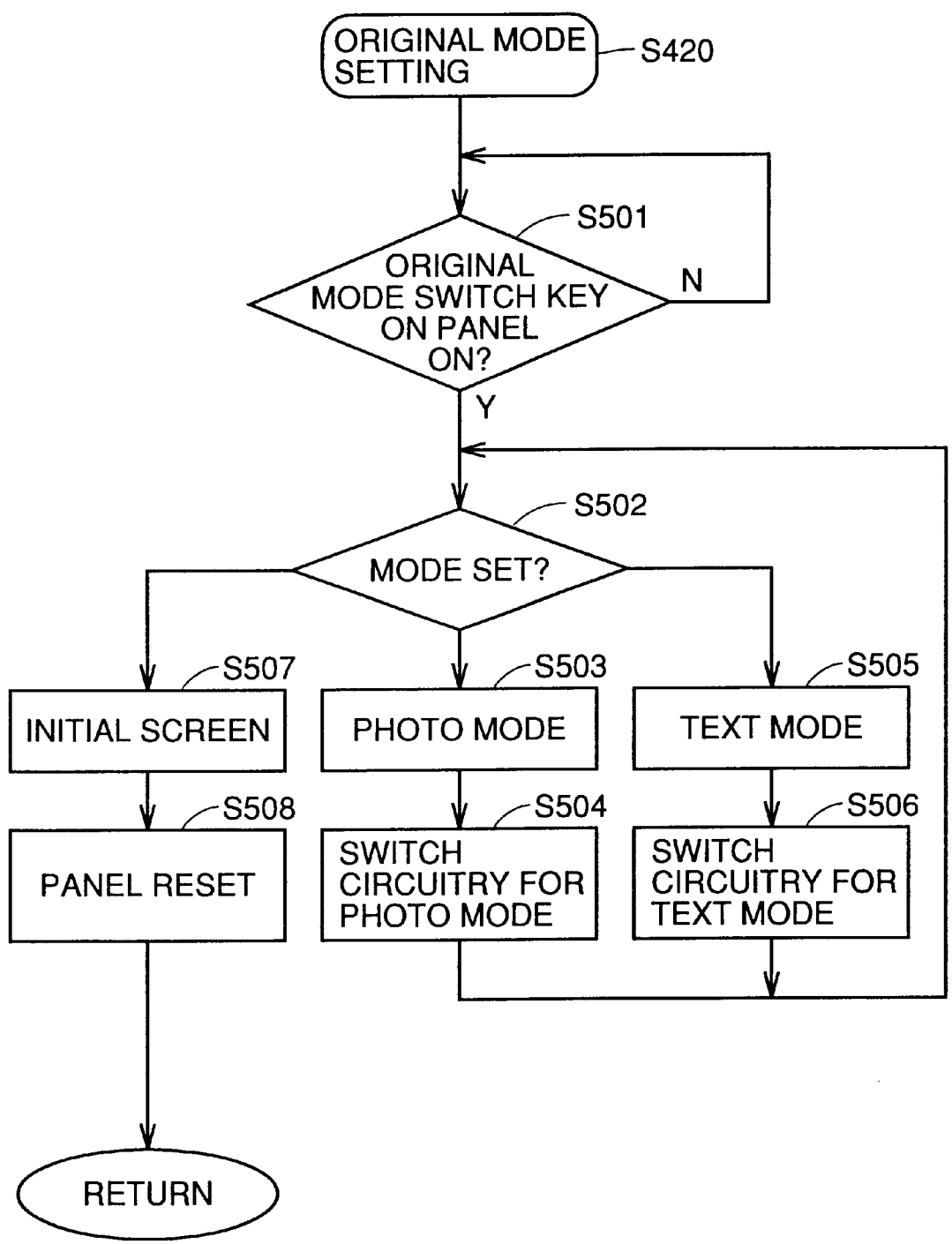
FIG. 5 is a flow chart showing an operation related to an original mode setting, which is one of the subroutines of the main routine shown in FIG. 2.

FIG. 5 is a flow chart showing an operation related to setting of the original mode, which is one of the subroutines of the main routine shown in FIG. 4.

Referring to FIG. 5, first, whether the original mode switch key on the panel is pressed or not is determined (S501)

When the original mode switch key is pressed, a panel screen shown in FIG. 6, which will be described later, appears. By pressing either a "photo" selection key 606 or "text" selection key 607 dependent on the type of the original, the original mode is set (S502).

When the "photo" selection key is pressed, the photo mode is selected (S503), and the circuitry is switched for the photo mode (S504). When "text" selection key is pressed, the text mode is selected (S505), and the circuitry is switched for the text mode (S506).

Figure 6:
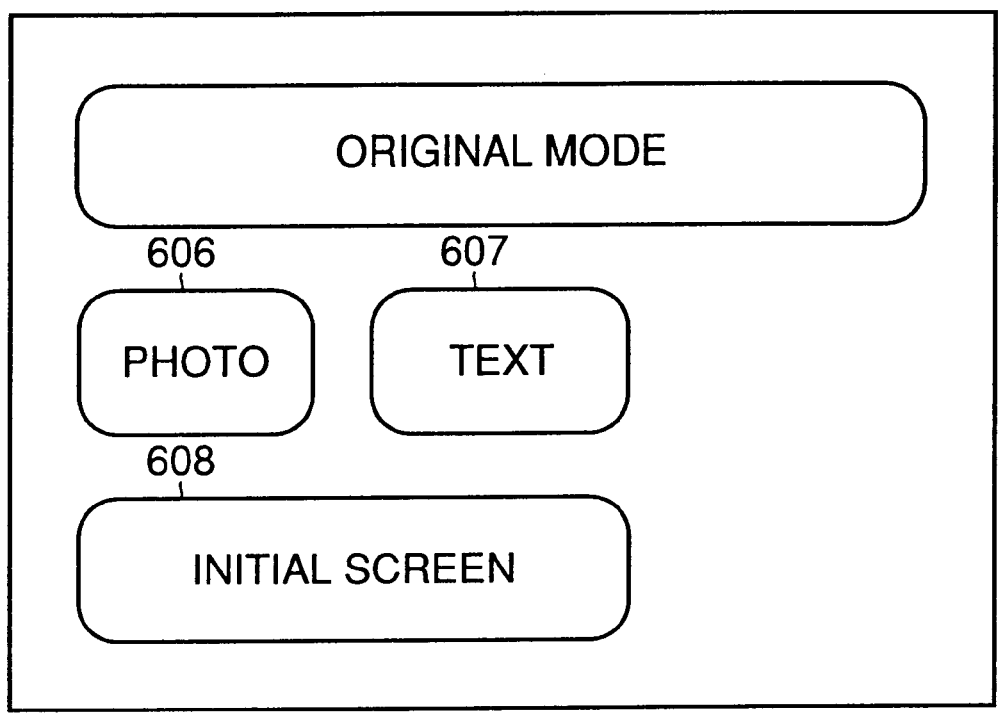
FIG. 6 shows a panel screen switched to an original mode.

After setting the original mode, by pressing "initial screen" key on the panel screen shown in FIG. 6, the display is returned to the initial screen (S507), and the panel is reset (S508).

FIG. 6 shows the panel screen switched to the original mode.

Referring to FIG. 6, when the panel screen is switched to the original mode, either "photo" selection key 606 or "text" selection key 607 is pressed dependent on the type of the original, and after setting the original mode in this manner, when "initial screen" key 608 is pressed, the display returns to the initial screen shown in FIG. 2. After the number of copies is set by a ten key, not shown, a copy start key 205 is pressed, and thus copying operation starts.

Figure 7:
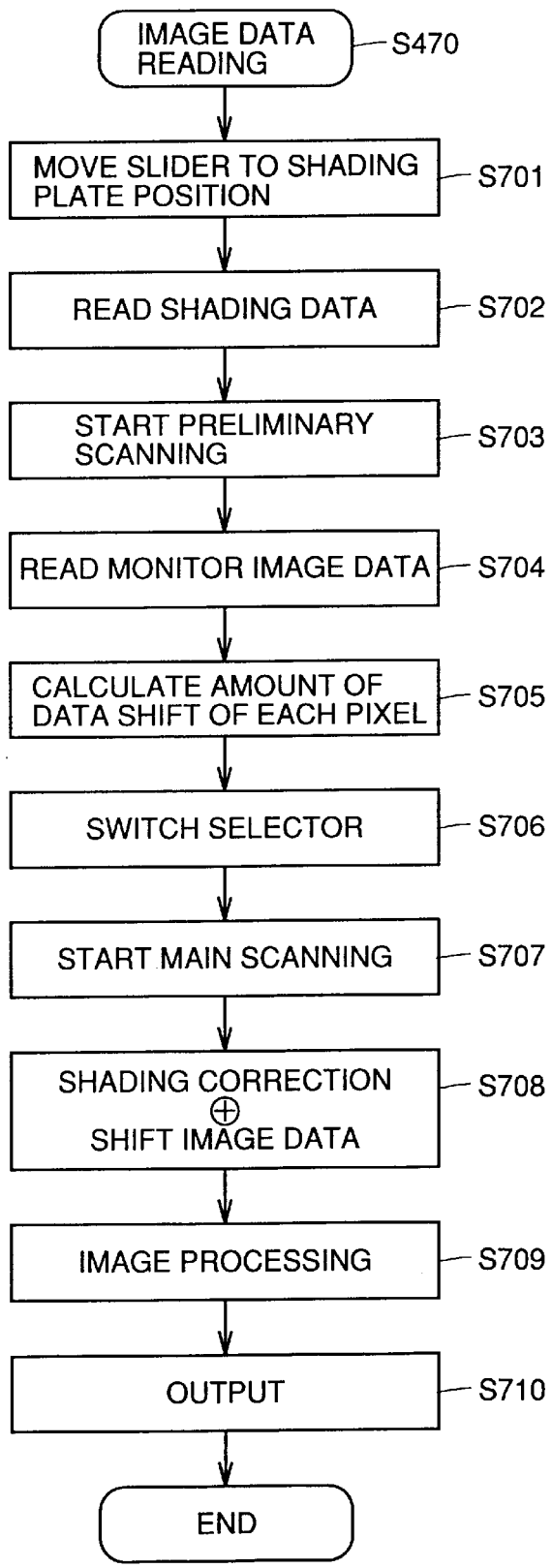
FIG. 7 is a flow chart showing an example of a flow of processing in reading an image by the image reading apparatus in accordance with the present invention.

FIG. 7 is a flow chart showing an example of a flow of processing in image reading, by the image reading apparatus in accordance with the present invention.

Referring to FIG. 7, first, a slider is moved to a position of a shading correction plate (S701), to obtain shading data (S702). Thereafter, the obtained data is stored in a line RAM, and preliminary scanning of the original starts (S703). Thereafter, data in a monitor region at a peripheral edge of the original image is taken (S704), and data shift amount of each pixel on the original is calculated (S705). Thereafter, the selector is switched (S706). Thereafter, main scanning starts (S707) and the original image is read. While the original image is read, shading correction and data shifting are performed simultaneously (S708), so as to correct the shade region of the original. Thereafter, a prescribed image processing is performed (S709) and the data is provided to a printer or the like (S710).

Figure 8:
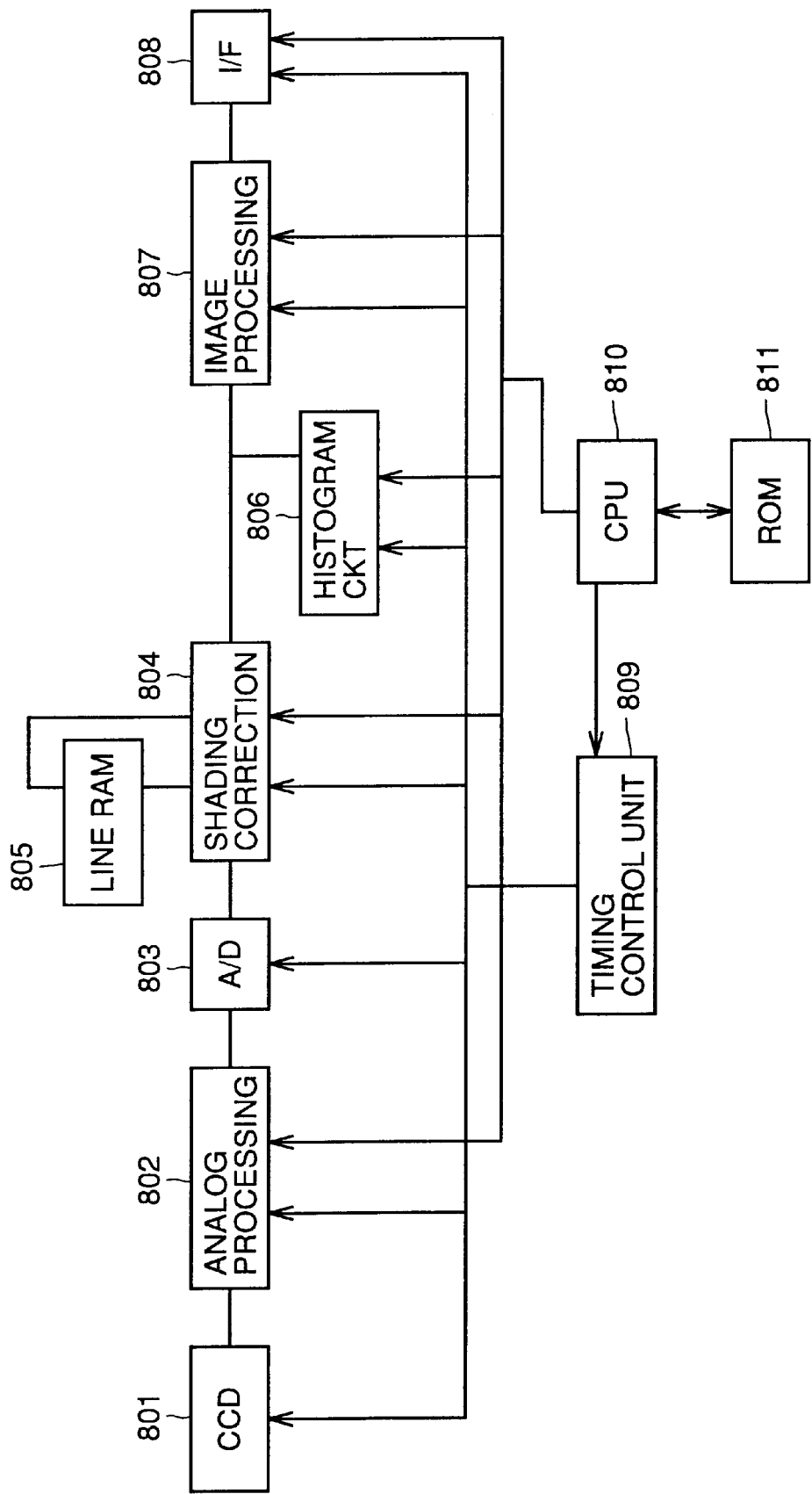
FIG. 8 is a block diagram of an image processing circuit of a conventional copying machine.

FIG. 8 is a block diagram of an image processing circuit of a conventional copying machine.

Referring to FIG. 8, the light reflected from the original enters CCD 801, where the light is subjected to photoelectric conversion to a voltage corresponding to the incident light intensity, and output. The analog image signal converted to an electrical signal is subjected to a prescribed processing by an analog processing circuit 802 such as a sample & hold circuit, a gain amplifier or a clamp circuit, and thereafter it is input to an AD conversion circuit 803 and converted to digital data.

The image data which has been converted to digital data is corrected by a shading correction circuit 804 so as to remove influence of variation in light distribution of the light source, variation in sensitivity between CCD pixels and so on. Data obtained when a reference plate is read previously is stored as correction data, in line RAM 805.

A histogram of the shading-corrected image data is generated in a histogram circuit 806, which histogram is processed in a CPU 810. The image data is further subjected to a prescribed image processing such as reflection-density conversion, edge emphasis or MTF (Modulator Transfer Function) correction by image processing circuit 807, and transferred to a print engine unit through an I/F unit 808.

Timing control of each processing circuit is governed by a timing control unit 809, while setting of data, execution of instructions and so on are controlled by CPU 810 and an ROM 811.

Figure 9A:
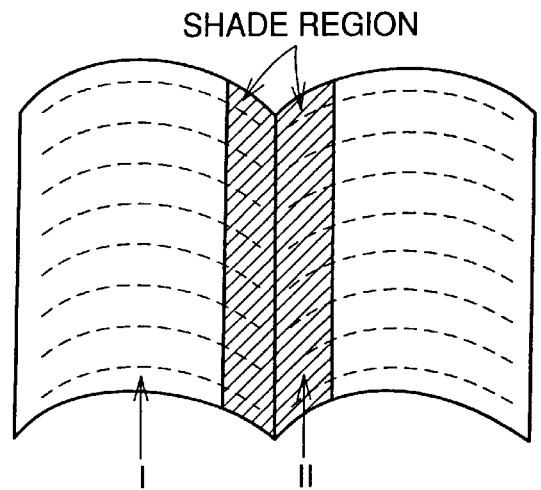
FIGS. 9A to 9C are illustrations related to a processing of a text original image by a conventional image reading apparatus.
Figure 9B:
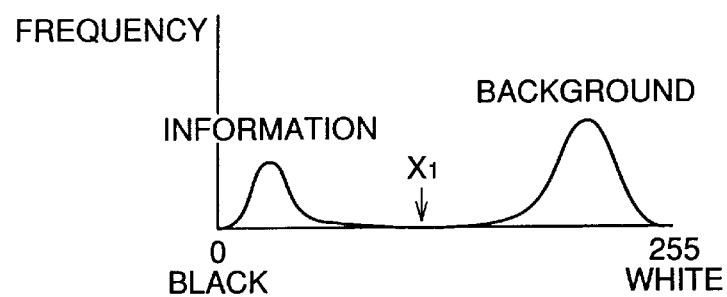
Figure 9C:
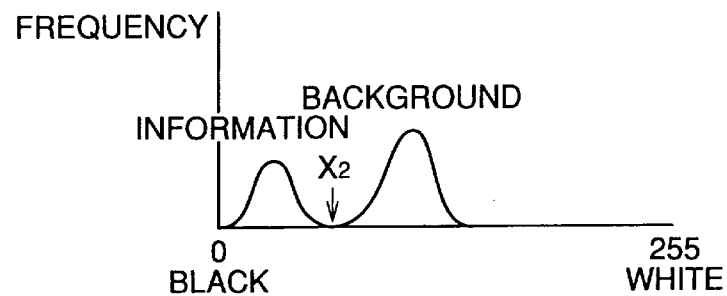

FIGS. 9A to 9C are illustrations related to processing of a text original image by a conventional image reading apparatus.

FIG. 9A shows a text original image with a shade region at the center, such as a book original. FIG. 9B shows a histogram of an image at a portion I other than the shade region of the text original image shown in FIG. 9A. FIG. 9C shows a histogram of the image at a portion II which corresponds to the shade region, of the text original image shown in FIG. 9A. In FIGS. 9B and 9C, the abscissa represents pixel data where the maximum value corresponding to black data is set to 0 and white data is set to 255, and the ordinate represents frequency (times) of generation of the image data.

Referring to FIG. 9B, in this example, the original is a text original, and therefore the histogram has such a shape that has two large peaks of white level corresponding to the background and the black level of the text information. Therefore, when the level of the threshold value for binarization is set to a value $X_1$ between the information data and background data, information can correctly be extracted.

Meanwhile, in the shade region, that is, the portion II, illuminance at the original is generally lower. Therefore, the histogram is as shown in FIG. 9C, where the background level is shifted from the white level to the gray level. In this case, however, when the level of the threshold value for binarization is set to $X_2$ between the information data and the background data, information can correctly be extracted.

The above described conventional processing, however, cannot be applied to image data having halftone gradation as in the case of a photo original, though the conventional method is applicable to image data of a text original where information is dominantly white or black.

Figure 10A:
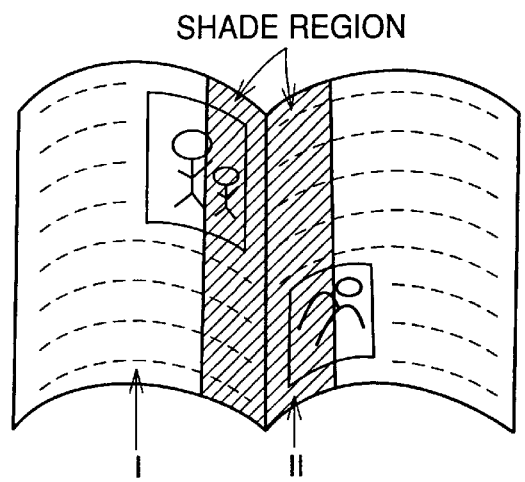
FIGS. 10A to 10C are illustrations related to a processing of a text-photo original image by a conventional image reading apparatus.
Figure 10B:
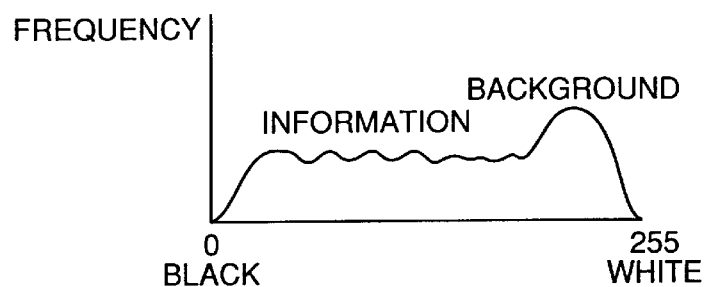
Figure 10C:
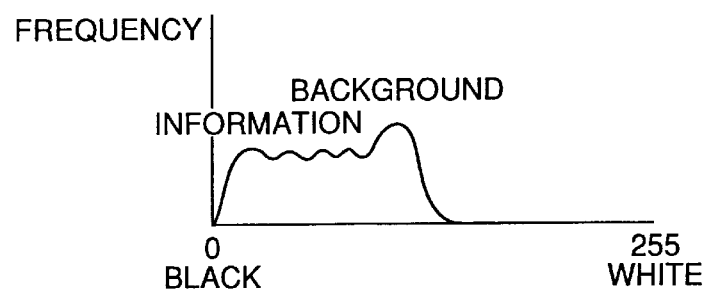

FIGS. 10A to 10C are illustrations related to processing of a text-photo original image by the conventional image reading apparatus.

FIG. 10A shows a text-photo original image with a shade region at the center, such as a book original. FIG. 10B shows a histogram of an image at a portion I other than the shade region of the textephoto original image shown in FIG. 10A. FIG. 10C shows a histogram of the image at a portion H which corresponds to the shade region, of the text-photo original image shown in FIG. 10A. In FIGS. 10B and 10C, the abscissa represents pixel data where the maximum value corresponding to black data is set to 0 and white data is set to 255, and the ordinate represents frequency (times) of generation of the image data.

Referring to FIG. 10B, in this example, the original contains both text and a photograph. Therefore, the histogram has such a shape that has data distributed uniformly over all the levels from the white level corresponding to the ground, through the halftone level corresponding to photo information and the black level corresponding to text information. In other words, it is necessary to reproduce halftone gradation and therefore data of all tones are necessary for the photo original.

Accordingly, when the original is a photo original, it is not possible to extract text information by setting the level of the threshold value for binarization between the information data and the background data, unlike in the text original.

Meanwhile, in the shade region, that is, portion U, the illuminance on the original is generally lower. Therefore, the shape is as shown in FIG. 10C where the background level is shifted from the white level to the gray level.

When the image data is output as it is, the resulting image would be dark and shady. Therefore, it is necessary to amplify the white level of the background of this portion to the white level obtained when there is not the shade region as shown in FIG. 10B. This causes lower S/N, resulting in unsatisfactory reproduction of the halftone gradation.

Figure 11:
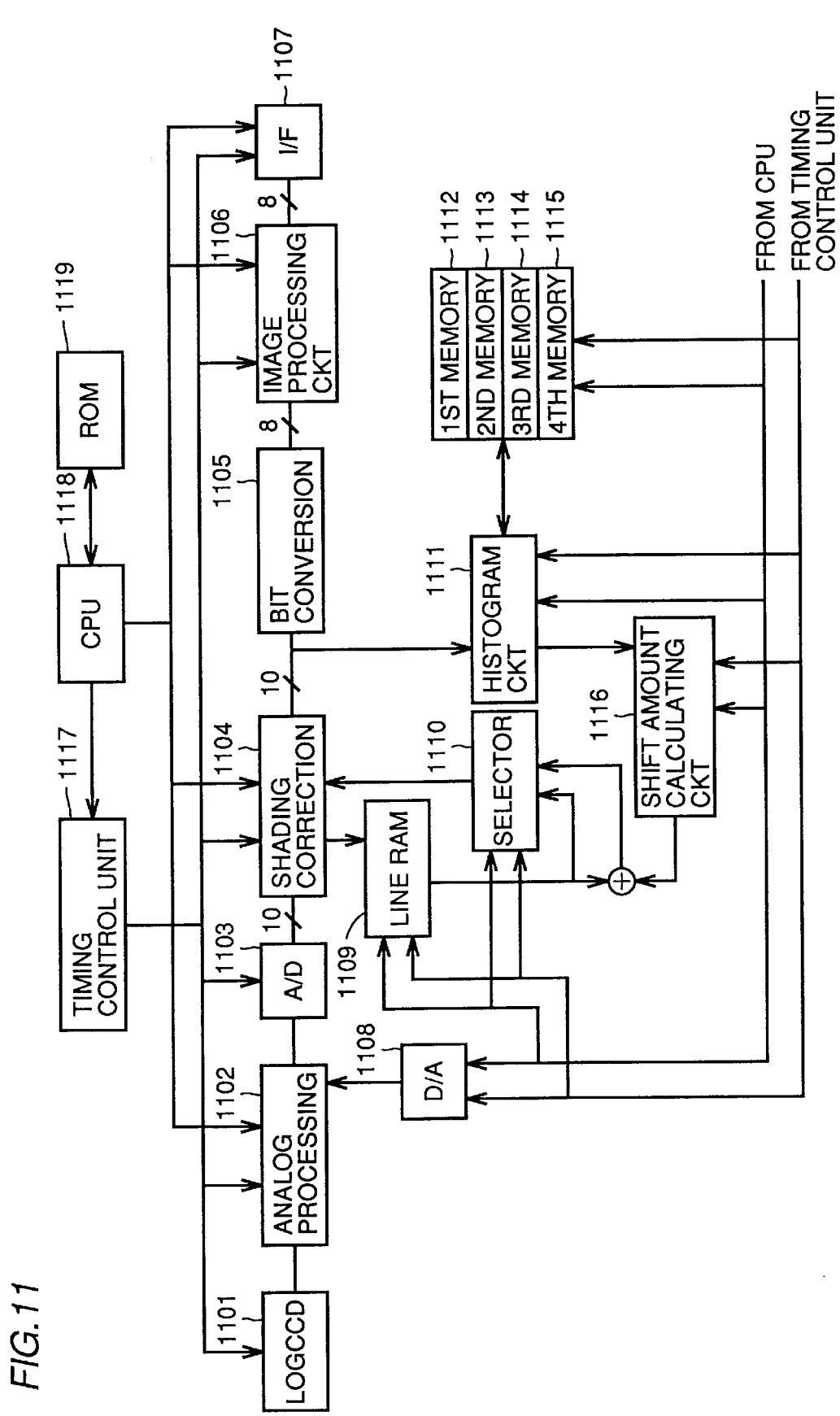
FIG. 11 is a block diagram showing an image processing circuit in an example of the image reading apparatus in accordance with the present invention.

FIG. 11 is a block diagram showing an image processing circuit as an example of the image reading apparatus in accordance with the present invention.

Here, a circuit employing a photoelectric conversion element LOG CCD (logarithmic compression output image sensor) will be described as an example. It may be possible to perform photoelectric conversion by a linear CCD, and analog signals may be subjected to logarithmic conversion.

The LOG CCD is an image sensor which logarithmically converts and outputs a photo current generated in accordance with the amount of incident light. Details of the image sensor is disclosed in U.S. Pat. No. 5,241,575, and therefore detailed description thereof is not repeated.

Referring to FIG. 11, the light reflected from the original enters LOG CCD 1101 and photoelectrically converted. The analog image signal converted to an electrical signal is subjected to a prescribed processing by an analog processing circuit 1102 such as a sample & hold circuit, a gain amplifier or a clamp circuit, input to AD converting circuit 1103, and converted to digital data. At this time, setting of the gain amplifier, clamp circuit or the like is performed by a DA converting circuit 1108 so that the output signal from LOG CCD output signal matches the necessary dynamic range of AD converting circuit 1103.

The image data which has been converted to digital data is corrected by a shading correction circuit 1104 so as to remove influence of variation in light distribution of the light source, variation in sensitivity between CCD pixels and so on. Data obtained when a reference plate is read previously is stored as correction data, in line RAM 1109.

A histogram of the shading corrected image data is generated by a histogram circuit 1111, and the histogram is processed by a CPU 1118. At this time, in preliminary scanning, histogram data of four lines positioned inner by a prescribed distance from four edges of the original are stored in first to fourth memories 1112, 1113, 1114 and 1115, as shown in FIG. 15, which will be described later.

Thereafter, an amount of data shift of respective portions are calculated by a shift amount calculating circuit 1116 based on respective histogram data, which calculated amount is added to the shading correction data stored in line RAM 1109, and subtracted from the read image data.

A selector 1110 switches whether shading correction only is to be performed or shade should be corrected by data shifting.

Thereafter, the image data is subjected to digital image processing such as reflection-density conversion, MTF correction, edge emphasis or the like by an image processing circuit 1106, and thereafter transferred to a print engine unit through an I/F unit 1107.

Here, the number of bits of the AD converting circuit is set at a larger value in advance so that the data should not be saturated even when the image data is shifted. Here, the number of bits is assumed to be 10 bits.

The image data after shading correction is converted to image data having necessary number of bits by a bit converting circuit 1105.

Timing control of respective processing circuits is governed by a timing control unit 1117, and execution of an instruction and so on are performed by a CPU 1118 and an ROM 1119.

Figure 12A:
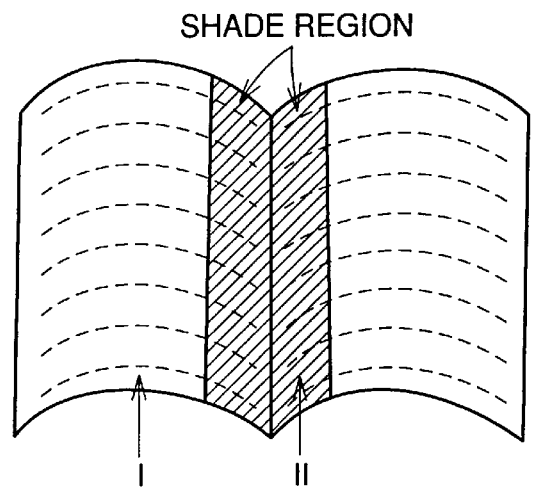
FIGS. 12A to 12C are illustrations related to processing of a text original image by an example of the image reading apparatus in accordance with the present invention.
Figure 12B:
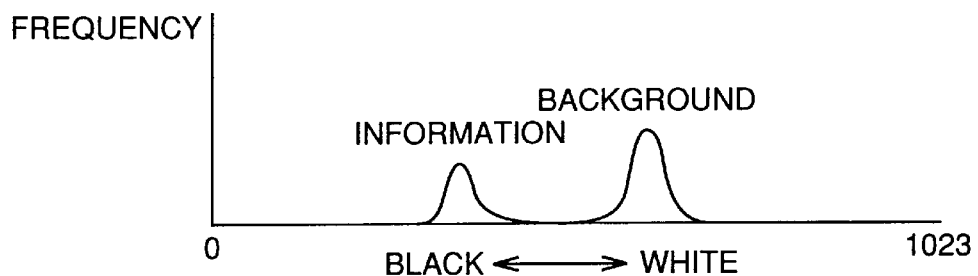
Figure 12C:
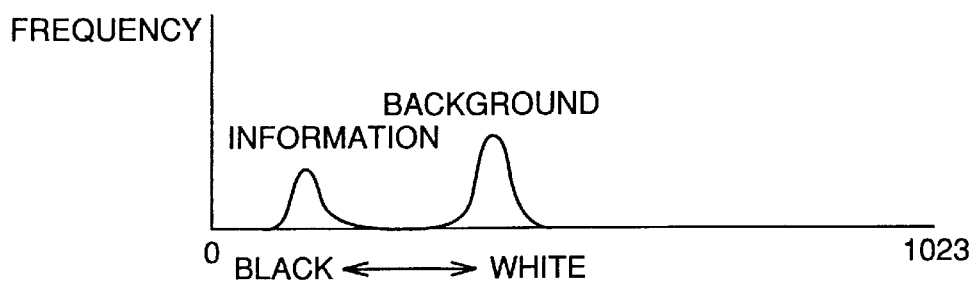

FIGS. 12A to 12C are illustrations related to processing of a text original image in accordance with an example of the image reading apparatus in accordance with the present invention.

FIG. 12A shows a text original image having a shade region at the center, such as a book original. FIG. 12B shows a histogram of the image at a portion I other than the shade region of the text original image shown in FIG. 12A. FIG. 12C shows a histogram of the image at a portion N corresponding to the shade region, of the text original image shown in FIG. 12A.

Referring to FIG. 12B, since the original is a text original in this example, the histogram has such a shape that has two large peaks corresponding to the white level of the background and the black level of the text information.

In the shade region, that is, portion A, the illuminance of the original is generally lower, however, the dynamic range from the white level corresponding to the background to the black level of the text information is not changed as shown in FIG. 12C, and the histogram has such a shape that is generally shifted to the side of the black level.

Figure 14B:
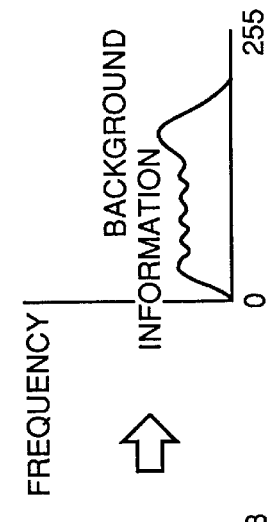
FIGS. 14A to 14C are illustrations showing an example of correction of a shade region in an original image by the image reading apparatus in accordance with the present invention.

Here, in the circuit in accordance with the present invention, AD conversion is performed with larger number of bits than necessary for a dynamic range in advance, so that the data should not be saturated even if the image data is shifted due to the variation in illuminance on the surface of the original, as described above. Therefore, data after shading correction comes to have the same data distribution when shifted, as shown in FIG. 14B, which will be described later, and therefore it is possible to obtain satisfactory image data without any influence of illuminance on the surface of the original caused by shade.

Figure 13A:
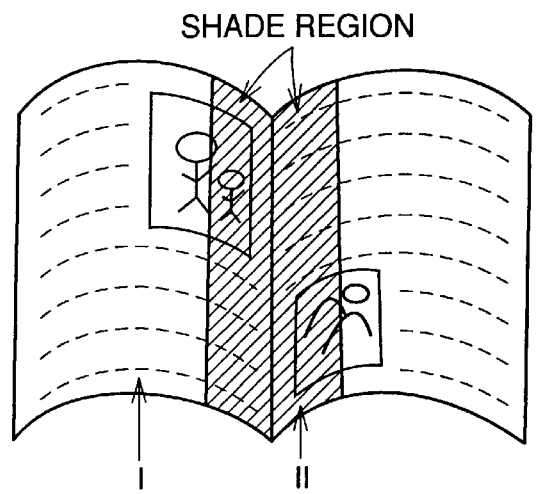
FIGS. 13A to 13C are illustrations related to processing of a text-photo original image by an example of the image reading apparatus in accordance with the present invention.
Figure 13B:
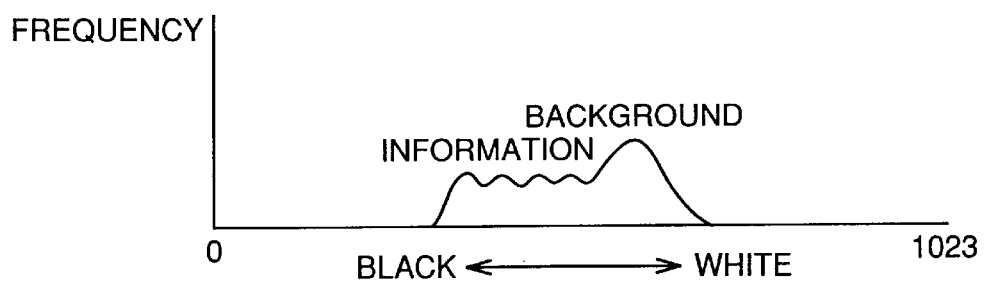
Figure 13C:
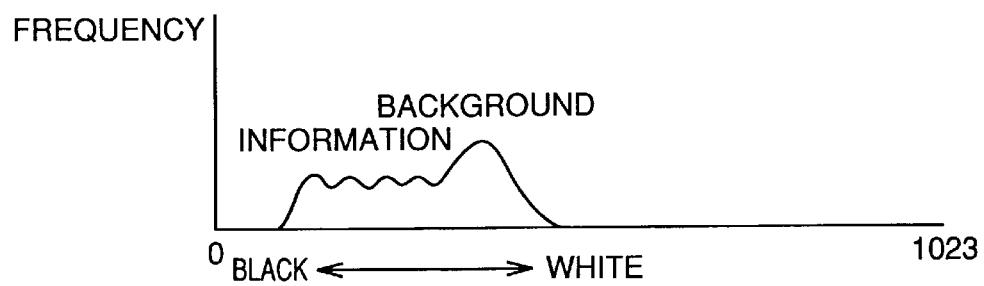

FIGS. 13A to 13C are illustrations related to processing of a text-photo original image by an example of the image reading apparatus in accordance with the present invention.

FIG. 13A shows a text-photo original image having a shade region at the center, such as a book original. FIG. 13B shows a histogram of the image at a portion I other than the shade region of the text-photo original image shown in FIG. 13A. FIG. 13C shows a histogram of the image at a portion II corresponding to the shade region, of the text-photo original image shown in FIG. 13A.

Referring to FIG. 13B, since the original contains both text and a photo in this example, the histogram has such a shape in that data is distributed uniformly over all levels starting from the white level corresponding to the background through the halftone level corresponding to the photo information to the black level corresponding to the text information.

In the shade region, that is, portion II, the illuminance of the original is generally lower, however, the dynamic range from the white level corresponding to the background to the black level of the text information is not changed as shown in FIG. 13C, and the histogram has such a shape that is generally shifted to the side of the black level.

Here, in the circuit in accordance with the present invention, AD conversion is performed with larger number of bits than necessary for a dynamic range in advance, so that the data should not be saturated even if the image data is shifted due to the variation in illuminance on the surface of the original, as described above. Therefore, data after shading correction comes to have the same data distribution when shifted, as shown in FIG. 14B, which will be described later, and therefore it is possible to obtain satisfactory image data without any influence of illuminance on the surface of the original caused by shade.

As described above, according to the present invention, even when an original image having a halftone gradation such as a photo original has a shade region, of which processing was difficult in the prior art method, satisfactory image can be reproduced without damaging tone reproduction characteristics.

Figure 14A:
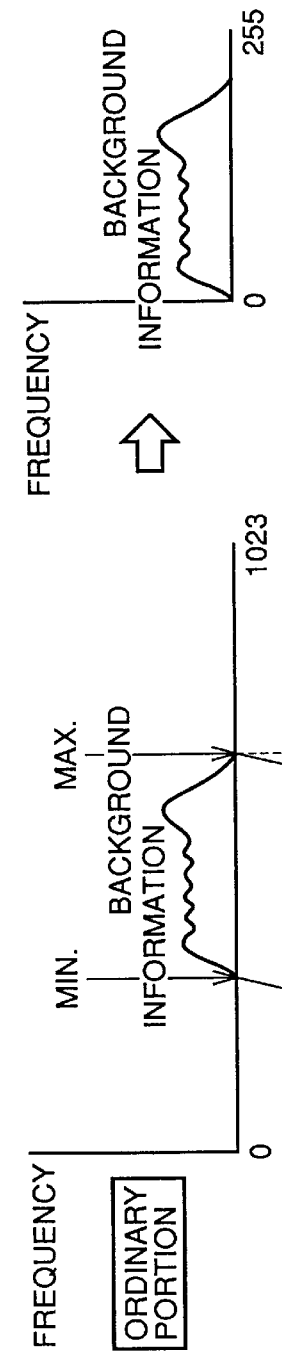
Figure 14C:
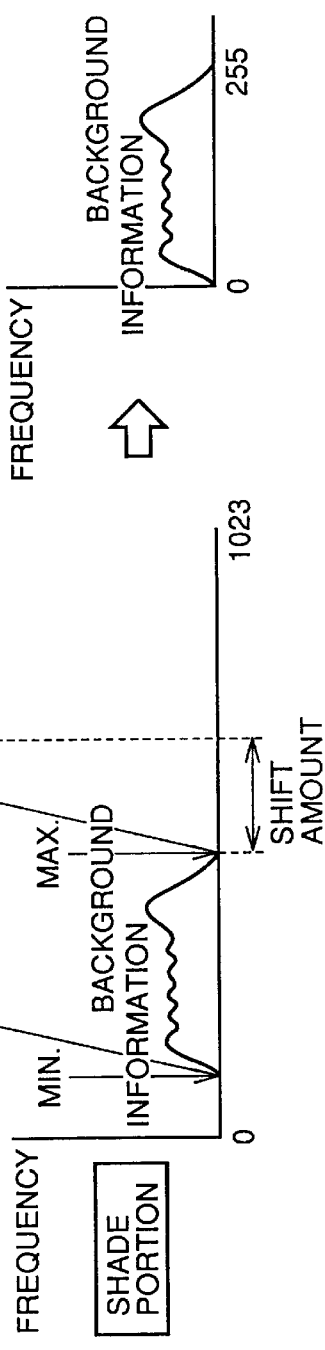

FIGS. 14A to 14C are illustrations showing an example of correction of the shade region of an original image, by the image reading apparatus in accordance with the present invention. Here, the histogram of the text•photo original shown in FIGS. 13A to 13C is shown as an example. Correction is performed in the similar manner on a text original and on a photo original.

FIG. 14A represents read image data before correction. The upper half shows the image data of an ordinary portion without any shade of the original, while the lower half represents image data of a shade region of the original, respectively.

FIGS. 14B and 14C represent read data of the image after shifting and shading correction. FIG. 14B represents image data of an ordinary portion without any shade on the original, while FIG. 14C shows image data of the shade region on the original, respectively.

By subtracting shading correction data from image data of the ordinary portion without any shade of the original shown in the upper half of FIG. 14A, the data is corrected to the data ranging from "0~255" including halftone data, as shown in FIG. 14B. In this example, data obtained by reading a blackboard, that is, the minimum value shown in the upper half of FIG. 14A, is used as the shading correction data.

The data of the shade region of the original given in the lower half of FIG. 14A is similar but shifted by a prescribed amount, as compared with ordinary portion without any shade given in the upper half of FIG. 14A.

At this time, when the shading correction data is subtracted from the image data of the shade region of the original represented in the lower half of FIG. 14A, the data is corrected to the data ranging from "0~255" including halftone data as shown in FIG. 14C, and the same data as that of the portion without any shade shown in FIG. 14B is obtained. In this example, the value obtained by subtracting the amount of data shift caused by the shade from the data obtained by reading the blackboard, that is, the minimum value shown in the lower half of FIG. 14A, is used as the shading correction data.

An example of a method of determining a shade region of the original by the image reading apparatus of the present invention will be described in the following.

FIGS. 15A to 15C, 16A to 16C and 17A to 17D are illustrations related to an example of the method of determining a shade region of the original in the image reading apparatus in accordance with the present invention.

First, referring to FIGS. 15A to 15C, a monitor image data when the original does not have any shade region will be described.

Figure 15A:
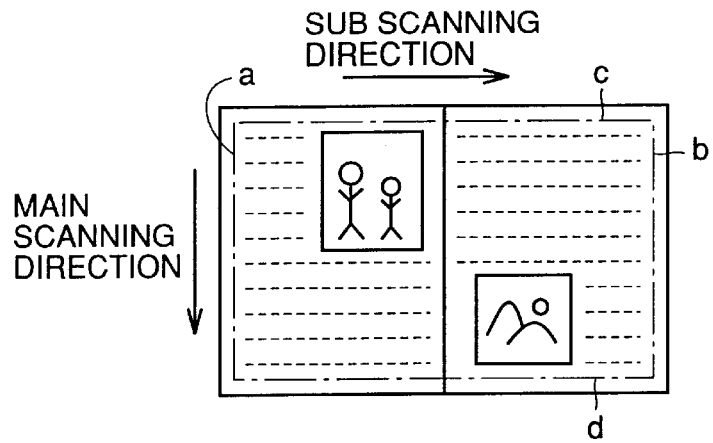
FIGS. 15A to 15C are illustrations showing an example of a method of determining a shade region of an original, by the image reading apparatus in accordance with the present invention.
Figure 15B:
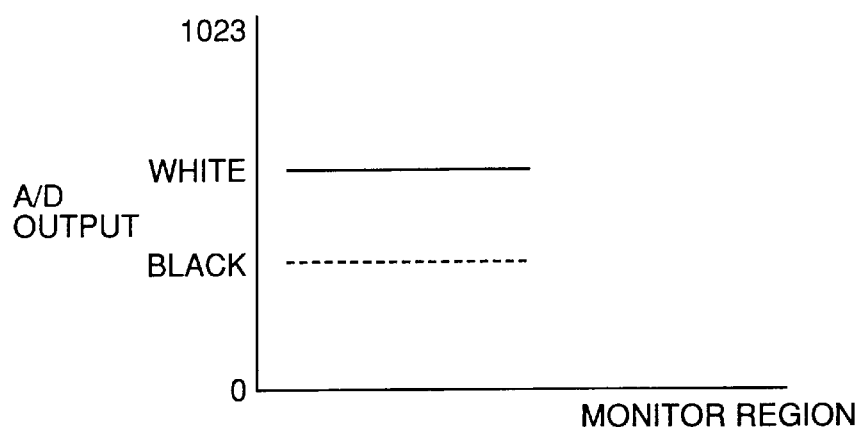
Figure 15C:
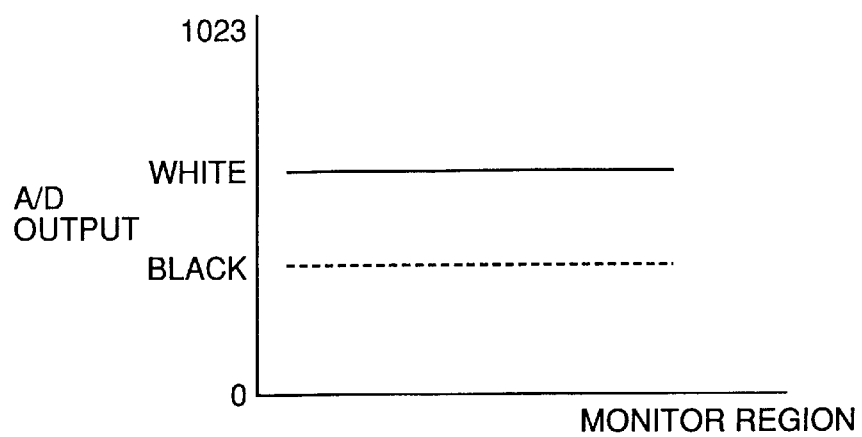

In original image without any shade region such as shown in FIG. 15A is read in main and subscanning directions respectively, and data of four lines a, b, c and d at portions inner by a prescribed distance (for example 5 mm) from four edges of the original are monitored, respectively. In most cases, the margin of the original has the background color of white, for example. Therefore, the image data of respective lines provide graphs representing white level over the entire range, as shown in FIGS. 15B and 15C.

At this time, because of the characteristic of the LOG CCD, the dynamic range from white to black does not vary. Therefore, the black level is given by the dotted line obtained by parallel displacement of the white level, as shown in FIGS. 15B and 15C.

Figure 16A:
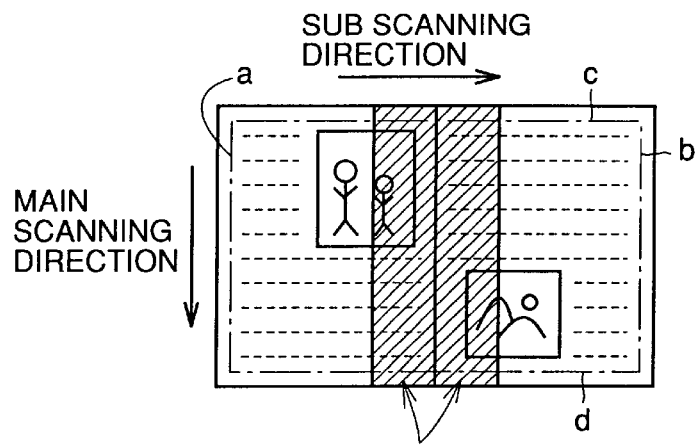
FIGS. 16A to 16C are illustrations showing an example of a method of determining a shade region of an original, by the image reading apparatus in accordance with the present invention.
Figure 16B:
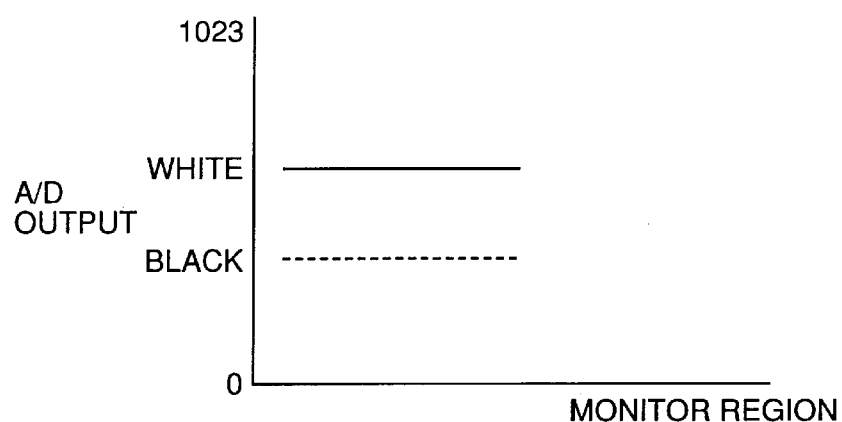
Figure 16C:
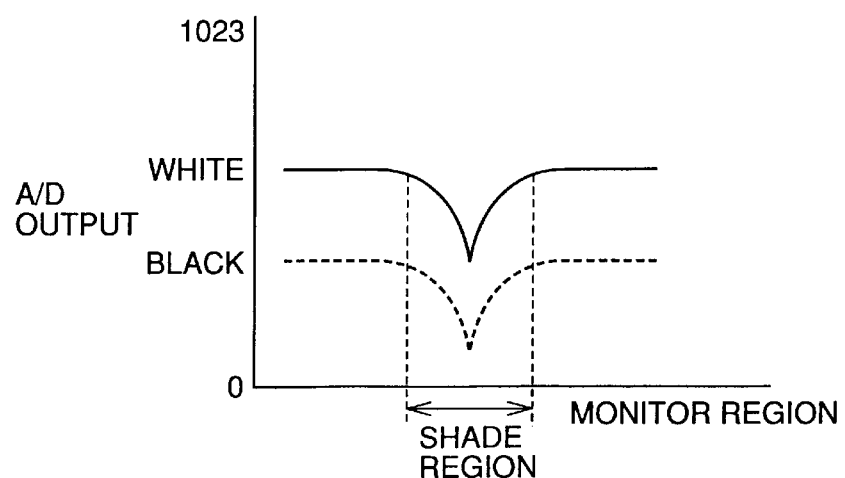

Referring to FIGS. 16A to 16C, monitor image data when there is a shade region at the central folding portion of the original will be described.

Referring to FIG. 16A, the original image having a shade region at the central folding portion is read in the main and subscanning directions in the similar manner as described above, and data of four lines a, b, c and d at portions inner by a prescribed distance (for example, 5 mm) from four edges of the original are monitored. The image data of lines a and b in monitor regions along the main scanning direction, where there is not the shade region provides a graph representing the white level over the entire region, as shown in FIG. 16B. Meanwhile, image data of lines c and d in the monitor region along the subscanning direction provides the graph with the white level at the central portion dropped as shown in FIG. 16C.

At this time, because of the characteristic of the LOG CCD, the dynamic range from white to black does not vary. Therefore, the black level is given by the dotted line obtained by parallel displacement of the white level, as shown in FIGS. 16B and 16C.

Referring to FIGS. 17A to 17D, monitor image data when the shade region at the center of the original is inclined will be described.

Figure 17A:
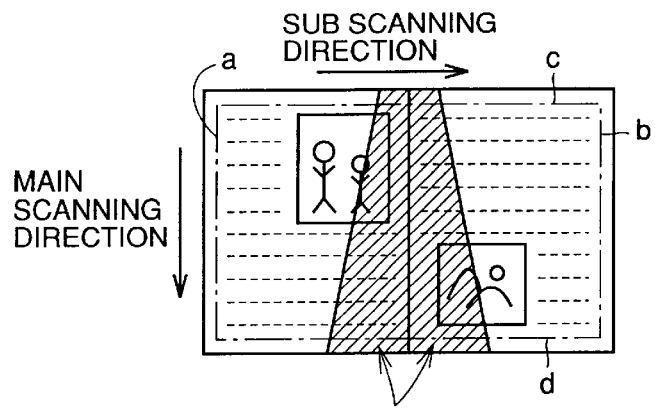
FIGS. 17A to 17D are illustrations showing an example of a method of determining a shade region of an original, by the image reading apparatus in accordance with the present invention.
Figure 17B:
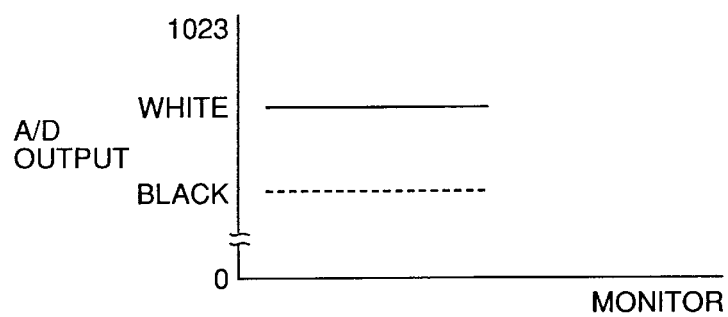
Figure 17C:
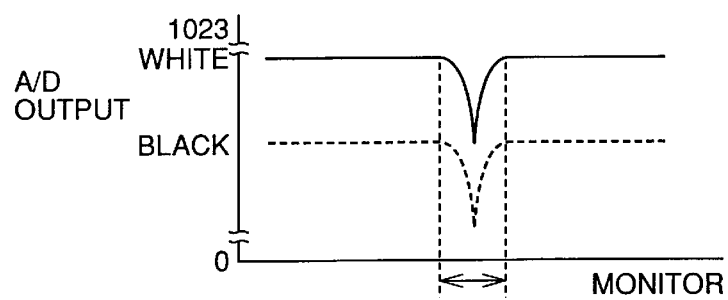
Figure 17D:
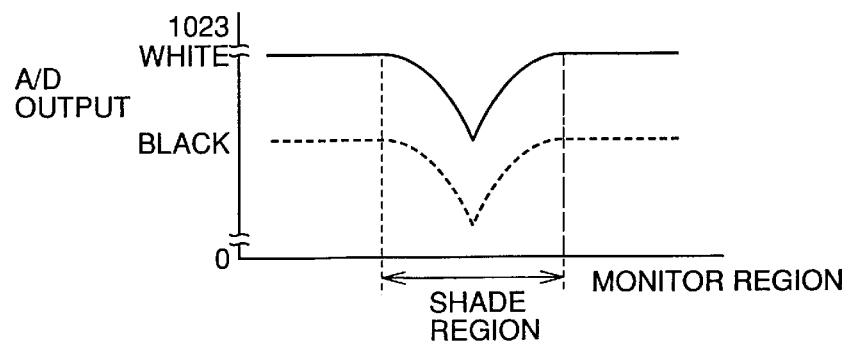

The original image having an inclined shade region at the central portion such as shown in FIG. 17A is read in the main and subscanning directions in the similar manner as described above, and data of four lines a, b, c and d at portions inner by a prescribed distance (for example, 5 mm) from four edges of the original are monitored. The image data of lines a, b in monitor regions along the main scanning direction provides the graph representing white level over the entire region as shown in FIG. 17B. Meanwhile, image data of lines c and d in the monitor regions along the subscanning direction have output level shifted regions vary, because of the influence of the shade region, as shown in FIGS. 17C and 17D. More specifically, the shade region of the book original is inclined, the area of the shade region differs at the upper and lower portions of the original, and as a result, positions of level shift of the read data are different.

At this time, because of the characteristic of the LOG CCD, the dynamic range from white to black does not vary. Therefore, the black level is given by the dotted line obtained by parallel displacement of the white level, as shown in FIGS. 17B, 17C and 17D.

From the image monitor data shown in FIGS. 15A to 15C, 16A to 16C and 17A to 17D, the shade region of the original image is detected based on the point of change of the monitor data of one line, the monitor data of the portion without any shade and monitor data of the shade portion are compared pixel by pixel, and the amount of data shift of each pixel in the shade region is calculated based on the difference. By performing correction with the data shift amount added to the shading data, it becomes possible to correct the influence of lower illuminance at the original surface in the shade region.

The foregoing description is only an example of a method of determining the shade region. Other than the method described above, it is possible to determine the shade region by displaying image data at the time of a preliminary scanning on an editor, and by a user input through a pen, for example.

One line of image data when illuminance on the surface of the original varies, will be described with reference to FIGS. 18 to 20.

Figure 18:
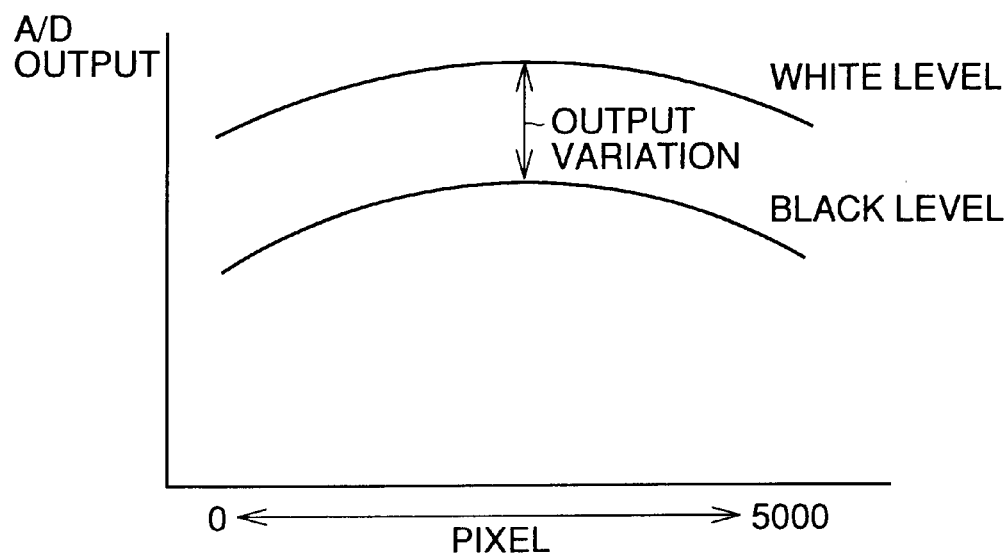
FIGS. 18 to 20 are illustrations related to one line of image data when illumination on an original surface varies.

First, FIG. 18 shows one line of image data of a portion without any shade of an original. In FIG. 18, the abscissa represents CCD pixels of one line, and the ordinate represents A/D output.

Referring to FIG. 18, since illuminance on the original surface is high, the intensity of light received by the CCD is high, and therefore CCD output has a large value. The graph has a convex shape because of the influence of light distribution from the light source on the original. The shape of the image data output naturally changes when light distribution of the light source changes.

Figure 19:
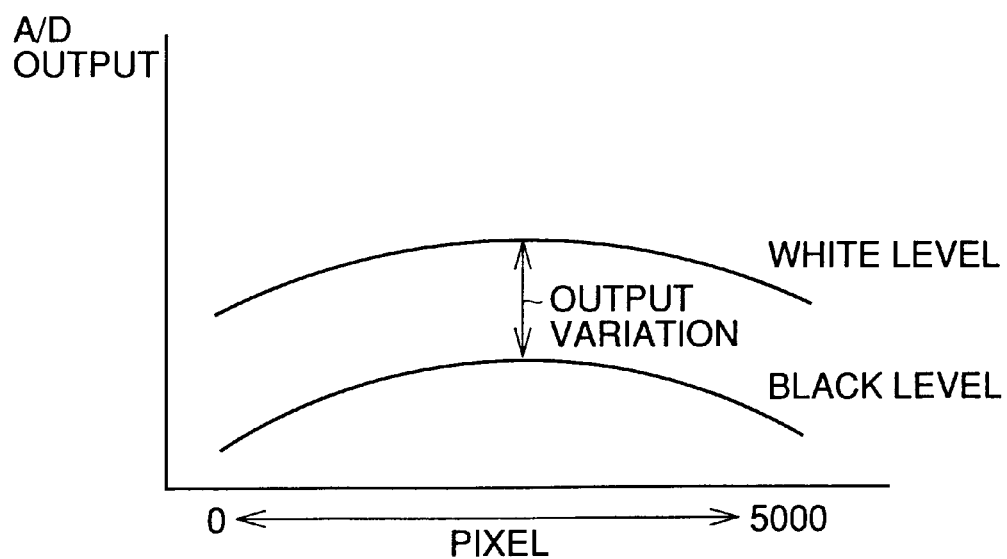

FIG. 19 shows one line of image data of a shade region of the original.

Referring to FIG. 19, here, the illuminance on the original surface is low, and therefore the intensity of light received by the CCD is low, and the CCD output is a small value. However, because of the characteristic of the LOG CCD described above, the output dynamic range from the black level to the white level does not change even when the absolute light intensity is changed. The output as a whole is simply shifted in parallel.

Figure 20:
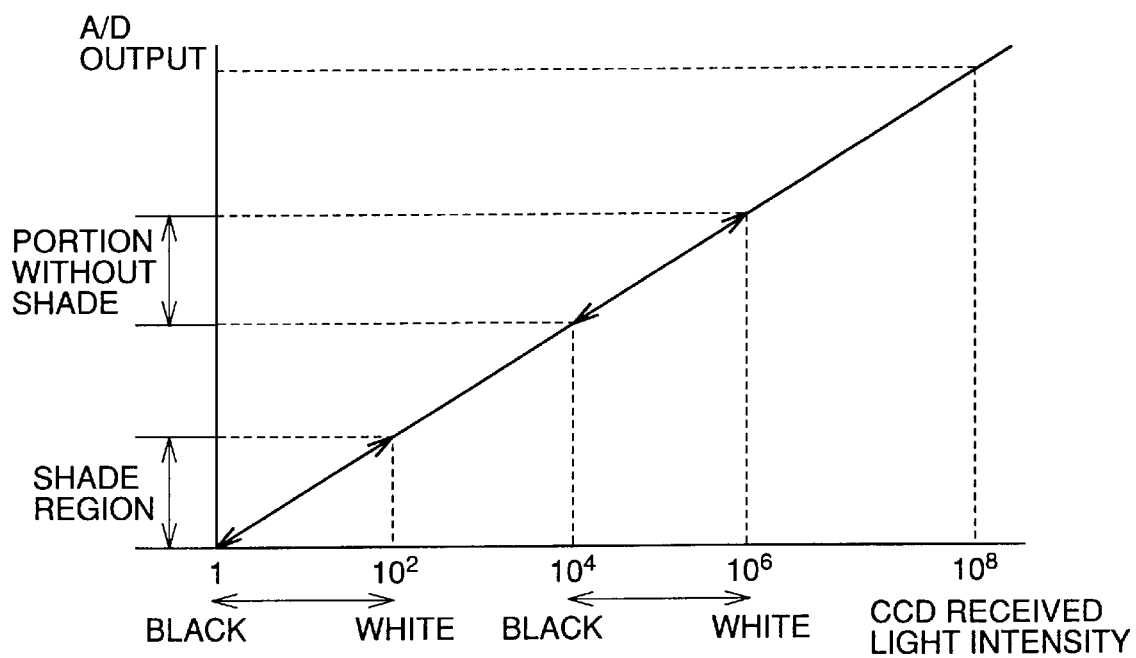

FIG. 20 is a graph showing the image data of FIGS. 18 and 19, where the abscissa represents intensity of light received by the CCD, and the ordinate represents A/D output.

Referring to FIG. 20, as in FIGS. 18 and 19, the CCD output is larger at a portion without any shade of the original, while CCD output becomes smaller at the shade region of the original. However, the output dynamic range from the black level to the white level does not change, and the entire output is simply shifted in parallel.

From the foregoing, it is noted that in accordance with the present embodiment, even when the variation in illuminance on the original surface caused by presence/absence of the shade original is corrected by shifting in parallel the image data, it is not necessary to perform gain amplification of the CCD output, and therefore a desired amplification of noise component can be avoided.

As described above, according to the present embodiment, an image reading apparatus capable of satisfactory image reproduction even when there is a shade in the original image such as a book original generated because of the influence of illuminance, is obtained.

Second Embodiment

Figure 21:
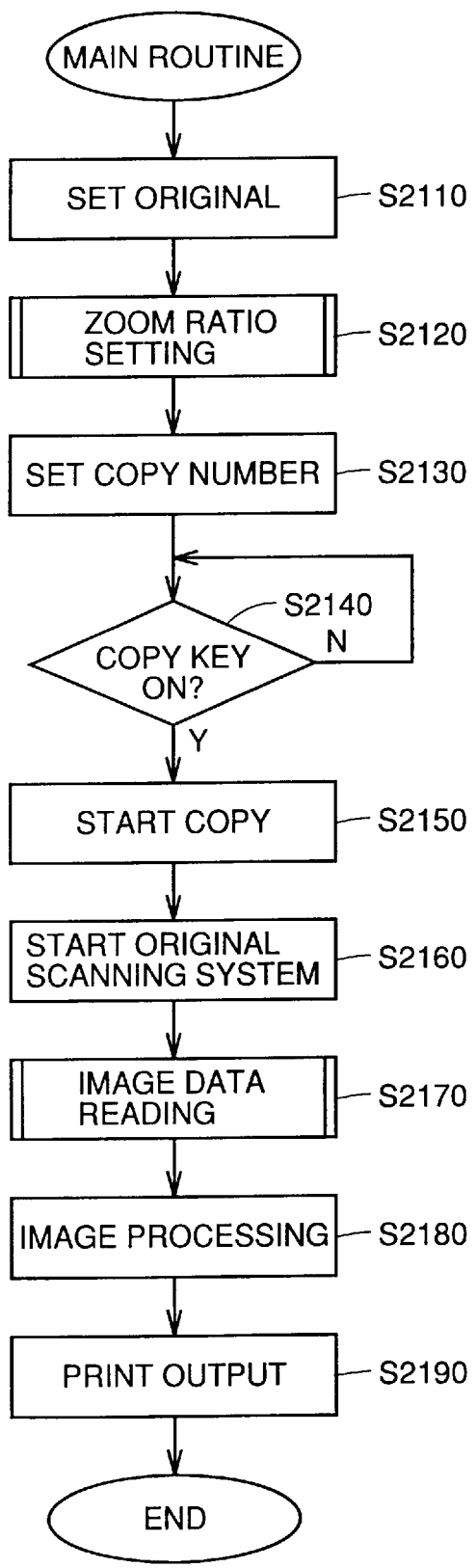
FIG. 21 is a flow chart showing an exemplary operation of a copying machine having a general mode switching function.

FIG. 21 is a flow chart showing an operation of an exemplary copying machine in accordance with one embodiment, having a general mode switching function.

Referring to FIG. 21, first, an original is set on a platen (S2110), and zoom ratio is set (S2120). Thereafter, the number of copies is set (S2130). Here, it is assumed that other conditions such as paper size and original density are automatically set by the copying machine. If necessary, such conditions may be set manually.

After setting, a copy start key is pressed (S2140), and copying operation starts (S2150). Original scanning system starts its operation (S2160) of reading image data while scanning (S2170), and the read image data is processed in the image processing circuit (S2180). The resulting image-processed data is transmitted to an image output apparatus, where the data is printed and output (S2190).

Figure 22:
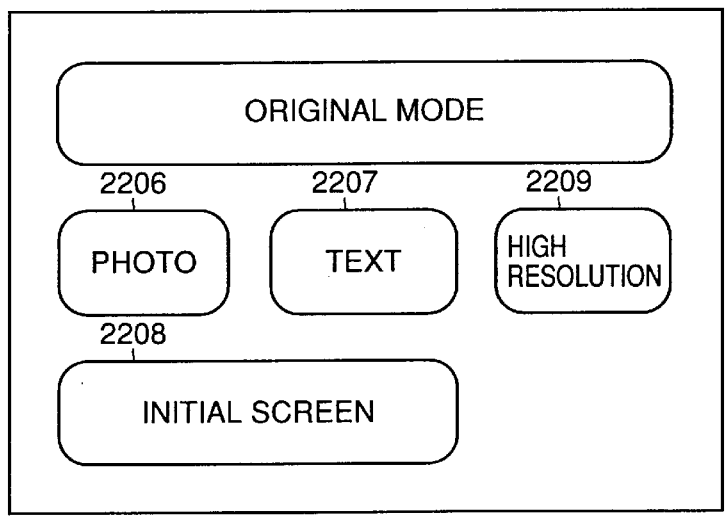
FIG. 22 shows a panel screen switched to an original mode.

FIG. 22 shows the panel screen switched to the original mode.

Referring to FIG. 22, when the panel screen is switched to the original mode, either "photo" selection key 2206, "text" selection key 2207 or "high resolution" selection key 2209 is pressed dependent on the type of the original, and after setting the original mode in this manner, when "initial screen" key 2208 is pressed, the display returns to the original display shown in FIG. 2 described in the first embodiment. After the number of copies is set by a ten key, not shown, a copy start key 205 is pressed, and thus copying operation starts.

When a high resolution mode is selected among the original modes shown in FIG. 22, line period of reading is switched to be shorter, so that the reading resolution in subscanning direction is set higher. At this time, if the printer side can cope with the high resolution, the printer provides high resolution output and, if not, this mode is permitted only when the data is output to an external equipment through the I/F.

Figure 23:
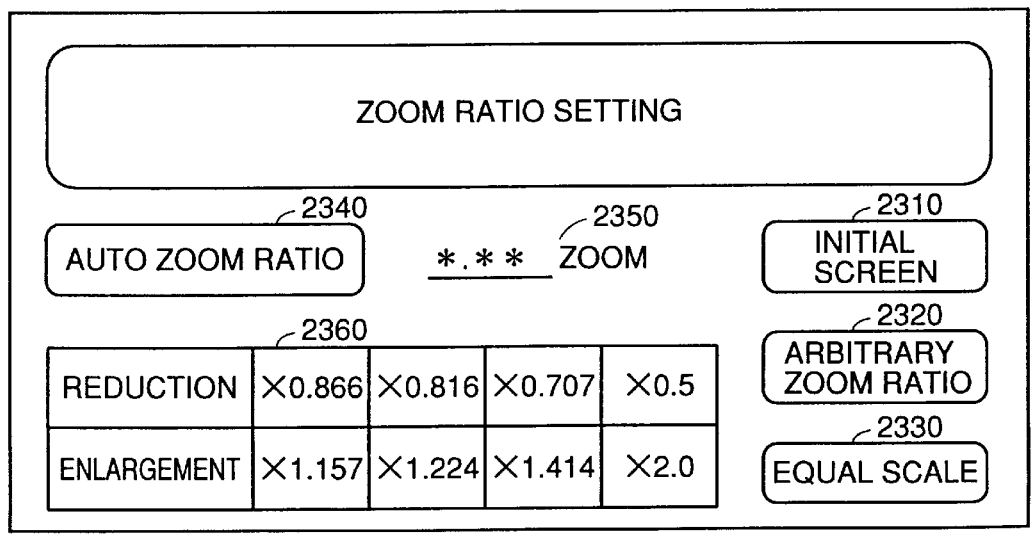
FIG. 23 shows a zoom up ratio setting screen on an operation panel of a copying machine.

FIG. 23 shows a zoom ratio setting screen of the operation panel of the copying machine.

Standard size selection keys 2360 are provided for selecting a zoom ratio to be set. When an original of a standard size is to be enlarged or reduced, the zoom ratio of the paper is set by pressing any of the keys.

Auto zoom ratio selection key 2340 is used when an auto zoom ratio setting mode is to be selected. When this key is pressed, zoom ratio is automatically set based on the original size and the sheet size for output.

When an equal scale setting key 2330 is pressed, the zoom ratio is set to 1, that is, equal scale, no matter what zoom ratio is set.

An arbitrary zoom ratio setting key 2320 is used when a zoom ratio which cannot be set by the aforementioned setting keys is desired. The zoom ratio is set by first pressing the key and thereafter inputting the desired value through ten keys, not shown.

The setting of zoom ratio described above is displayed on the set zoom ratio display portion 2350. When the zoom ratio setting screen is not necessary, the initial screen shown in FIG. 2 and described with respect to the first embodiment is returned, when initial screen key 2310 is pressed.

Figure 24:
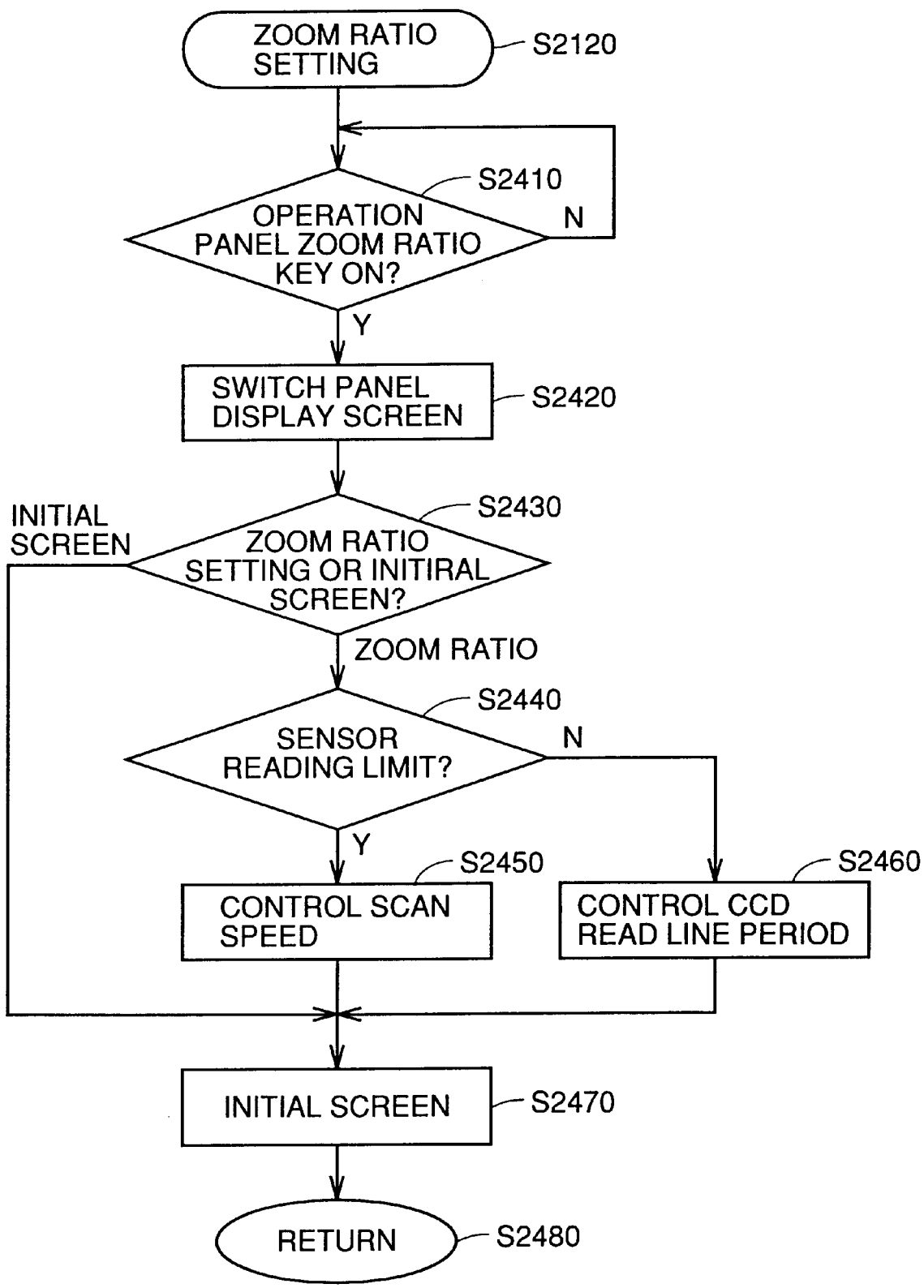
FIG. 24 is a flow chart showing a first operation related to zoom ratio setting which is one of the subroutines of the main routine shown in FIG. 21.

FIG. 24 is a flow chart showing a first operation related to zoom ratio setting, which is one of the subroutines of the main routine shown in FIG. 21.

Referring to FIG. 24, an original is set and thereafter, whether zoom ratio setting key 202 of the initial screen shown in FIG. 2 described with respect to the first embodiment is pressed or not is determined (S2410). When zoom ratio setting key 202 is pressed, the display screen on the operation panel is switched (S2420). When zoom ratio setting key 202 is not pressed, the control waits for pressing of the zoom ratio setting key 202 of the operation panel.

When the screen is switched to the screen shown in FIG. 23, the control waits for pressing of any of the zoom ratio setting keys including arbitrary zoom ratio setting key 2320, equal scale setting key 2330, automatic zoom ratio selection key 2340 and standard size selection keys 2360, or pressing of initial screen key 2310 (S2430).

When zoom ratio is set by the zoom ratio setting key, whether the set value exceeds reading limit of the sensor or reading is possible is determined (S2440).

If the set value exceeds the limit of reading by the sensor, the control is switched to scan speed control (S2450), and thereafter the screen is switched to the initial screen (S2470). When sensor reading is possible, then line period of reading of the CCD is controlled (S2460) directly, and the screen is switched to the initial screen (S2470).

Here, in S2460, line period of reading is changed in accordance with the set zoom ratio. For example, when the zoom ratio is set to 2, then the line period of reading is changed to ½. More specifically, image taking period in the subscanning direction is set to ½.

When the initial screen key 2310 of the panel screen shown in FIG. 23 is pressed, the screen is switched to the initial screen, and the flow returns to the main routine (S2480).

When line period control is to be performed, pixel clock is also controlled so that all pixels can be transferred within one line period.

Figure 25:
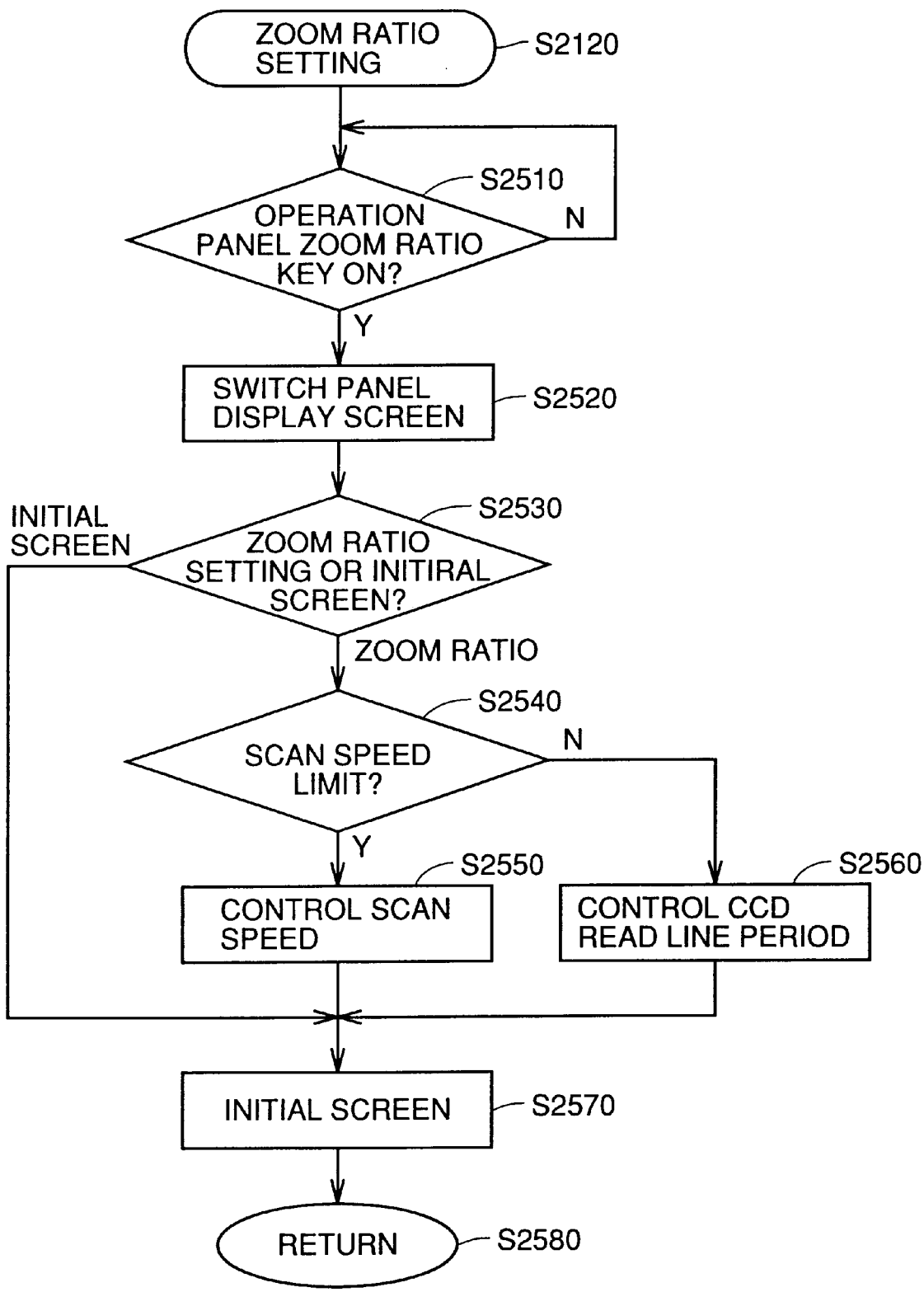
FIG. 25 is a flow chart showing a second operation related to zoom ratio setting which is one of the subroutines of the main routine shown in FIG. 21.

FIG. 25 is a flow chart showing a second operation related to setting of zoom ratio, which is one of the subroutines of the main routine shown in FIG. 21.

Referring to FIG. 25, an original is set and thereafter, whether zoom ratio setting key 202 of the initial screen shown in FIG. 2 described with respect to the first embodiment is pressed or not is determined (S2510). When zoom ratio setting key 202 is pressed, the display screen on the operation panel is switched (S2520). When zoom ratio setting key 202 is not pressed, the control waits for pressing of the zoom ratio setting key 202 of the operation panel.

When the screen is switched to the screen shown in FIG. 23, the control waits for pressing of any of the zoom ratio setting keys including arbitrary zoom ratio setting key 2320, equal scale setting key 2330, automatic zoom ratio selection key 2340 and standard size selection keys 2360, or pressing of initial screen key 2310 (S2530).

When zoom ratio is set by the zoom ratio setting key, whether the set value exceeds driving limit of scan speed or whether it is drivable is determined (S2540).

When the set value exceeds the driving limit of scanning speed, then control is switched to line period of reading of the CCD (S2560), and the screen is switched to the initial screen (S2570). Meanwhile, if scan drive is possible, then the scanning speed is controlled (S2550), and the screen is switched to the initial screen (S2570).

When the initial screen key 2310 of the panel screen shown in FIG. 23 is pressed, the screen is switched to the initial screen, and the flow returns to the main routine (S2580).

When line period control is to be performed, pixel clock is also controlled so that all pixels can be transferred within one line period.

Figure 26:
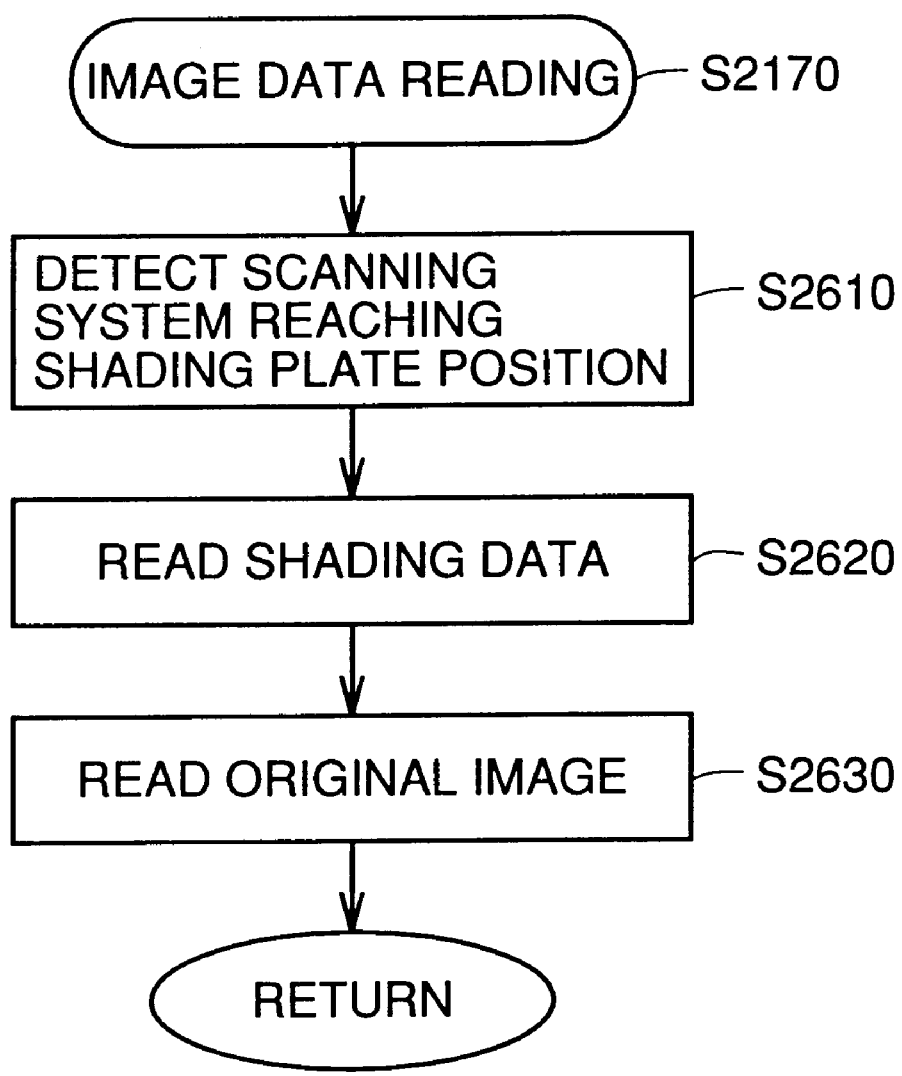
FIG. 26 is a flow chart showing an operation sequence at the time of image data reading which is one of the subroutines of the main routine shown in FIG. 21.

FIG. 26 is a flow chart showing an operation sequence at the time of image data reading, which is one of the subroutines of the main routine shown in FIG. 21.

Referring to FIG. 26, a scanning system starts from a home position, and number of pulses of a stepping motor, number of pulses of an encoder or the like is counted, so as to detect whether the shading pattern position is reached or not (S2610). When that position is reached, shading data is read (S2620). Thereafter, original image is read continuously (S2630).

Here, shading data is read in the same period as the line period of reading changed in step S2460 of FIG. 24 or S2560 of FIG. 25. When the high resolution mode is set as described with respect to FIG. 22, the shading data is read at a predetermined period corresponding to the resolution which is shorter than usual.

Figure 27:
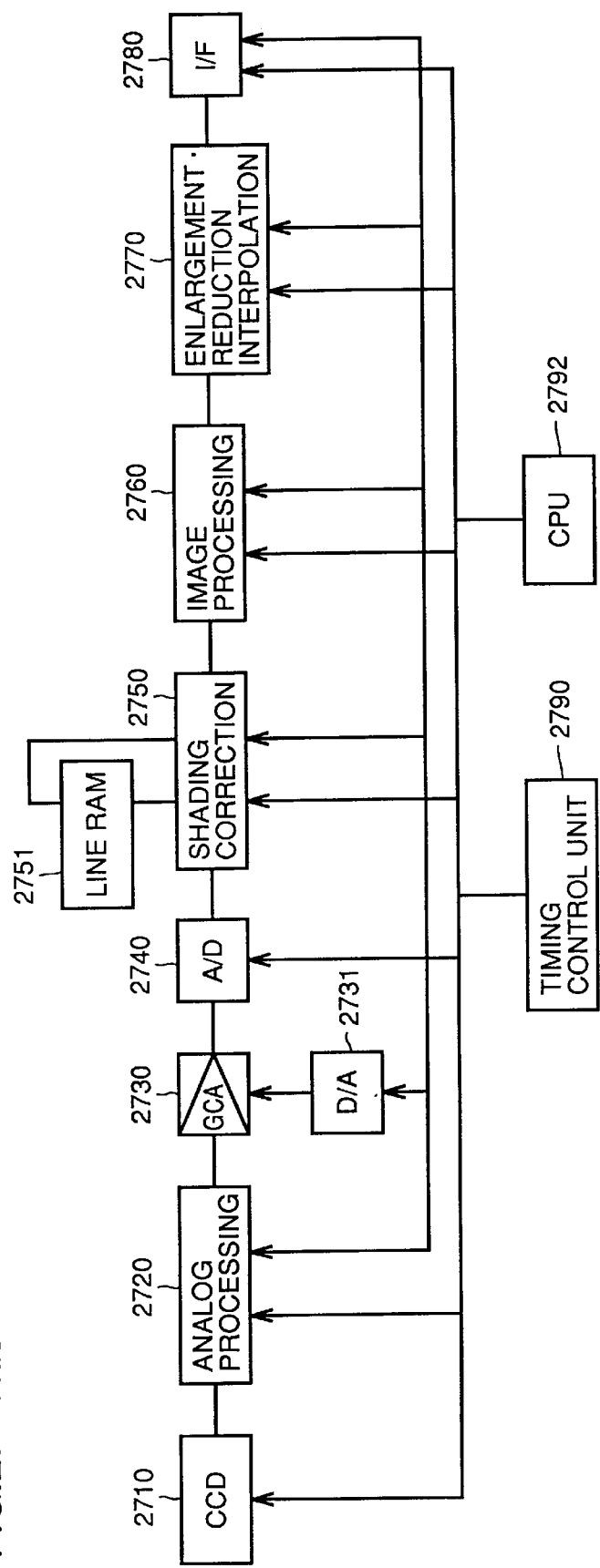
FIG. 27 is a circuit block diagram of a conventional example when a monochrome sensor is used in a copying machine.

FIG. 27 is a circuit block diagram of a prior art example employing a monochrome sensor in a copying machine.

Referring to FIG. 27, the light reflected from the original enters a CCD 2710, and subjected to photoelectric conversion to a voltage corresponding to the incident light intensity, and thereafter output. The resulting output is subjected to a prescribed processing in an analog processing circuit 2720, subjected to output dynamic range adjustment by a GCA circuit 2730, and thereafter input to an AD converter 2740 to be converted to digital data. At this time, in order to reduce influence of rounding error in calculation in subsequent calculation or image processing, AD conversion is performed with higher resolution than necessary.

The image data which has been converted to digital data is corrected by a shading correction circuit 2750 so as to remove influence of variation in light distribution of the light source, variation in sensitivity between CCD pixels and so on. Data obtained when a shading pattern is read previously is stored as correction data, in line RAM 2751.

The image data after shading correction is subjected to a prescribed image processing such as edge emphasis, MTF (Modulator Transfer Function) correction or the like by an image processing circuit 2760. When the image processed image data is to be electrically zoomed, then the data is interpolated by an enlargement•reduction interpolating circuit 2770. The finally processed image data is output to a circuit block, which will be described later, through an I/F unit 2780.

Timing control of various processing circuits is governed by a timing control unit 2790, and data setting, process switching and so on are controlled by a CPU 2792.

Figure 28:
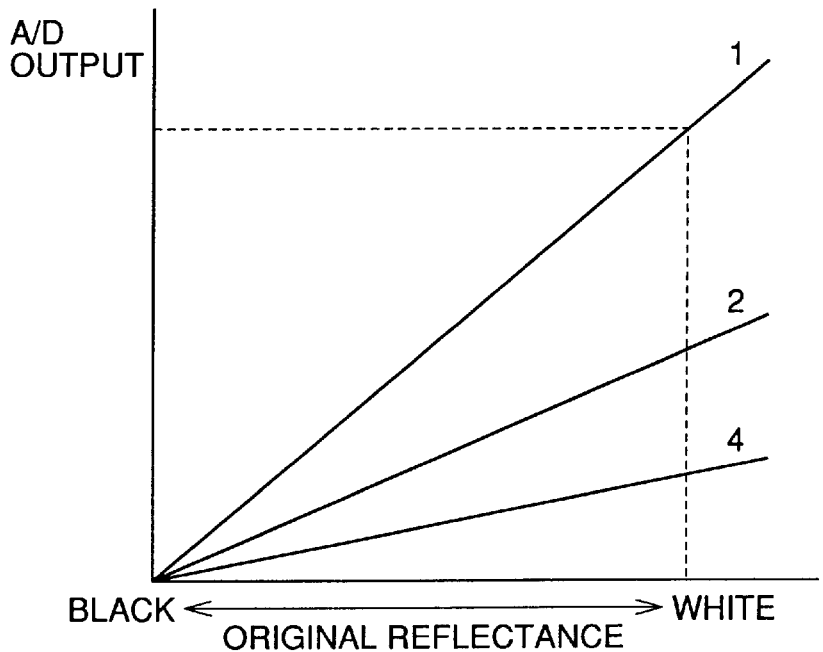
FIG. 28 shows change in image data when zooming ratio is changed in the prior art example, with CCD line period switched by using the monochrome sensor shown in FIG. 27.

FIG. 28 shows variation in image data at the time of changing zoom ratio in the prior art example, in which line period of the CCD is switched using a monochrome sensor shown in FIG. 27. In FIG. 28, the abscissa represents reflectance of the original, the ordinate represents A/D output, and variations when the reading zoom ratio is changed to 1, 2 and 4 are represented.

Referring to FIG. 28, the graph represents variation in image data without gain correction. It can be seen from the graph that the higher the zoom ratio, the shorter the line period, and the smaller the intensity of light received by the CCD, resulting in reduced image output.

Figure 29:
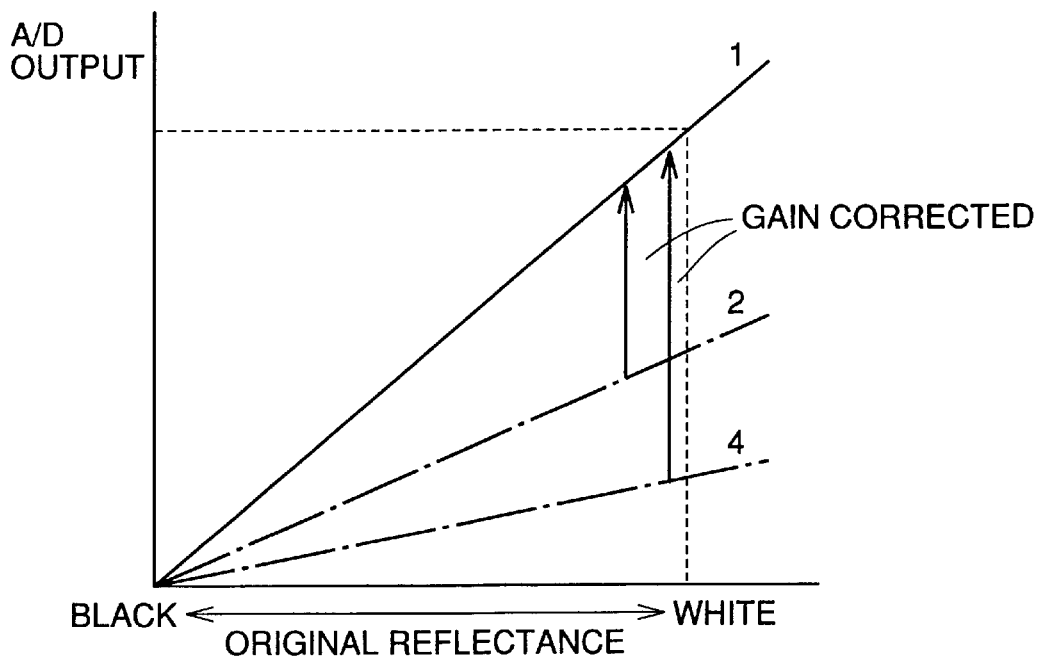
FIG. 29 is an illustration showing image data processing shown in FIG. 28.

FIG. 29 is an illustration related to processing of the image data shown in FIG. 28.

Referring to FIG. 29, this graph shows a state when the image data is subjected to gain amplification, so that the final output matches the equal scale. Here, from the apparent image data, it seems that the output of comparable level as that of the equal scale is obtained. However, at the time of gain amplification, image noises are amplified altogether. Therefore, image noises are increased as a result, lowering S/N ratio.

In the circuit block diagram of FIG. 27, when enlargement-reduction interpolation is to be performed without switching CCD line period, the image data processed by the image processing block is comparable to the data of equal scale. However, at the time of enlargement interpolation, information between pixels is approximated by calculating an average from peripheral pixel data or by some other method, and therefore the data is different from the actual data, resulting in an error.

Figure 30:
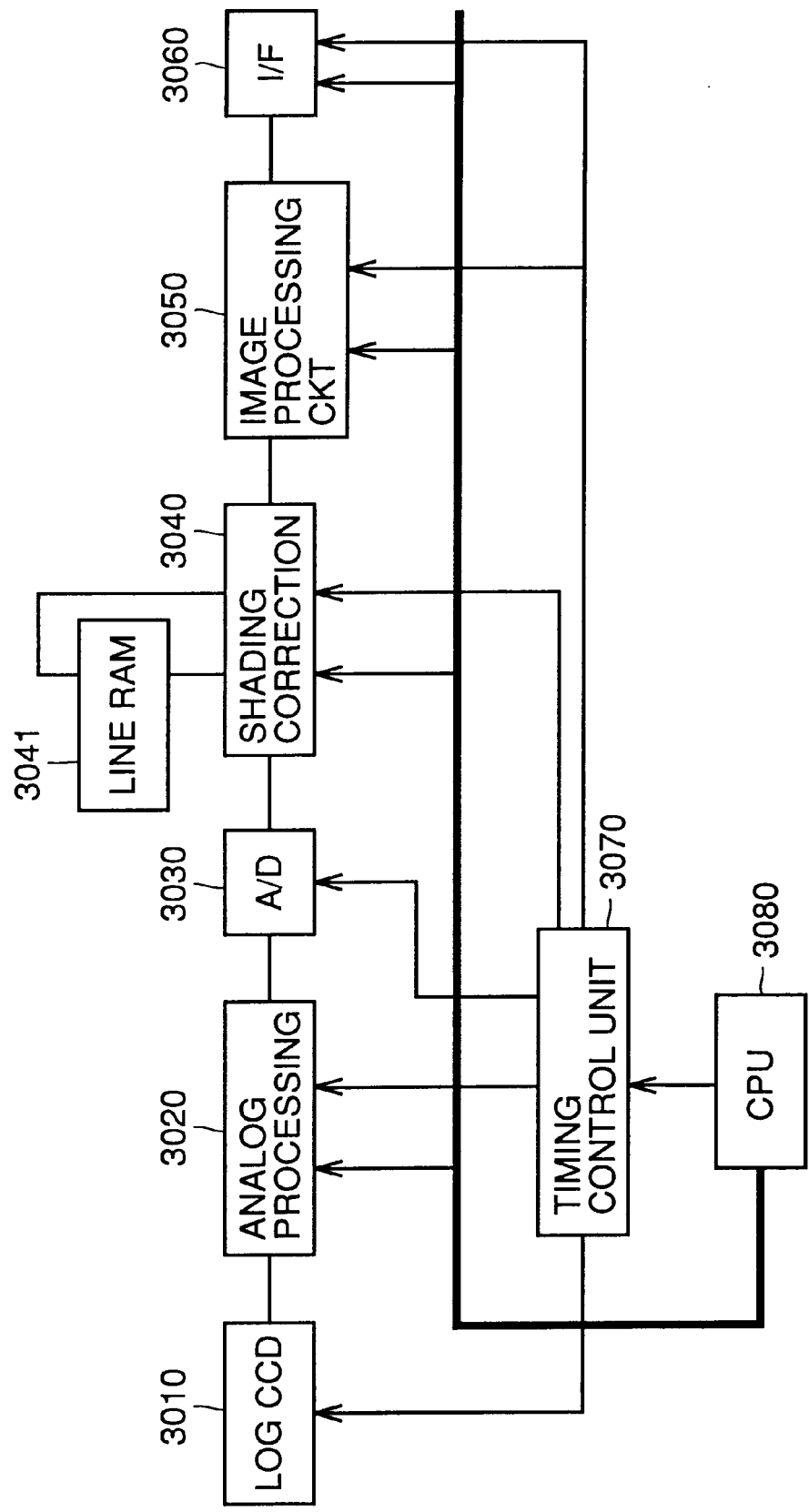
FIG. 30 is a block diagram of an image processing circuit in an example of the image reading apparatus of the present invention.

FIG. 30 is a block diagram showing an image processing circuit of an example of the image reading apparatus in accordance with the present invention.

Referring to FIG. 30, the light reflected from the original enters an LOG CCD (logarithmic compression output image sensor) 3010, subjected to photoelectric conversion and thereafter converted to a logarithmic signal and output.

The analog signal output from LOG CCD 3010 is subjected to a prescribed processing in an analog processing circuit 3020, and converted to a digital signal by an AD converter 3030. At this time, because of the characteristics of LOG CCD 3010, even when there are variations in absolute light intensity of the light source or variation in sensor sensitivity pixel by pixel, an analog signal, of which a dynamic range with respect to the original density is kept constant but shifted in parallel entirely, is output. Therefore, taking variation factors such as light intensity and so on into consideration in advance, AD conversion is performed with the dynamic range set wider than necessary.

Thereafter, before reading an image, a white or black shading plate having known reflectance is read, and the data is stored in a line RAM 3041.

The AD converted image signal when the image is read is corrected by subtracting the shading data stored in line RAM 3041, in shading correction circuit 3040.

The image data which has been subjected to shading correction is passed to an image processing circuit 3050, where the image data is subjected to a prescribed image processing such as edge emphasis, MTF correction or the like.

The finally processed image data was output to a circuit block, which will be described later, through an I/F unit 3060.

Timing control of various processing circuits is governed by a timing control unit 3070, and data setting, process switching and so on are controlled by a CPU 3080. Switching of CCD line period is performed by a timing control unit 3070 in accordance with an instruction from CPU 3080. Further, switching of line period and corresponding switching of pixel clocks at the time of zoom ratio conversion are also controlled by timing control unit 3070.

Figure 31:
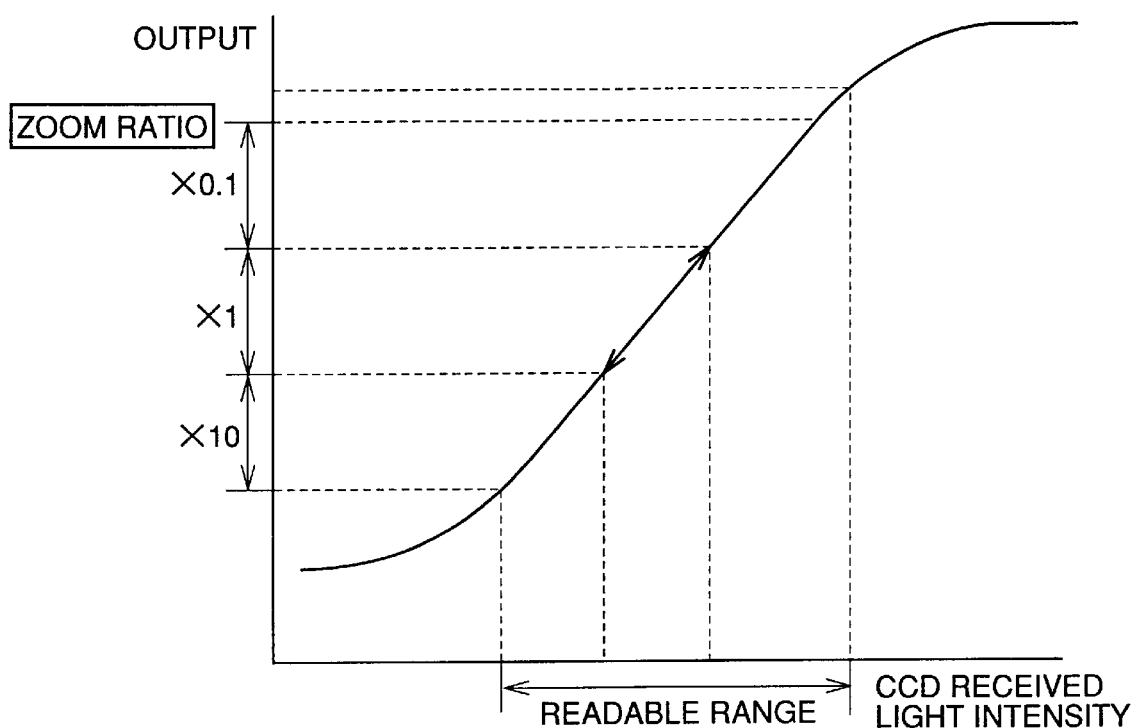
FIG. 31 shows LOG CCD characteristic.

FIG. 31 is a graph showing LOG CCD characteristic.

Referring to FIG. 31, the abscissa represents intensity of light received by the CCD, and the ordinate represents CCD output.

LOG CCD performs photoelectric conversion of the received light and thereafter performs logarithmic compression for output, as its name implies. In the present embodiment, a example employing an LOG CCD is described. Similar effects can be obtained by using an LOG Amp. (Log Amplifier) at an output stage of a common linear output CCD, for logarithmic conversion. In that case, however, output saturation voltage of the linear output CCD must be taken into consideration. Similar effects can be obtained in a simple manner.

The output characteristic is given in proportion to the ratio of variation in light intensity (amount of light), that is, how many times is the light intensity with respect to a give light intensity. Therefore, regardless of the input absolute light intensity, when the ratio of variation of light intensity is the same (for example 100 times), the amount of variation of the output voltage is constant.

Therefore, when zoom ratio (magnification) of reading is set to "0.1", "1" and "10" and line period is set to $\frac{1}{10}$ and 10, respectively, the absolute value of the light intensity (amount of light) received by the CCD changes to $\frac{1}{10}$ and 10 in the similar manner. However, the amount of variation (dynamic range) is constant.

Though the foregoing applies where the variation in output is linear at the central portion of the graph, opposing end portions of the graph where the output curves are exceeding the reading limit of the LOG CCD. In other words, when the light intensity is higher or lower, reading error occurs.

Therefore, switching of zooming ratio (magnification) by switching the line period exceeding these limit values is meaningless.

Figure 32:
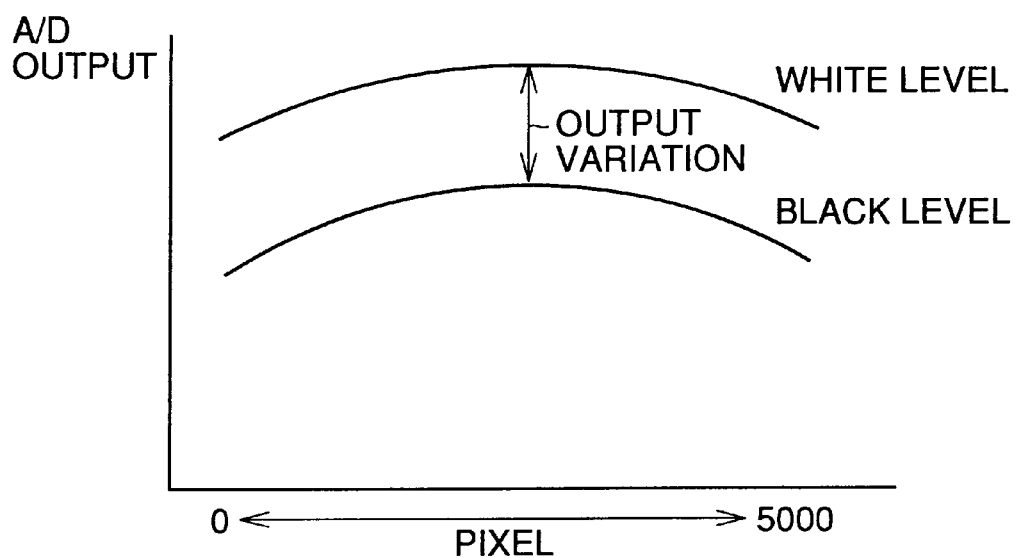
FIGS. 32 to 34 are illustrations showing reading characteristic at the time of line period switching, in the image reading apparatus in accordance with the present invention.

FIG. 32 shows image data when the CCD line period is switched in accordance with the zoom ratio, showing image data of one line when the zoom ratio is small and CCD line period is long, in accordance with the present invention. In FIG. 32, the abscissa represents CCD pixels of one line, and the coordinate represents A/D output.

Referring to FIG. 32, since line period is long and storage time is long, the intensity of light received by the CCD is high, and therefore CCD output has a large value. The graph has a convex shape because of the influence of light distribution from the light source on the original. The shape of the image data output naturally changes when light distribution of the light source changes.

Figure 33:
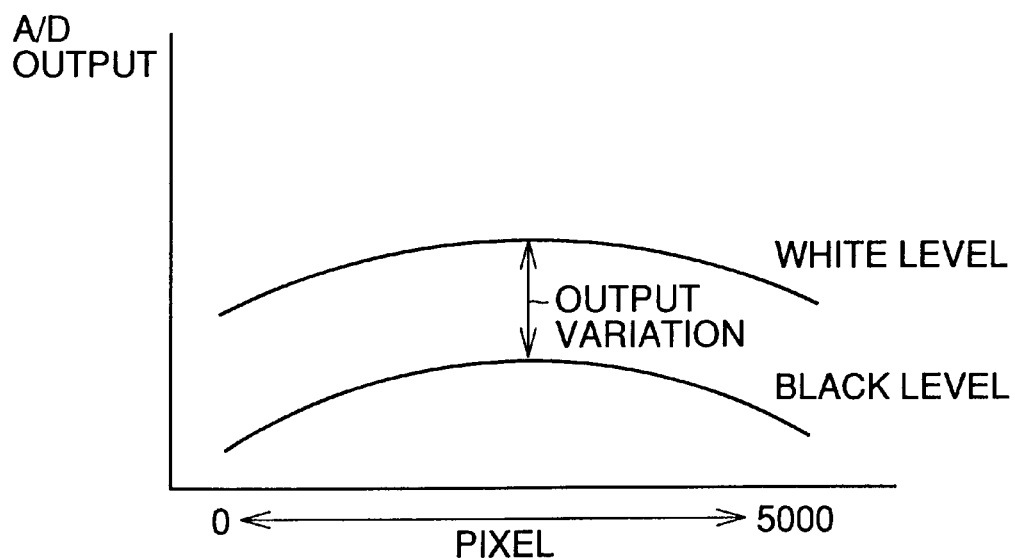

FIG. 33 shows image data when CCD line period is switched in accordance with zoom ratio according to the present invention, showing image data of one line when zoom ratio is large and CCD line period is short.

Referring to FIG. 33, here, the line period is short and storage time is short, and therefore the intensity of light received by the CCD is low, and the CCD output is a small value. However, because of the characteristic of the LOG CCD described above, the output dynamic range from the black level to the white level does not change even when the absolute light intensity is changed. The output as a whole is simply shifted in parallel.

Figure 34:
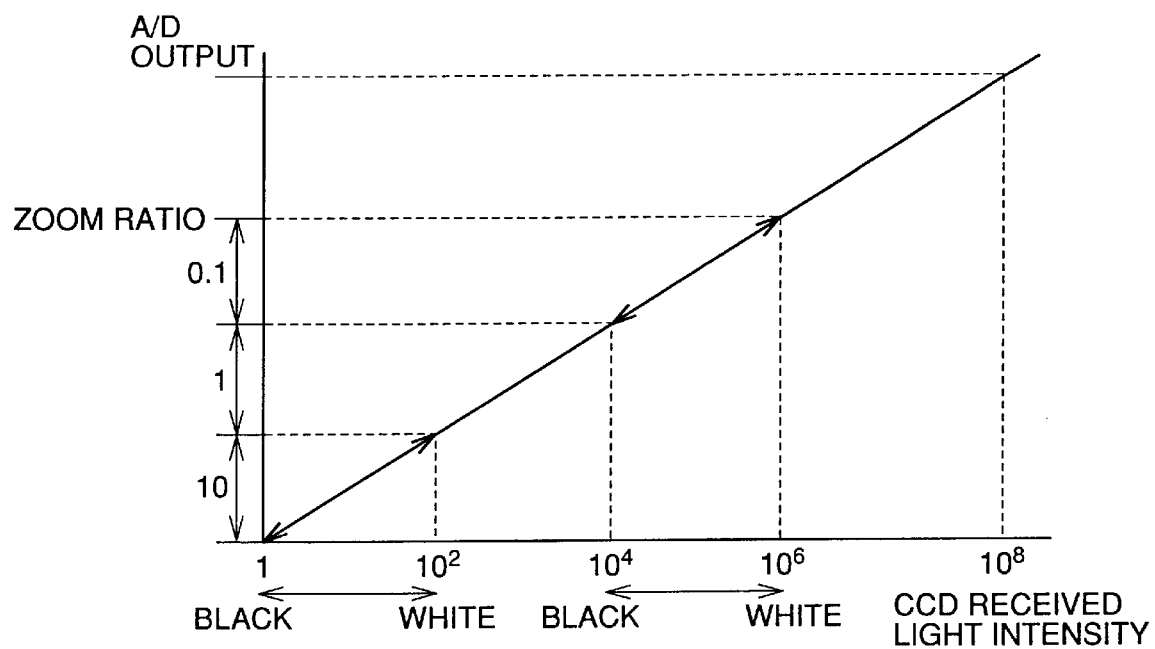

FIG. 34 is a graph showing the image data of FIGS. 32 and 33, where the abscissa represents intensity of light received by the CCD, and the ordinate represents A/D output.

Referring to FIG. 34, as in the case shown in FIGS. 32 and 33, when the set zoom ratio is small and CCD line period is long, CCD output is large, and when the set zoom ratio is large and CCD line period is short, CCD output is small. However, the output dynamic range from the black level to the white level is not changed but simply shifted in parallel as a whole.

From the foregoing, it can be understood that even when the change in zoom ratio is performed with the line period of the CCD switched accordingly, it is not necessary to perform gain amplification of the CCD output, and therefore undesirable amplification of noise component is avoided.

FIGS. 35 to 40 show flow of image data processing of the present invention when LOG CCD shown in FIG. 30 is used. In FIGS. 35 to 40, the abscissa represents CCD pixels, and the ordinate represents A/D output, and in these figures, white level and black level of data corresponding to one line of CCD are represented.

Actual image data provides an output in accordance with the light reflected from the read original, within the range of "output variation" between the white and the black levels.

Figure 35:
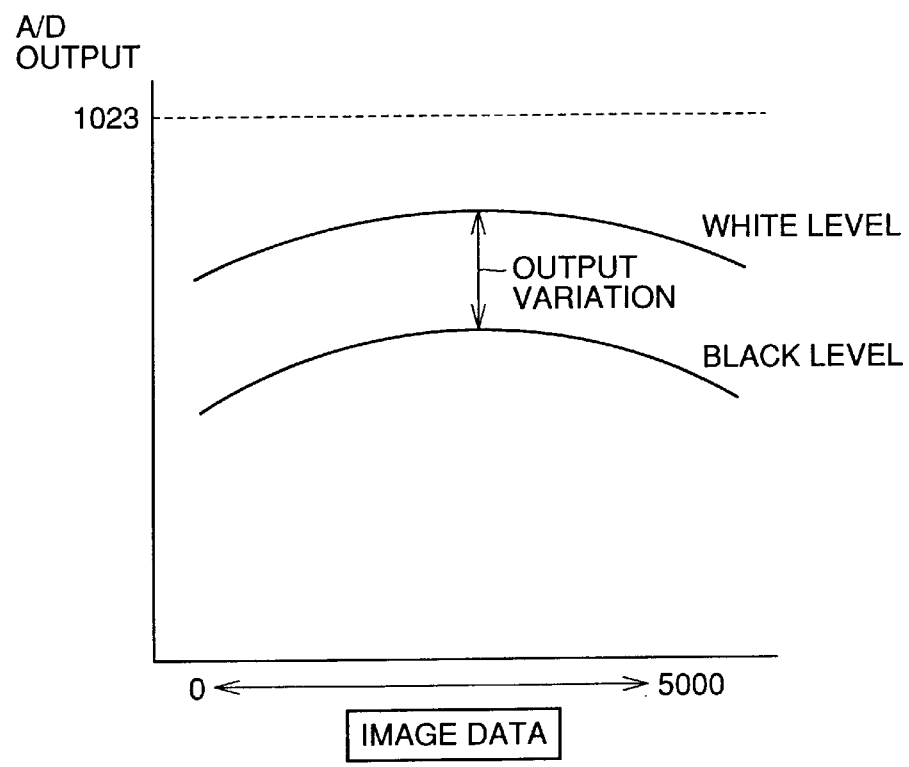
FIGS. 35 to 40 are illustrations related to image correction at the time of line period switching in the image reading apparatus in accordance with the present invention.
Figure 36:
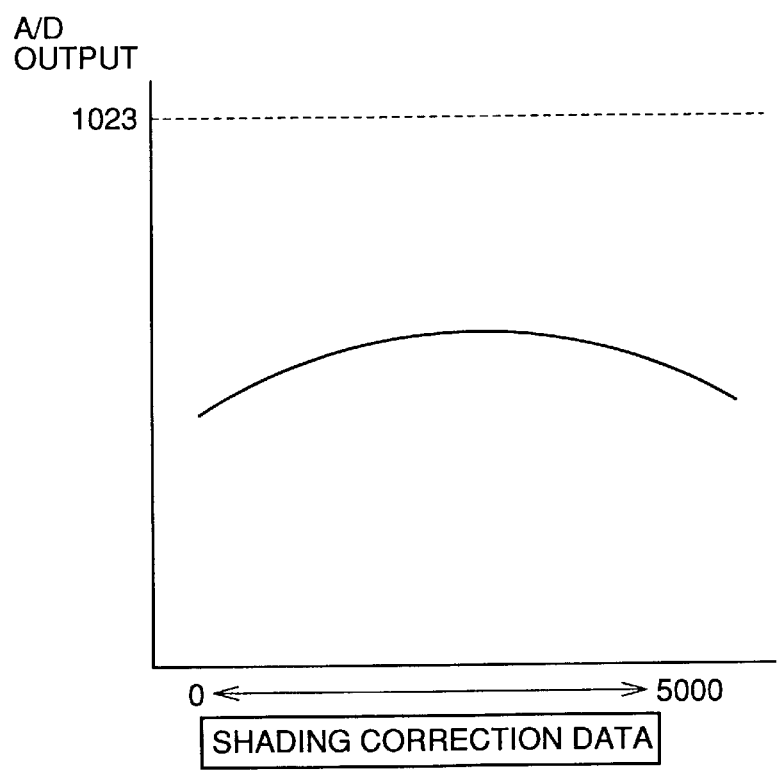
Figure 37:
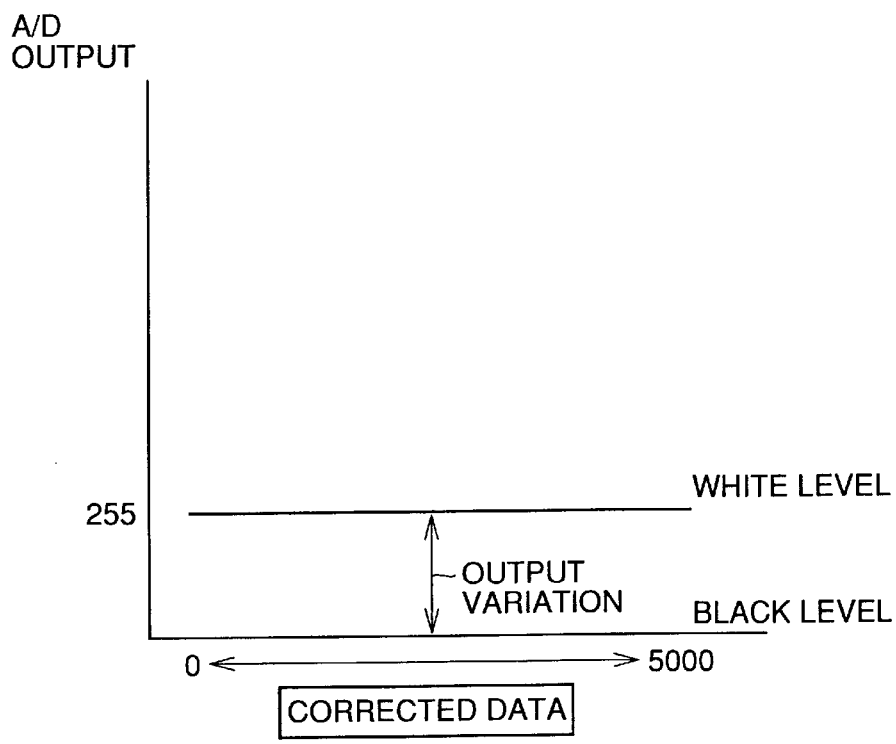
Figure 38:
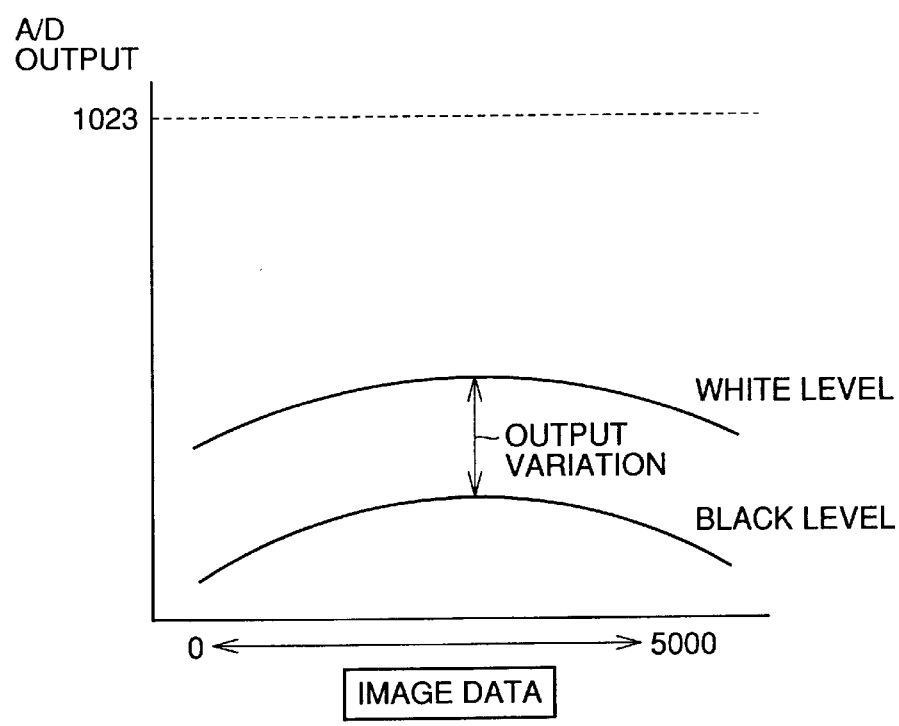
Figure 39:
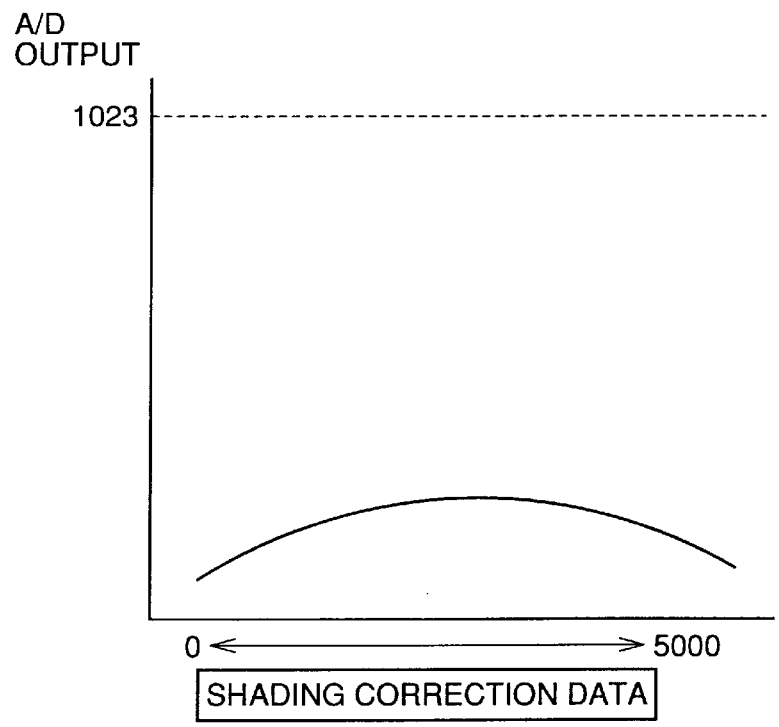
Figure 40:
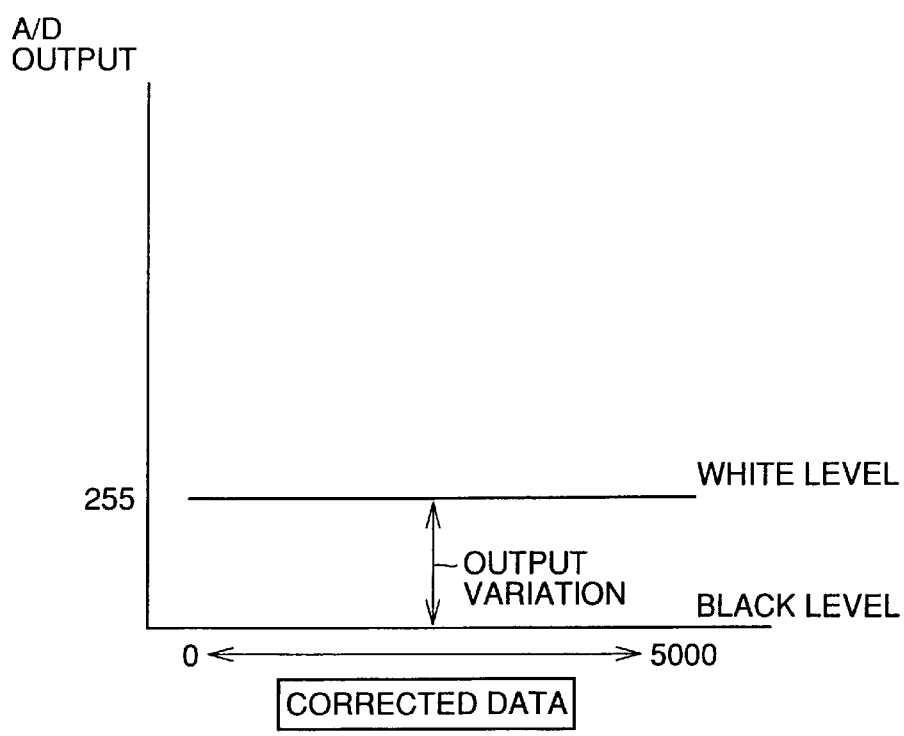

FIGS. 35 to 37 show image data processing when the line period is long and the set zoom ratio is small, and FIGS. 38 to 40 show image data processing when the line period is short and set zoom ratio is large.

FIG. 35 shows A/D output when white and black levels and original density readable when the line period is long and the zoom ratio is small.

Referring to FIG. 35, the graph representing A/D output has a convex shape with opposing ends dropped slightly, because of light distribution of the light source. The shape changes when light distribution of the light source changes. Therefore, the AD converter is set to have a dynamic range taking into consideration the original density and these variation factors, and to have such bit number that allows AD conversion of original density with necessary resolution. Here, it is assumed that the bit number is set to 10.

FIG. 36 shows data when a shading correction plate is read, which data is stored in advance in a line RAM. For simplicity of description, here, the density of the shading correction plate is assumed to be the "black level." It may be set to any density, however, as needed.

FIG. 37 shows data after correction.

Referring to FIG. 37, by subtracting the shading correction data from the image data, black level of each pixel is corrected to "0" without fail, and therefore the image data is corrected to have the data in the range of "0 to 255."

FIG. 38 shows A/D output when white and black levels and original density readable when the line period is short and the set zoom ratio is large.

Referring to FIG. 38, the graph representing A/D output has a convex shape with opposing ends dropped slightly as in FIG. 35, because of light distribution of the light source. The shape changes when light distribution of the light source changes. Therefore, the AD converter is set to have a dynamic range taking into consideration the original density and these variation factors, and to have such bit number that allows AD conversion of original density with necessary resolution. Here, it is assumed that the bit number is set to 10.

FIG. 39 shows data when a shading correction plate is read, which data is stored in advance in a line RAM. For simplicity of description, here, the density of the shading correction plate is assumed to be the "black level." It may be set to any density, however, as needed.

FIG. 40 shows data after correction.

Referring to FIG. 40, by subtracting the shading correction data from the image data, black level of each pixel is corrected to "0" without fail, and therefore the image data is corrected to have the data in the range of "0 to 255."

As described above, according to the present embodiment, an image reading apparatus capable of obtaining a read image free of any image quality degradation even when scanning speed is fixed and electrical zooming is performed, is provided.

Third Embodiment

Figure 41:
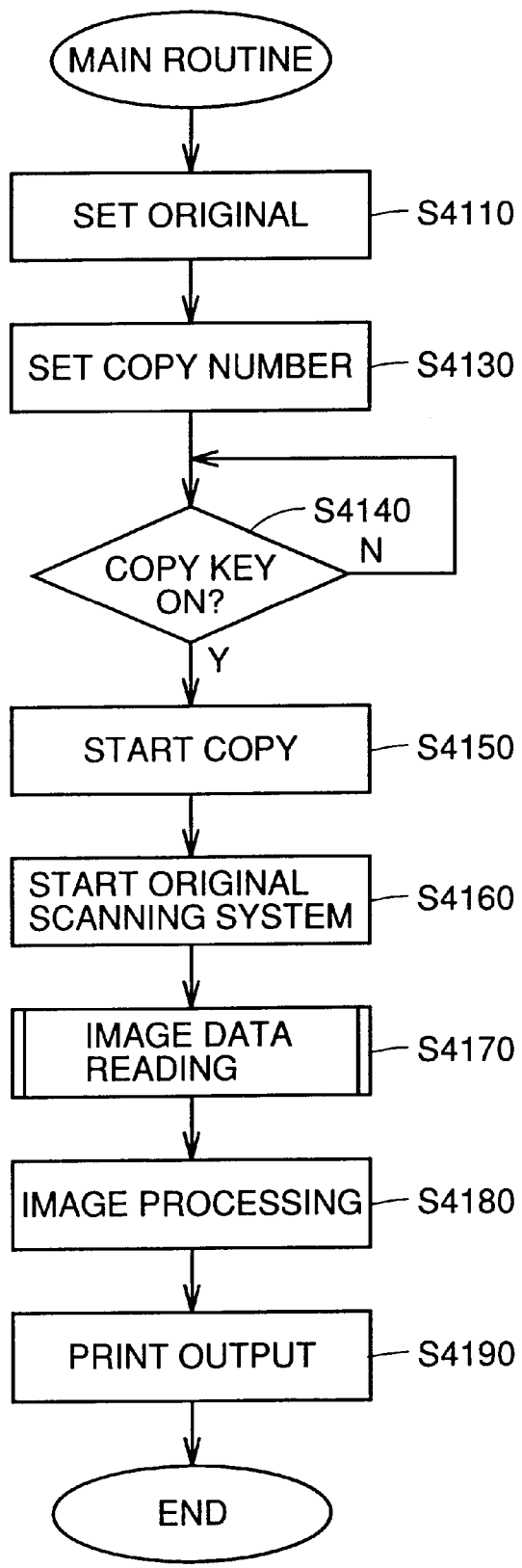
FIG. 41 is a flow chart showing an exemplary operation of a copying machine having a general mode switching function.

FIG. 41 is a flow chart showing a series of operation of a copying machine in accordance with one embodiment of the present invention, having a general mode switching function.

Referring to FIG. 41, first, an original is set on a platen (S4110). Thereafter, the number of copies is set (S4130). Here, it is assumed that other conditions such as paper size and original density are automatically set by the copying machine. If necessary, such conditions may be set manually.

After setting, a copy start key is pressed (S4140), and copying operation starts (S4150). Original scanning system starts its operation (S4160) of reading image data while scanning (S4170), and the read image data is processed in the image processing circuit (S4180). The resulting image-processed data is transmitted to an image output apparatus, where the data is printed and output (S4190).

Figure 42:
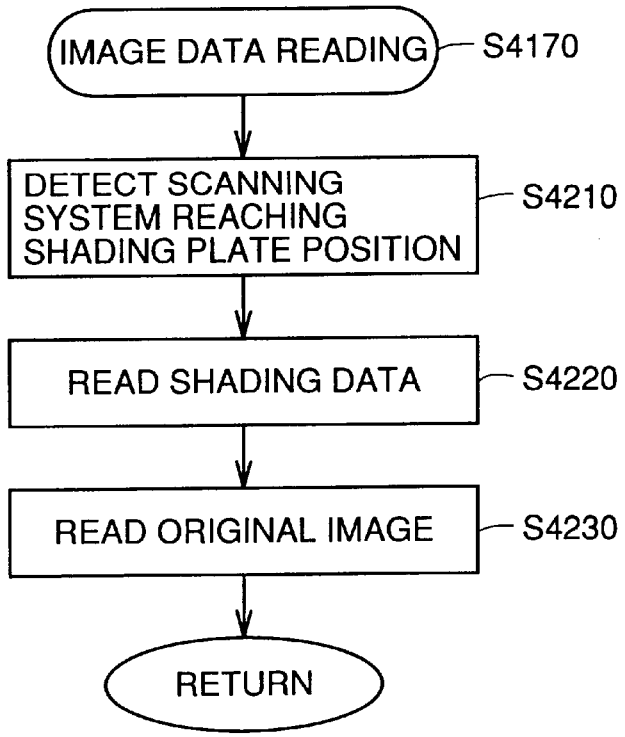
FIG. 42 is a flow chart showing an operation related to image data reading which is one of the subroutines of the main routine shown in FIG. 41.

FIG. 42 is a flow chart showing an operation related to image data reading which is one of the subroutines of the main routine shown in FIG. 41.

Referring to FIG. 42, first, a scanning system starts from a home position, and by counting number of pulses of a stepping motor or number of pulses of an encoder, whether the scanning system reached a position of a shading plate or not is detected (S4210), and if the shading plate position is reached, shading data is read (S4220). Thereafter, the original image is read continuously (S4230).

Figure 43:
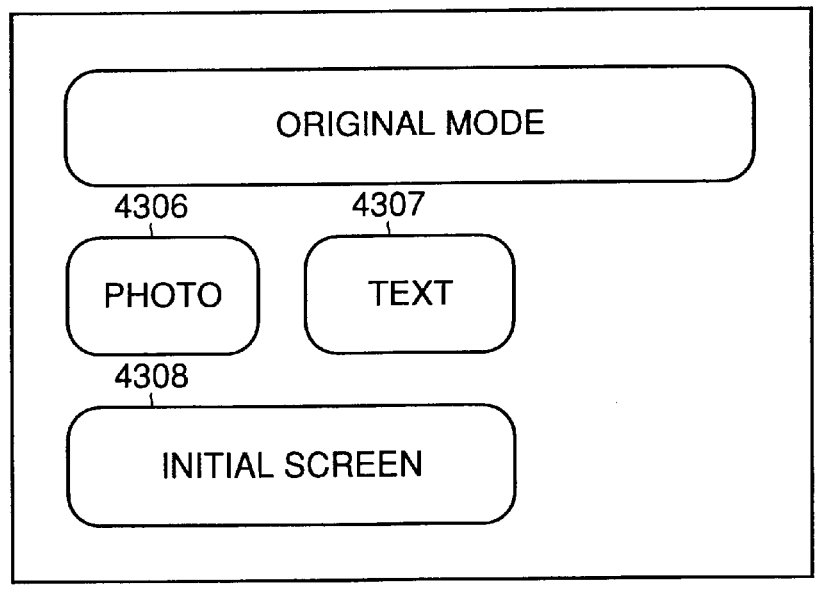
FIG. 43 shows a panel screen switched to an original mode.

FIG. 43 shows the panel screen switched to the original mode.

Referring to FIG. 43, when the panel screen is switched to the original mode, either "photo" selection key 4306 or "text" selection key 4307 is pressed dependent on the type of the original, and after setting the original mode in this manner, when "initial screen" key 4308 is pressed, the display returns to the original display shown in FIG. 2 described in the first embodiment. After the number of copies is set by a ten key, not shown, a copy start key 205 is pressed, and thus copying operation starts.

Figure 44:
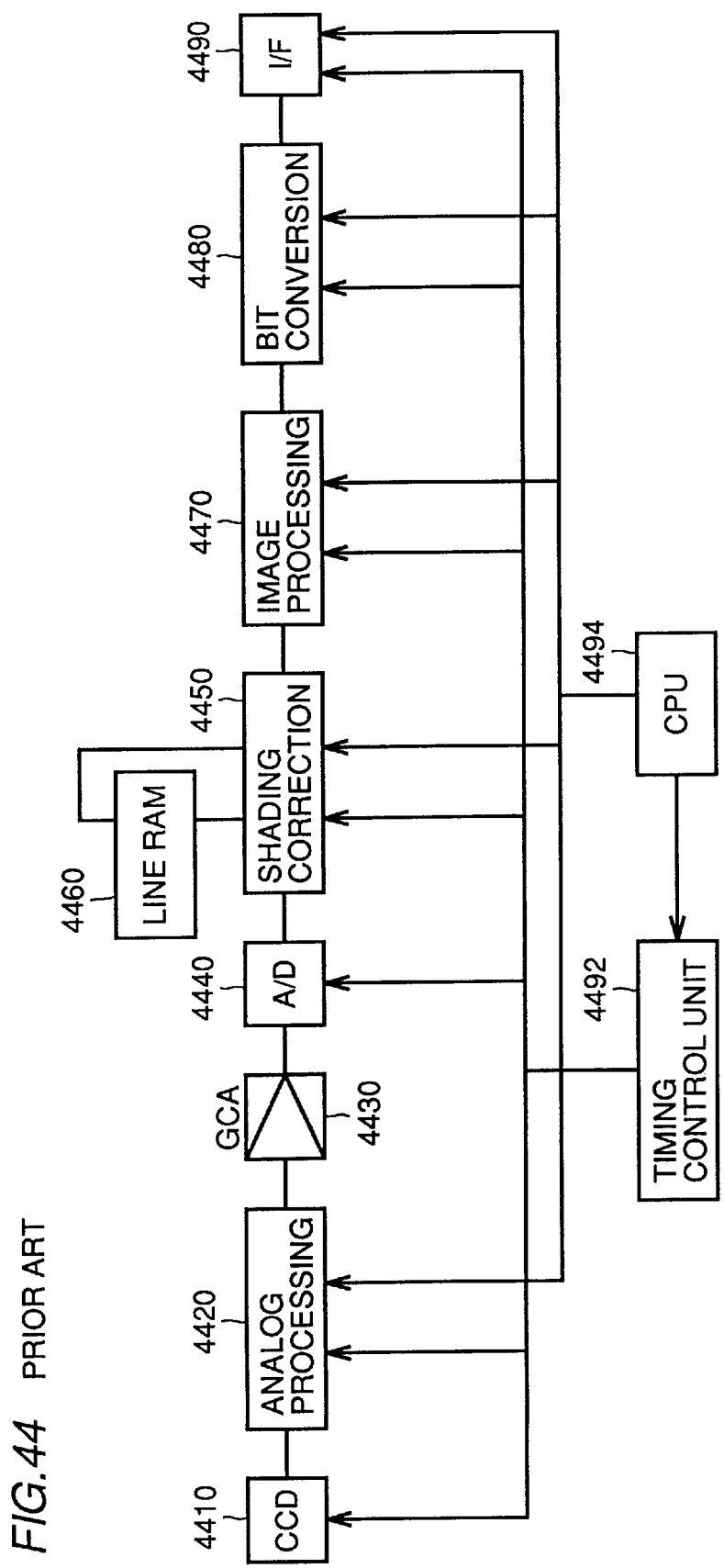
FIG. 44 is a block diagram of an image processing circuit of a conventional copying machine employing a monochrome sensor.

FIG. 44 is a block diagram of an image processing circuit of a conventional copying machine employing a monochrome sensor.

Referring to FIG. 44, the light reflected from the original enters a CCD 4410, and subjected to photoelectric conversion to a voltage in accordance with the incident light intensity, and output. The analog image signal converted to an electrical signal is subjected to a prescribed processing in analog processing circuit 4420, output dynamic range of the signal is adjusted in a GCA (Gain Control Amplifier) circuit 4430, input to an AD conversion circuit 4440, and converted to a digital data. At this time, in order to reduce influence of rounding error in calculation at the time of calculation of the succeeding image processing, AD conversion is performed with a resolution higher than necessary.

The image data which has been converted to digital data is corrected by a shading correction circuit 4450 so as to remove influence of variation in light distribution of the light source, variation in sensitivity between CCD pixels and so on. Data obtained when a shading plate is read previously is stored as correction data, in line RAM 4460.

The shading corrected image data is subjected to a prescribed image processing such as edge emphasis and MTF (Modulator Transfer Function) in an image processing circuit 4470.

After a series of image processing, the image data of which resolution has been set higher to reduce influence of rounding error in calculation is converted to data of a necessary bit number by a bit converting circuit 4480. At this time, the image data is distributed over the entire range of a preset resolution. Therefore, in order to convert the data to necessary bit number, lower number of bits are discarded, and resolution of the entire range is made rough.

The finally processed image data is output to a subsequent circuit block through an I/F unit 4490.

Timing control of various processing circuits is governed by a timing control unit 4492, and data setting, switching of processing and so on are controlled by a CPU 4494.

FIGS. 45A to 45D show flow of image data processing of a prior art example employing the monochrome sensor shown in FIG. 44. In FIGS. 45A to 45D, the abscissa represents CCD pixels, and the ordinate represents AD output. The graphs represent white and black levels of data corresponding to one line of CCD.

Figure 45:
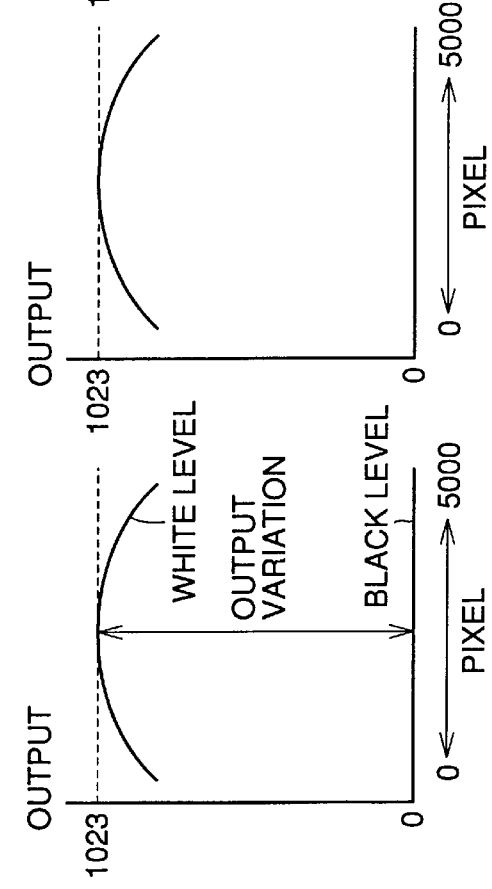
FIGS. 45A to 45D show flow of image data processing of a prior art example employing an monochrome sensor shown in FIG. 44.

First, FIG. 45A shows image data immediately after A/D conversion, with AD conversion performed with 10 bits.

FIG. 45A shows variation of the signal from the black level output "0" to the white level output "1023". As for the output of the white level, outputs from peripheral pixels are lower, because of the influence of light distribution of the light source for illuminating the original. This changes when light distribution of the light source is changed.

FIG. 45B represents shading correction data obtained by reading a shading correction plate.

Referring to FIG. 45B, when the image data is to be corrected, condition for correction in the shading correction circuit is set such that the correction data attains an AD value set in advance (a value corresponding to the reflectance of the shading correction plate).

Figure 59B:
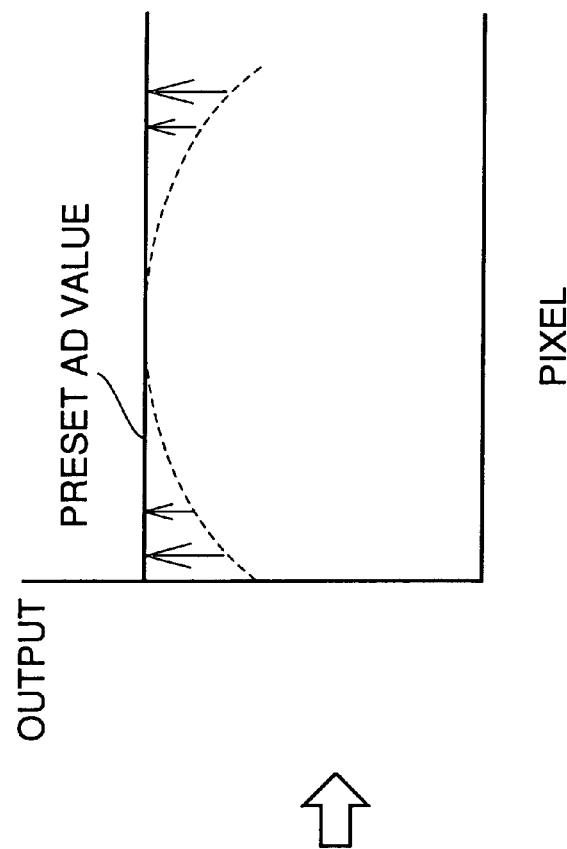
FIGS. 59A and 59B are illustrations related to correction in the shading correction circuit.
Figure 59A:
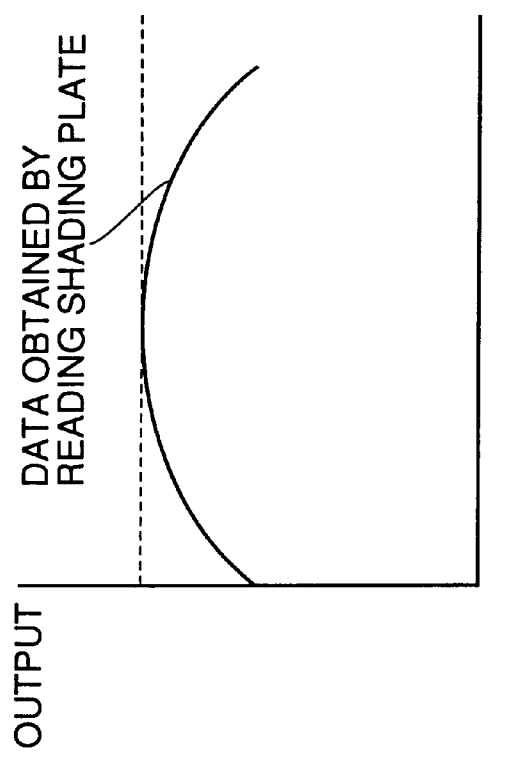

Specifically, as shown in FIGS. 59A and 59B, which will be described later, correction is performed by the shading correction circuit such that a reciprocal is multiplied so that the data obtained by reading the shading plate shown in FIG. 59A attains the AD value set in advance shown in FIG. 59B.

FIG. 45C shows data after shading correction.

Referring to FIG. 45C, the shading corrected data is flat, with variation in light distribution of original illuminating system and variation in sensitivity of CCD pixels corrected.

FIG. 45D represents data after prescribed processing in the image processing circuit and subjected to bit conversion to the necessary resolution.

In FIG. 45C, image data outputs are distributed over the entire range from "0" to "1023". Therefore, for conversion to the necessary bit number, lower bits are discarded, and resolution is made rough over the entire range. Here, an example of conversion from 10 bits to 8 bits is shown. As is apparent from FIG. 45D, image data outputs after bit conversion are distributed in the range of "0" to "255".

Figure 46:
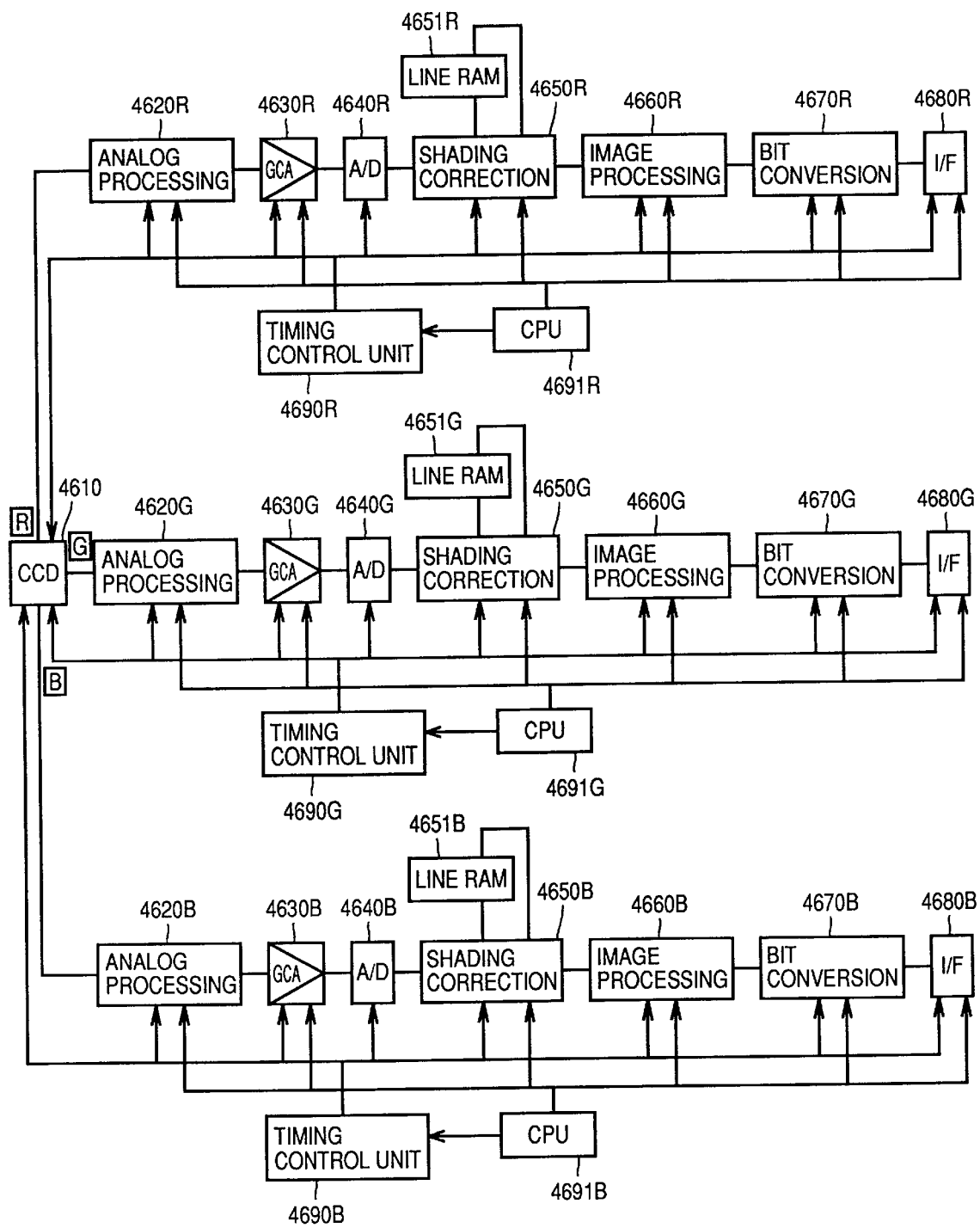
FIG. 46 is a block diagram of an image processing circuit of a conventional copying machine employing a color sensor.

FIG. 46 is a block diagram of an image processing circuit of a conventional copying machine using a color sensor.

Referring to FIG. 46, the light reflected from the original enters a CCD 4610 and divided into three primary colors of R (red), G (green) and B (blue). The divided three primary colors of R, G and B are subjected to photoelectric conversion to voltages corresponding to the input light intensity and output, respectively. The subsequent circuitry is common to R, G and B, and operation of each circuit is the same as that when a monochrome sensor is used, as described with reference to FIG. 44 above. Therefore, description is not repeated.

Figure 47:
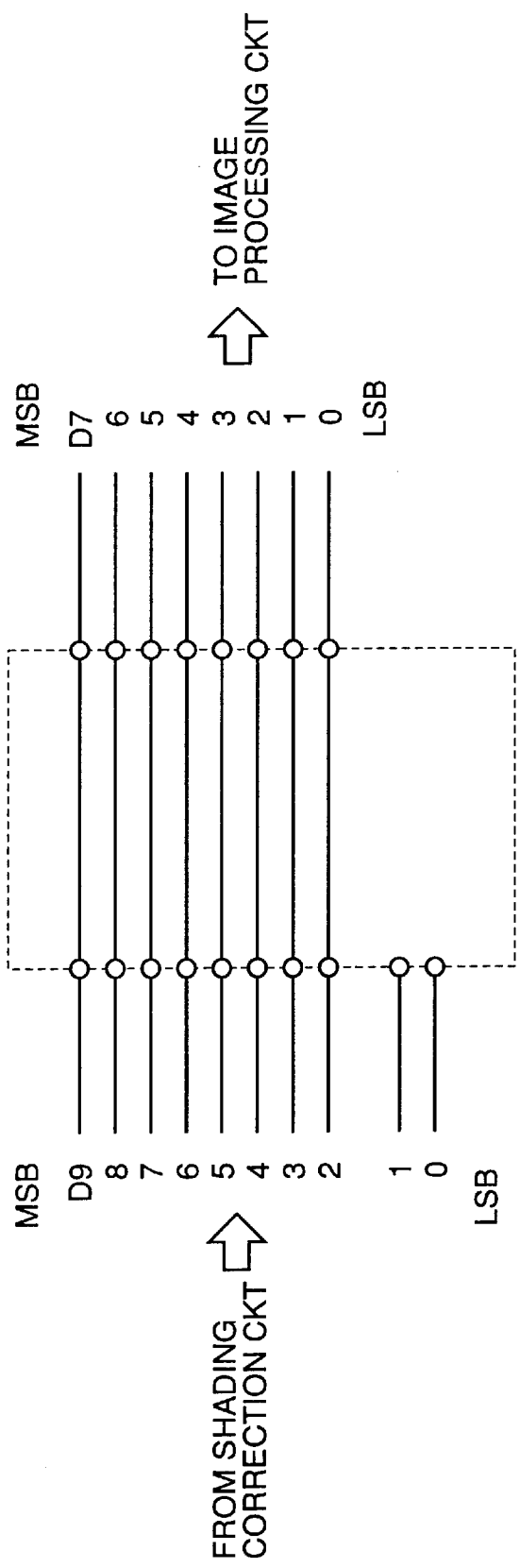
FIG. 47 shows an example of a conventional bit converting circuit.

FIG. 47 shows an example of a conventional bit converting circuit.

Referring to FIG. 47, in the bit converting circuit, in order to prevent canceling of figure in image processing calculation, AD conversion is performed with the number of bits larger than necessary. Therefore, the bit converting circuit is adapted to discard lower bits.

Figure 48:
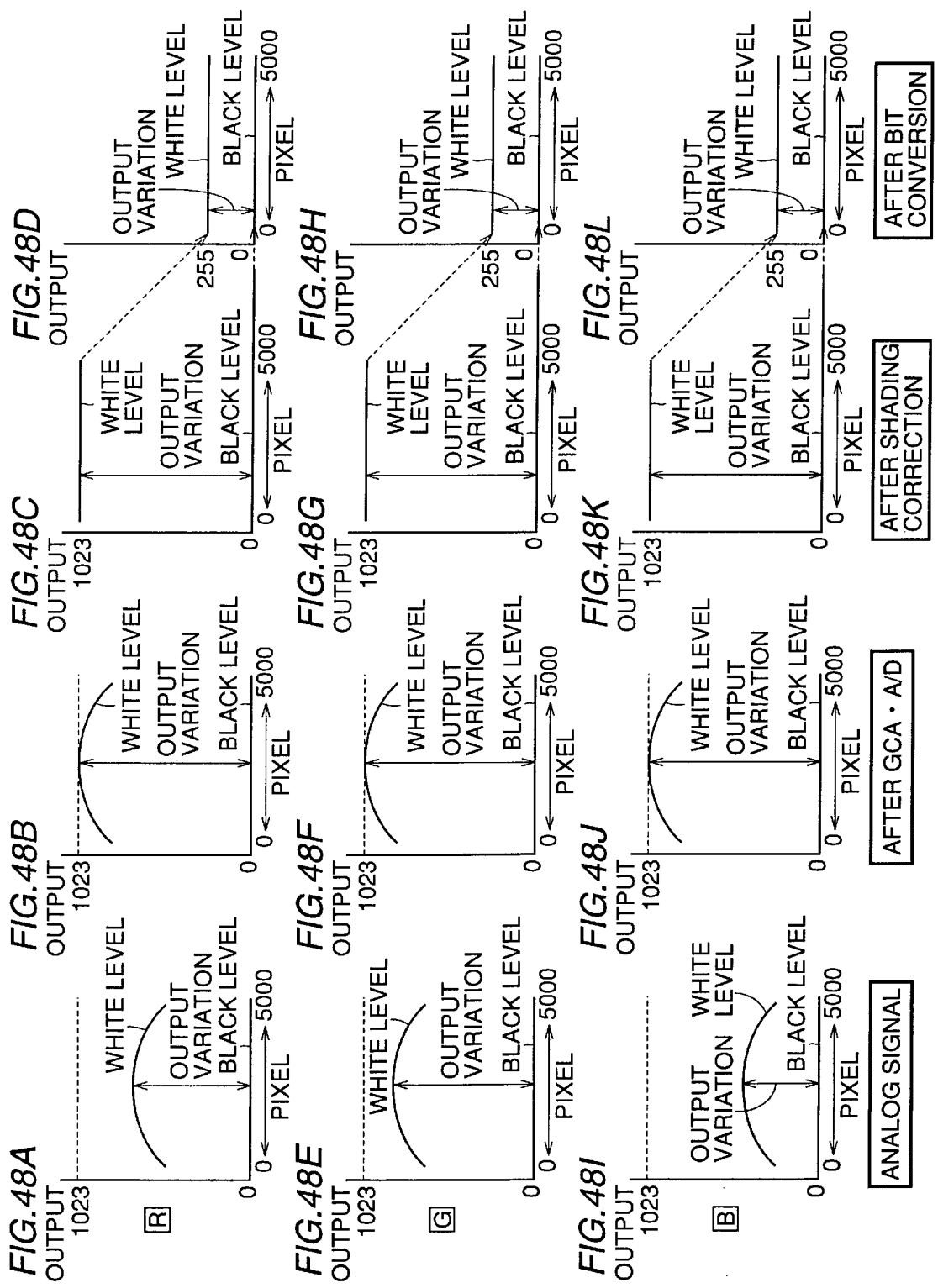
FIGS. 48A to 48L show flow of image data processing of a prior art example employing a color sensor shown in FIG. 46.

FIG. 48 shows a flow of image data processing of the prior art example employing a color sensor shown in FIG. 46. In FIG. 48, the abscissa represents CCD pixels and the ordinate represents AD output. The graph represent white and black levels of data corresponding to one line of CCD. FIGS. 48A to 48D represent R (red) outputs, FIGS. 48E to 48H represent G (green) outputs, and FIGS. 48I to 48L represent B (blue) outputs.

First, FIGS. 48A, 48E and 48I represent output levels of output signals from an analog processing circuit for R, G and B, respectively.

Referring to FIGS. 48A, 48E and 48I, because of difference in RGB sensitivity of the CCD, there are differences in output levels. More specifically, G, R and B provide higher output levels in this order.

FIGS. 48B, 48F and 48J represent output levels of image data of R, G and B immediately after signal amplification by the GCA and AD conversion, respectively, in which the gain is set such that output levels of R, G and B are made equal to each other. Here, an example in which AD conversion is performed with 10 bits is shown.

FIGS. 48B, 48F and 48J show variation of the signal from the black level output "0" to the white level output "1023". As for the output of the white level, outputs from peripheral pixels are lower, because of the influence of light distribution of the light source for illuminating the original. This changes when light distribution of the light source is changed.

FIGS. 48C, 48G and 48K represent data after shading correction of R, G and B, respectively.

Referring to FIGS. 48C, 48G and 48K, the image data are all flat with variation in light distribution of the original illuminating system and variation in sensitivity of CCD pixels corrected.

At the time of correction, correction data obtained by reading a shading correction plate is stored in advance in a line memory, and condition of correction in the shading correction circuit is set such that the correction data attains a preset AD value (a value corresponding to reflectance of the shading correction plate.) FIGS. 48D, 48H and 48L show data after bit conversion to the finally necessary resolution, after prescribed processing in the image processing circuit, for R, G and B, respectively.

In FIG. 48C, 48G and 48K, image data outputs are distributed over the entire range from "0" to "1023". Therefore, for conversion to the necessary bit number, lower bits are discarded, and resolution is made rough over the entire range. Here, an example of conversion from 10 bits to 8 bits is shown.

As is apparent from FIGS. 48D, 48H and 48L, image data outputs after bit conversion are distributed in the range of "0" to "255".

Figure 49:
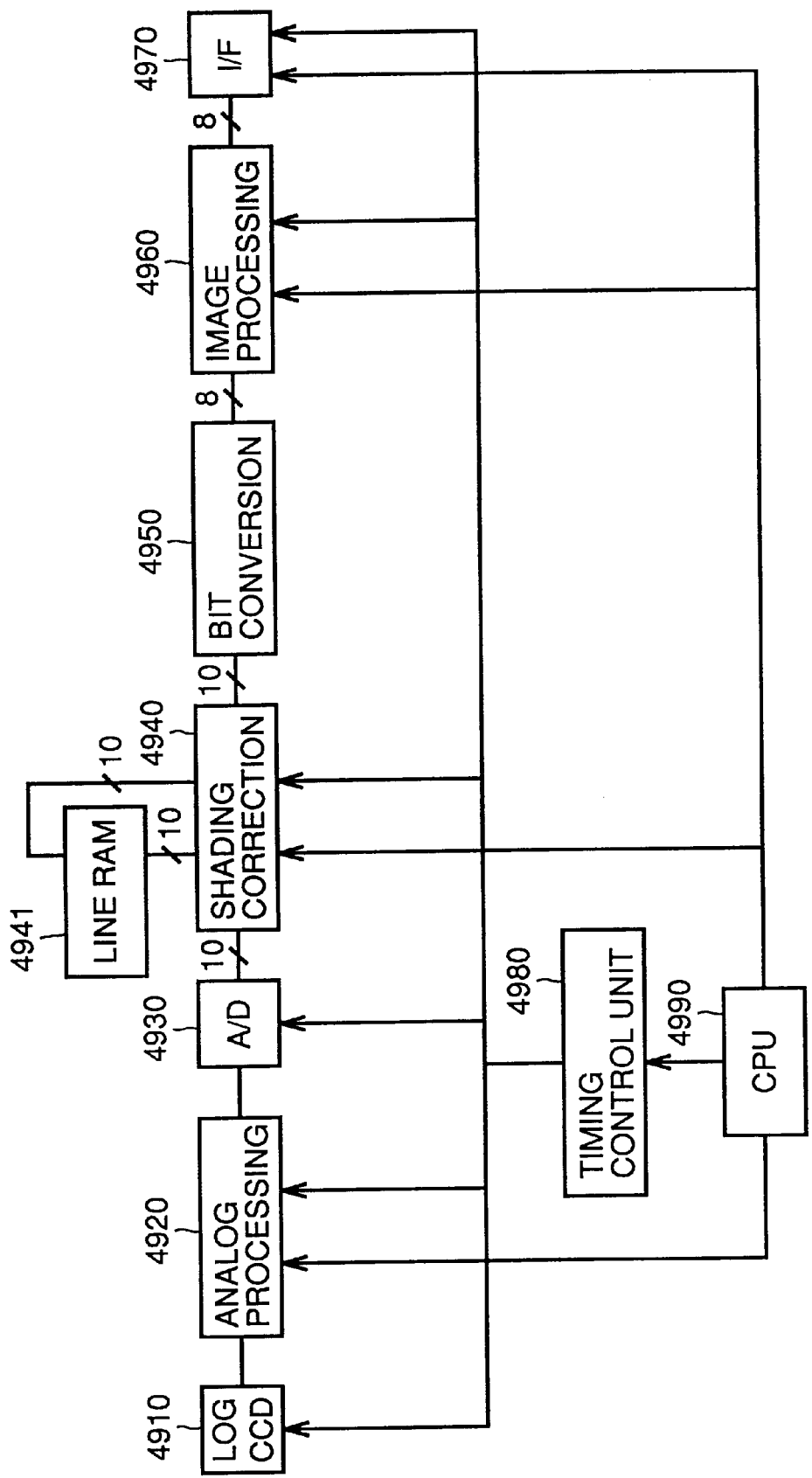
FIG. 49 is a block diagram of an example of an image processing circuit in the image reading apparatus in accordance with the present invention.

FIG. 49 is a block diagram showing an image processing circuit as one example of the image reading apparatus in accordance with the present invention.

Referring to FIG. 49, the light reflected from an original enters an LOG CCD 1110, subjected to photoelectric conversion to a voltage corresponding to the incident light intensity, and thereafter converted to a logarithmic signal and output.

The analog signal output from LOG CCD 4910 is subjected to a prescribed processing in an analog processing circuit 4920. Because of the characteristics of LOG CCD 4910, even when there is variation in absolute light intensity of the light source or variation in sensor sensitivity pixel by pixel, the analog signal is output with the dynamic range being constant with respect to the original density but the output is shifted in parallel entirely. Therefore, AD conversion is set to be performed with a dynamic range larger than necessary, taking into consideration the light intensity or other fluctuation factors.

Thereafter, the analog signal is input to an AD converting circuit 4930 and converted to a digital signal.

Thereafter, before image reading, a white or black shading plate having a known reflectance is read, and the data of the plate is stored in a line RAM 4941. The AD converted image signal obtained by reading an image is corrected by subtracting the shading correction data stored in line RAM 4941, by shading correction circuit 4940.

The corrected data is subjected to bit conversion to have the necessary dynamic range in a bit converting circuit 4950, thereafter subjected to image processing such as edge emphasis in image processing circuit 4960, and output to a block of a subsequent stage through an I/F unit 4970.

Timing control of respective processing circuits is governed by a timing control unit 4980, and data setting, switching of processes and so on are controlled by a CPU 4990.

Figure 50:
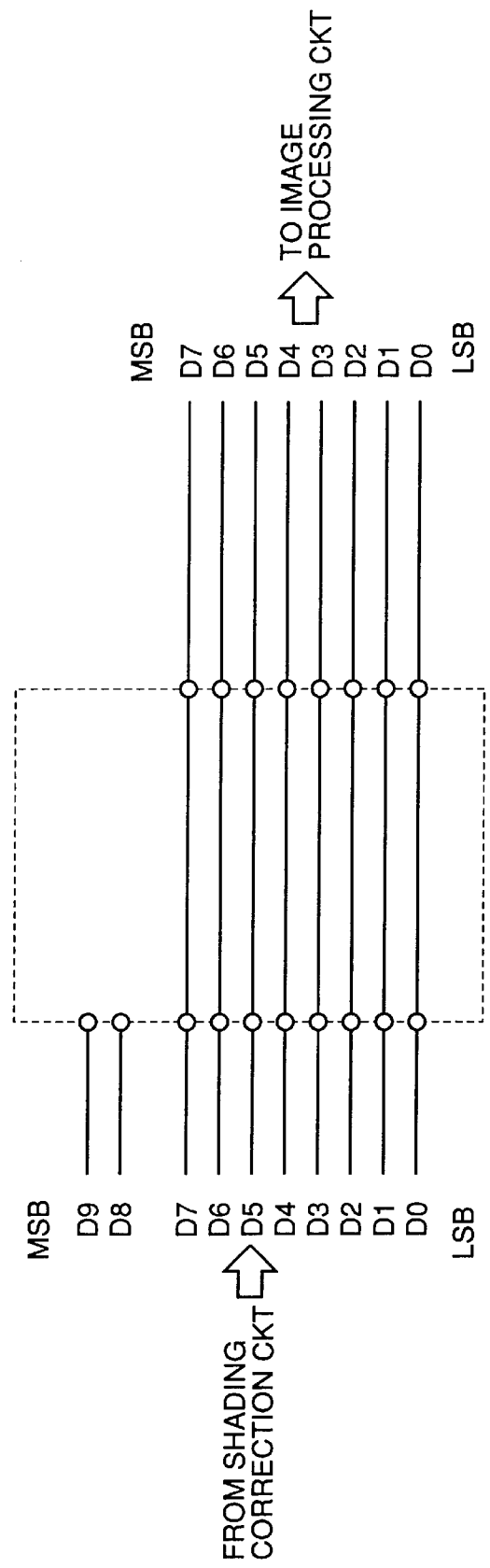
FIG. 50 shows another example of the bit converting circuit in the image reading apparatus in accordance with the present invention.

FIG. 50 shows an example of the bit converting circuit in the image reading apparatus in accordance with the present invention.

Referring to FIG. 50, the bit converting circuit is adapted to discard higher bits which are unnecessary after shading correction, as will be described later.

FIGS. 51A to 51C show flow of image data processing in the image reading apparatus in accordance with the present invention, employing an LOG CCD.

In FIGS. 51A to 51C, the abscissa represents CCD pixels, and the ordinate represents AD output. The graph shows white and black levels of data corresponding to one line of CCD. The actual image data is in the range of "output variation" between the white and black levels, and the output in accordance with the light reflected from the read original is given.

FIG. 51A shows AD output when white and black levels of a readable original density are read.

Referring to FIG. 51A, the graph has a convex shape with opposing ends of the CCD slightly lowered, because of light distribution of the light source. When light distribution of the light source changes, the shape also changes accordingly. Further, when the absolute light intensity of the light source changes, the graph is shifted upward or downward as a whole.

Because of the characteristics of the LOG CCD, the graph is shifted in parallel upward or downward with the dynamic range of the white and black levels being kept constant, dependent on variation in absolute light intensity of the light source, sensitivity of individual CCD pixels, image zoom ratio (illuminance on the CCD surface) and so on.

Therefore, the AD converting circuit is set to have a dynamic range taking into consideration the original density and these variation factors, and set to have such a bit number which allows AD conversion of the original density with necessary resolution. Here, it is assumed to 10 bits, as an example.

FIG. 51B shows shading correction data obtained by reading a shading correction plate, which data is stored in a line RAM in advance. For simplicity of description, here, the density of the shading correction plate corresponds to the "black level." The density may be set at an arbitrary value as needed.

FIG. 51C shows data after correction.

Referring to FIG. 51C, by subtracting the shading correction data shown in FIG. 51B from the image data shown in FIG. 51A, black level of each pixel is corrected without fail to "0", and the image data is corrected to be within the range of "0" to "255". Here, in order that the output range of the image data has the finally necessary bit number (for example, 8 bits), the gain or the dynamic range of the AD converting circuit are set appropriately. After the read density range of the original is normalized, upper bits, which have become unnecessary, are discarded, and thus bit conversion is performed.

In this example, one type of original has been described. When a transparent original (negative, positive) or the like is read, the dynamic range and the light intensity received by the CCD vary. Therefore, the CCD outputs are shifted upward or downward entirely. Therefore, in such a case, the number of bits at the time of AD conversion is set such that the dynamic range takes the amount of shifting dependent on the type of the original into account.

A still further example of the present embodiment will be described.

Figure 52:
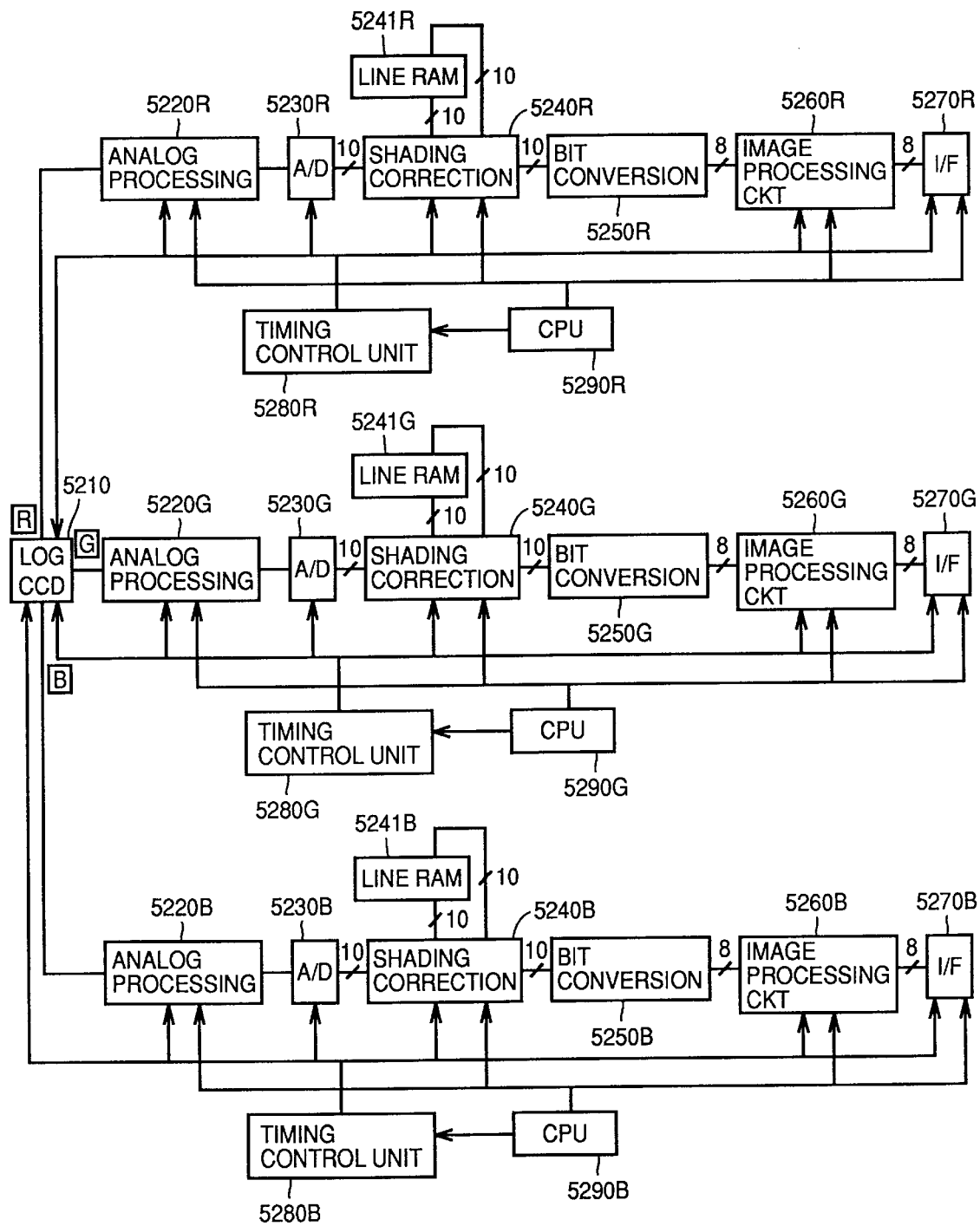
FIG. 52 is a block diagram of an image processing circuit in accordance with another example of the image reading apparatus of the present invention.

FIG. 52 is a block diagram of an image processing circuit as another example of the image reading apparatus in accordance with the present invention, which employs a color LOG CCD.

Referring to FIG. 52, the light reflected from an original enters a color LOG CCD 5210 and divided into three primary colors of R, G and B, subjected to photoelectric conversion, and thereafter converted to logarithmic signals and output. The subsequent circuits are common to R, G and B. Therefore, only the circuitry for G (green) will be described in the following.

The analog signal output from LOG CCD 5210 is subjected to a prescribed processing in an analog processing circuit 5220, and thereafter converted to a digital signal in an AD converting circuit 5230. Because of the characteristics of LOG CCD 5210, even when there is variation in absolute light intensity of the light source or variation in sensor sensitivity, the analog signal is necessary with the dynamic range being constant with respect to the original density but the output is shifted in parallel entirely. Therefore, AD conversion is set to be performed with a dynamic range larger than necessary, taking into consideration the light intensity or other fluctuation factors.

Thereafter, before image reading, a white or black shading plate having a known reflectance is read, and the data of the plate is stored in a line RAM 5241. The AD converted image signal obtained by reading an image is corrected by subtracting the shading correction data stored in line RAM 5241, by shading correction circuit 5240.

The corrected data is subjected to bit conversion to have the necessary dynamic range in a bit converting circuit 5250, thereafter subjected to image processing such as edge emphasis in image processing circuit 5260, and output to a block of a subsequent stage through an I/F unit 5270.

Timing control of respective processing circuits is governed by a timing control unit 5280, and data setting, switching of processes and so on are controlled by a CPU 5290.

The circuitry for R (red) and the circuitry for B (blue) have the same structure as the circuitry for G (green) described above. Therefore, description is not repeated.

FIGS. 53A to 53C show flow of image data processing in the image reading apparatus in accordance with the present invention, employing a color LOG CCD.

In FIGS. 53A to 53C, the abscissa represents CCD pixels and the ordinate represents AD outputs. The graph represents AD outputs when white and black levels of a readable original density corresponding to data of one line of CCD are read. FIGS. 53A, 53B and 53C represent R (red), G (green) and B (blue) outputs, respectively.

Referring to FIGS. 53A to 53C, the graph has a convex shape with opposing ends of the CCD slightly lowered, because of light distribution of the light source. When light distribution of the light source changes, the shape also changes accordingly.

Referring to FIGS. 53A to 53C, because of the LOG CCD characteristics, the outputs are shifted in parallel with the dynamic range between black and white being kept constant, dependent on the difference in sensitivity of R, G and B of the sensors.

The actual image data is within the range of "output variation" between the white and black levels, and the output in accordance with the light reflected from the read original is given.

FIGS. 54A to 54L show the flow of image processing of the read original image in accordance with the present invention employing the color LOG CCD shown in FIG. 52.

In FIGS. 54A to 54L, the abscissa represents CCD pixels and the ordinate represents AD output. The graph represent white and black levels of data corresponding to one line of CCD. FIGS. 54A to 54D represent R (red) outputs, FIGS. 54E to 54H represent G (green) outputs, and FIGS. 54I to 54L represent B (blue) outputs.

FIGS. 54A, 54E and 54I represent AD outputs of white and black levels of readable image density of R, G and B, respectively, similar to FIG. 53A.

Referring to FIG. 54A, 54E and 54I, the graph has a convex shape with opposing ends of the CCD slightly lowered, because of light distribution of the light source. When light distribution of the light source changes, the shape also changes accordingly. Because of the characteristics of the LOG CCD, the graph is shifted in parallel upward or downward with the dynamic range of the white and black levels being kept constant, dependent on variation in absolute light intensity of the light source, sensitivity of individual CCD pixels, image zoom ratio (illuminance on the CCD surface) and so on. Therefore, the AD converting circuit is set to have a dynamic range taking into consideration the original density and these variation factors, and set to have such a bit number which allows AD conversion of the original density with necessary resolution. Here, it is assumed to 10 bits, as an example.

FIGS. 54B, 54F and 54J show shading correction data obtained by reading a shading correction plates for R, G and B, respectively, which data is stored in a line RAM in advance. For simplicity of description, here, the density of the shading correction plate corresponds to the "black level." The density may be set at an arbitrary value as needed. As already described, image output levels between R, G and B differ dependent on difference in sensitivity of R, G and B of the sensors. However, the shading correction data also gives an output with the level shifted in accordance with the difference in sensitivity.

FIGS. 54C, 54G and 54K represent corrected data of R, G and B, respectively.

Referring to FIGS. 54C, 54G and 54K, by subtracting the shading correction data shown in FIGS. 54B, 54F and 54J from the image data shown in FIGS. 54A, 54E and 54I, black level of each pixel is corrected without fail to "0", and the image data is corrected to be within the range of "0" to "255" by being corrected difference in sensitivity of R, G and B of the sensors. Here, in order that the output range of the image data has the finally necessary bit number (for example, 8 bits), the gain or the dynamic range of the AD converting circuit are set appropriately.

FIGS. 54D, 54H and 54L show data after bit conversion of R, G and B, respectively.

Referring to FIGS. 54D, 54H and 54L, after the read density range of the original is normalized, upper bits, which has become unnecessary, are discarded, and thus bit conversion is performed.

Figures 55A, 55B:
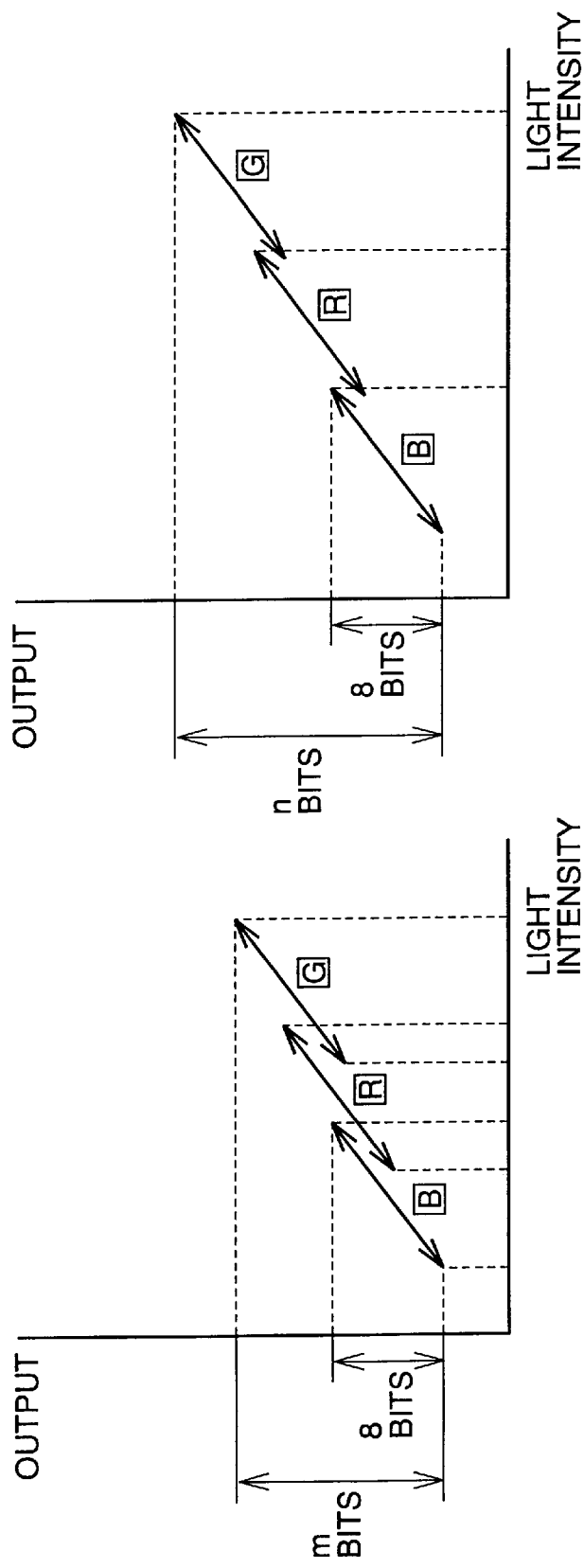
FIGS. 55A to 55B are illustrations related to the method of determining bit number in an AD converting circuit of the image reading apparatus in accordance with the present invention.

FIGS. 55A and 55B are illustrations showing the method of determining number of bits in AD converting circuit of the image reading apparatus in accordance with the present invention.

In FIGS. 55A and 55B, the abscissa represents intensity of light received by the CCD, and the ordinate represents CCD outputs. The graphs represent outputs of R, G and B of color sensors, respectively.

First, FIG. 55A shows an example where there is little difference between R, G and B outputs. Referring to FIG. 55A, in order that the dynamic ranges of respective colors are converted with the necessary number of bits (here, 8 bits), the overall dynamic range is set to be "m" bits.

FIG. 55B shows an example when there is much difference between R, G and B outputs. Referring to FIG. 55B, in order that the dynamic ranges of respective colors are converted with the necessary number of bits (here, 8 bits), the overall dynamic range is set to have "n" bits.

FIGS. 56A, 56B, 57A and 57B are illustrations related to resolution of image data at the time of shading correction in the conventional image reading apparatus.

In FIGS. 56A, 56B and 57A and 57B, the abscissa represents CCD pixels and the ordinate represents outputs, and the graphs represent image output data in the range of white level to the black level of a readable image density of the data corresponding to one line.

First, FIGS. 56A and 56B show an example when a linear output CCD is used, in which FIG. 56A represents data before correction and FIG. 56B represents data after correction.

Referring to FIG. 56A, the graph showing the data before correction has convex shape with opposing ends lowered, because of the influence of light distribution of the light source. The output characteristic changes when the light distribution of the light source changes.

Here, when the dynamic range of AD conversion is performed with the dynamic range set corresponding to the peak position of the output and the data is converted to the necessary bit number, the lower opposing end portions cannot satisfy the necessary resolution. When the data having such characteristic is subjected to shading correction, the data of the lower opposing end portions is enlarged as shown in FIG. 56B, resulting in uniform output over all the pixels of CCD.

However, in such a conventional method, the lower opposing end portions cannot substantially provide the necessary resolution and, in addition, noise component is enlarged. Therefore, S/N ratio is degraded.

Figure 57A:
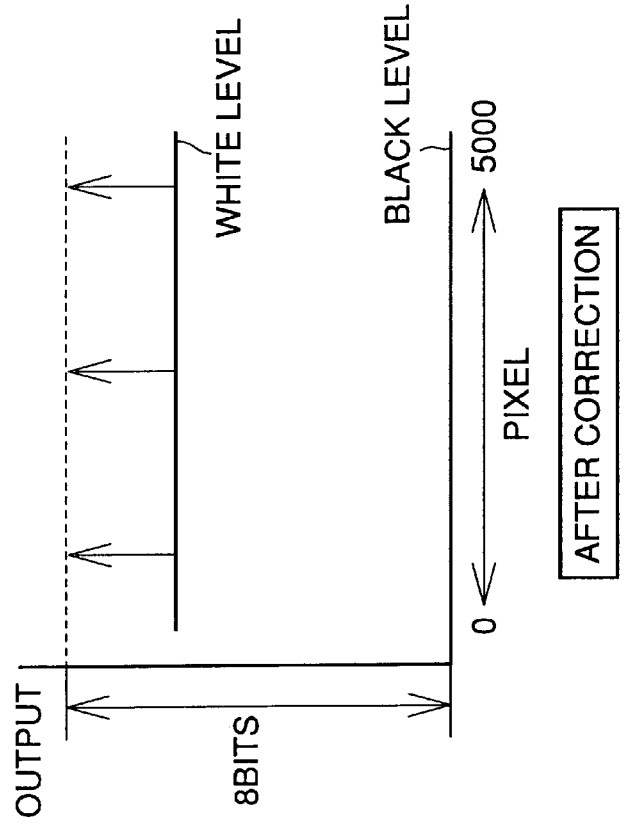
FIGS. 57A and 57B are illustrations related to image data resolution at the time of shading correction in a conventional image reading apparatus.
Figure 57B:
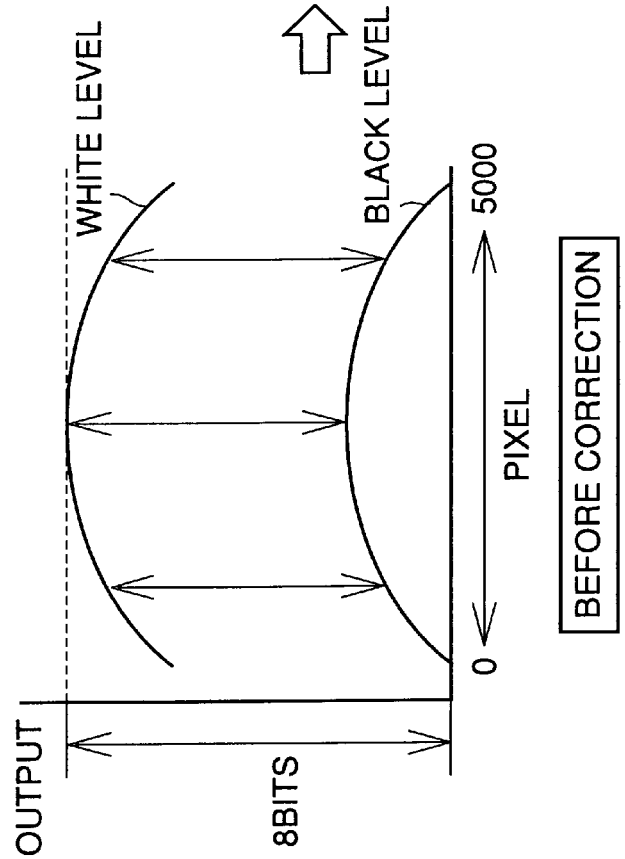

FIGS. 57A and 57B show an example when an LOG CCD is used, in which FIG. 57A shows data before correction and FIG. 57B shows data after correction.

Referring to FIG. 57A, as in the example shown in FIG. 56A, the graph has a convex shape with opposing ends lowered, because of the influence of light distribution of the light source. Therefore, when the maximum and minimum values of the output are set for the dynamic range and shading correction is performed, the data of the lower opposing end portions are enlarged and uniform output over all pixels of the CCD is obtained, as shown in FIG. 57B. At this time, the data is quantized with the same resolution over all pixels of CCD. However, the data is not amplified after shading correction. Therefore, uniform S/N ratio can be obtained for all pixels. However, in the range from the black to the white level, the essential necessary resolution is not substantially obtained.

Figure 58B:
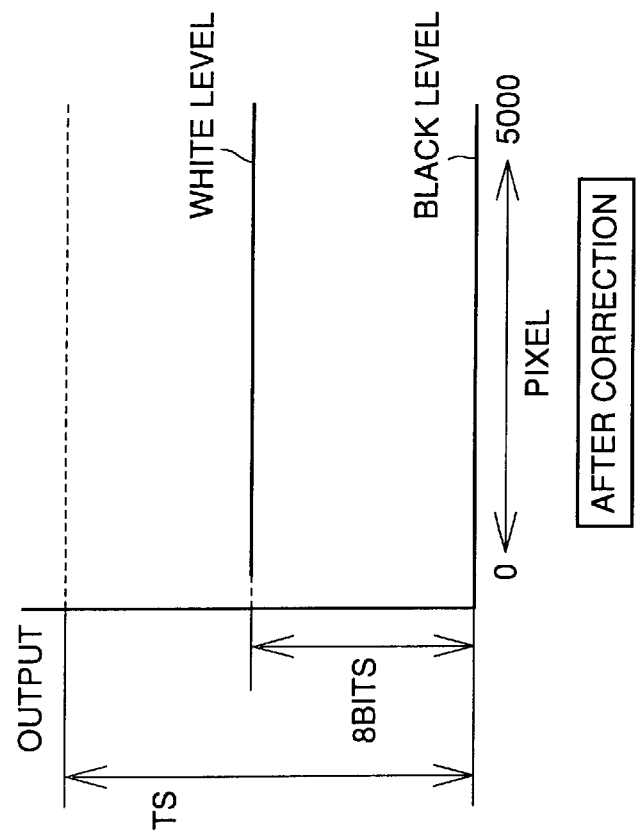
FIGS. 58A and 58B are illustrations related to image data resolution at the time of shading correction in the image reading apparatus of the present invention.
Figure 58A:
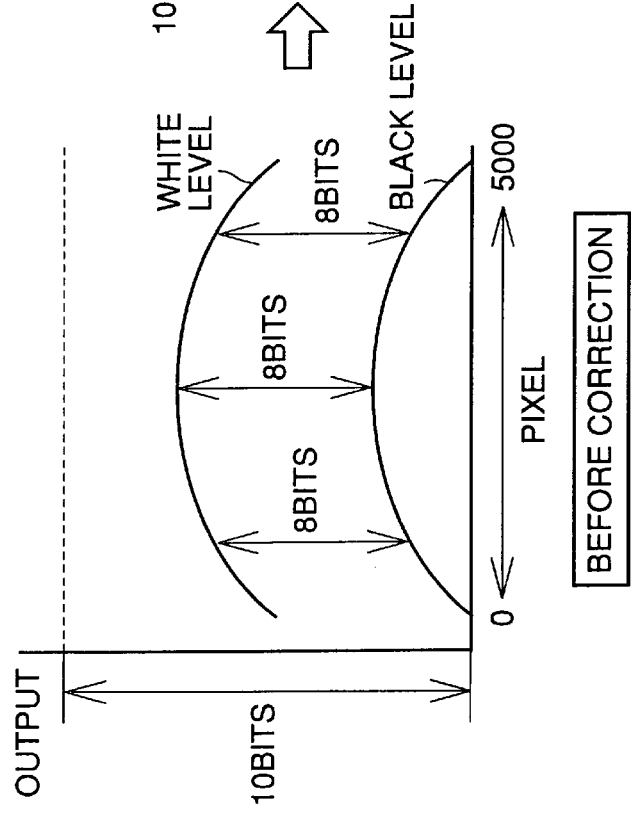

FIGS. 58A and 58B are illustrations related to resolution of image data at the time of shading correction by the image reading apparatus in accordance with the present invention.

In FIGS. 58A and 58B, the abscissa represents CCD pixels and the ordinate represents outputs. The graphs represent output data of the image in the range from white to black level of a readable image density corresponding to data of one line. FIG. 58A shows data before correction and FIG. 58B shows data after correction.

Referring to FIG. 58A, according to the present invention, the dynamic range from the white level to the black level is set to a necessary bit number, and AD conversion is performed with the number of bits larger by the amount corresponding to the variation in outputs derived from light distribution of the light source. Therefore, the necessary signal portion comes to have necessary resolution.

Further, the data is not amplified after shading correction as shown in FIG. 58B, and therefore uniform S/N ratio is ensured for all the pixels.

FIGS. 59A and 59B are illustrations related to correction by the shading correction circuit. In FIGS. 59A and 59B, the abscissa represents CCD pixels and the ordinate represents outputs. Referring to FIGS. 59A and 59B, in the shading correction circuit, the data obtained by reading a shading plate data shown in FIG. 59A is corrected to have the preset AD value shown in FIG. 59B.

As described above, according to the present embodiment, even when there is difference in output levels because of variation in light distribution of the light source or variation in sensitivity of sensors, AD conversion with uniform resolution is possible, and hence degradation of S/N ratio caused by difference in light intensity of light received by the CCD can be prevented.

Further, according to the present embodiment, circuitry for clamp adjustment and so on can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus, comprising:

image signal taking means for receiving, as an input, light from an original, and outputting a logarithmically converted analog image signal;

an AD converter for converting said output analog image signal to a digital image signal;

shade region detecting means for detecting a shade region of said original based on said digital image signal; and image signal correcting means for correcting a level of said image signal in said shade region based on a comparison of said digital image signal of a region other than said shade region and said digital image signal of said shade region.

2. The image reading apparatus according to claim 1, wherein said image signal correcting means calculates difference between said digital image signal of the region other than said shade region and said digital image signal of said shade region, and shifts the level of said digital image signal of said shade region based on the difference.

3. The image reading apparatus according to claim 1, wherein said image signal taking means includes an image sensing device which logarithmically converts a photoelectric current generated in accordance with the intensity of incident light.

4. The image reading apparatus according to claim 3, wherein said image signal taking means is a logarithmic compression output sensor.

5. The image reading apparatus according to claim 1, wherein said AD converter performs AD conversion with larger number of bits than necessary for a predetermined dynamic range.

6. The image reading apparatus according to claim 5, further comprising bit converting means for converting said digital image signal corrected by said image signal correcting means to a signal of a necessary bit number by discarding an upper bit of said digital image signal.

7. The image reading apparatus according to claim 5, wherein the predetermined dynamic range is preserved by said image signal correcting means.

8. The image reading apparatus according to claim 1, further comprising shading correction means for correcting said digital image signal based on a reference data obtained by reading a reference plate; wherein correction by said image signal correcting means is performed at the time of the shading correction.

9. The image reading apparatus according to claim 1, wherein said shade region detecting means stores monitor image data of at least one line obtained by reading said original, and detects said shade region based on the monitor image data.

10. The image forming apparatus according to claim 1, wherein
said shade region detecting means detects said shade region based on an image signal obtained by reading a portion inward by a prescribed distance from an edge of said original.

11. An image reading apparatus, comprising:
image signal taking means for receiving, as an input, light from an original, and outputting a photoelectrically converted analog image signal;
an AD converter for converting said output analog image signal to a digital image signal;
shade region detecting means for detecting a shade region of said original based on said digital image signal, in which region light intensity incident on said image taking means from said original is small;
shading reference data setting means for setting a first reference data for a region other than said shade region of said original, and setting a second reference data different from the first reference data for said shade region of said original; and
shading correction means for correcting said digital image signal of the region other than said shade region based on said first reference data, and correcting said digital image data of said shade region based on said second reference data.

12. An image reading apparatus, comprising:
image signal taking means for receiving, as an input, light from an original, and outputting a logarithmically converted analog image signal;
an AD converter for converting said output analog image signal to a digital image signal;
read magnification setting means for setting read magnification of said original;
read line period changing means for changing, in accordance with said set magnification of reading, a read line period which is a period of reading in a subscanning direction; and
image signal correcting means for reading a reference plate with said changed read line period, thereby obtaining a reference data of white level or black level, and correcting said digital image signal based on the reference data.

13. The image reading apparatus according to claim 12, wherein
said image signal correcting means shifts a level of said digital image signal by subtraction of said reference data from said digital image signal.

14. The image reading apparatus according to claim 12, wherein
said image signal taking means includes an image sensing device which logarithmically converts a photoelectric current generated in accordance with the intensity of incident light.

15. The image reading apparatus according to claim 14, wherein said image signal taking means is a logarithmic compression output sensor.

16. The image reading apparatus according to claim 12, wherein
said AD converter performs AD conversion with a larger number of bits than necessary for a predetermined dynamic range.

17. The image reading apparatus according to claim 16, further comprising
bit converting means for converting said digital image signal corrected by said image signal correcting means to digital image signal having necessary number of bits by discarding an upper bit of said digital image signal.

18. The image reading apparatus according to claim 16, wherein the predetermined dynamic range is preserved by said image signal correcting means.

19. The image reading apparatus according to claim 12, further comprising
scan speed changing means for changing scanning speed in accordance with said set magnification; wherein
when said read line period based on said set magnification exceeds a limit, said scanning speed is changed.

20. The image reading apparatus according to claim 12, further comprising
scan speed changing means for changing scanning speed in accordance with said s et magnification; wherein
when said scanning speed based on said set magnification exceeds a limit, said read line period is changed.

21. The image reading apparatus according to claim 12, further comprising
high resolution mode setting means for setting a high resolution mode in which said original is read with a resolution higher than usual; wherein
said read line period changing means sets a predetermined read line period shorter than usual when said high resolution mode is set.

22. The image reading apparatus according to claim 12, wherein
a pixel clock in a main scanning direction is changed in accordance with the change of said read line period.

23. An image reading apparatus, comprising:
image signal taking means for receiving, as an input, light from an original, and outputting a logarithmically converted analog image signal;
an AD converter for converting said output analog image signal to a digital image signal having larger number of bits than necessary;
shading correction means for correcting said digital image signal based on reference data, thereby correcting variation in light distribution of a light source and variation in sensor sensitivity; and
bit number converting means for converting the corrected digital image signal to a signal of necessary bit number, by discarding an upper bit.

24. The image reading apparatus according to claim 23, wherein
said shading correction means shifts level of said digital image signal at the time of correction.

25. The image reading apparatus according to claim 23, wherein
the number of bits at conversion by said AD converter is set in accordance with an amount of output variation of said analog image signal output from said image signal taking means.

26. The image reading apparatus according to claim 23, wherein
number of bits at the time of conversion by said AD converter is set in accordance with a dynamic range which varies dependent on type of said original.

27. The image reading apparatus according to claim 23, wherein said image signal taking means includes an image sensing device which logarithmically converts a photoelectric current generated in accordance with the intensity of incident light.

28. The image reading apparatus according to claim 27, wherein said image signal taking means is a logarithmic compression output sensor.

29. The image reading apparatus according to claim 23, wherein said bit number correcting means preserves an original dynamic range of said digital image signal.

30. An image reading apparatus, comprising:

image signal taking means for receiving, as an input, light from an original, separating the input into three primary colors of R, G and B, and outputting logarithmically converted analog image signals of respective colors;

an AD converter for converting said output analog image signals of respective colors to digital image signals of respective colors having larger number of bits than necessary;

shading correction means for correcting the digital image signals of respective colors based on reference data, thereby correcting variation in light distribution of a light source and variation in sensor sensitivity; and bit number converting means for converting said corrected digital image signals of respective colors to signals of necessary bit number by discarding an upper bit.

31. The image reading apparatus according to claim 30, wherein said shading correction means shifts level of said digital image signals of respective colors at the time of correction, thereby correcting level difference between said analog image signals of respective colors.

32. The image reading apparatus according to claim 30, wherein the number of bits at the time of conversion by said AD converter is set in accordance with dynamic range of said analog image signals of respective colors output from said image signal taking means.

33. The image reading apparatus according to claim 30, wherein the number of bits at the time of conversion by said AD converter is set in accordance with a maximum value and a minimum value of said analog image signals of respective colors output from said image signal taking means.

34. The image reading apparatus according to claim 30, wherein said image signal taking means includes an image sensing device which logarithmically converts a photoelectric current generated in accordance with the intensity of incident light.

35. The image reading apparatus according to claim 30, wherein said bit number correcting means preserves an original dynamic range of said digital image signal.

* * * * *

UNITED STATES PATENT AND TRADEMARK OFFICE
CERTIFICATE OF CORRECTION

| | |
|---|---|
| PATENT NO. | : 6,175,660 B1 |
| DATED | : January 16, 2001 |
| INVENTOR(S) | : Takayuki Nabeshima and Hiroshi Murakami |

It is certified that error appears in the above-identified patent and that said Letters Patent is hereby corrected as shown below:

Column 1,
Lines 34-35, please delete "Japanese Patent Laying-Open No. 6-134451" and insert therefore -- A Japanese Patent Laying-Open --.

Signed and Sealed this

Second Day of August, 2005

JON W. DUDAS
*Director of the United States Patent and Trademark Office*